US011979836B2

(12) United States Patent
Freeman et al.

(10) Patent No.: US 11,979,836 B2
(45) Date of Patent: May 7, 2024

(54) METHOD AND SYSTEM FOR OPERATING A MULTI-FUNCTION PORTABLE ELECTRONIC DEVICE USING VOICE-ACTIVATION

(71) Applicant: Apple Inc., Cupertino, CA (US)

(72) Inventors: Daniel Freeman, Santa Cruz, CA (US); Derek B. Barrentine, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/139,901

(22) Filed: Apr. 26, 2023

(65) Prior Publication Data

US 2023/0262605 A1 Aug. 17, 2023

Related U.S. Application Data

(63) Continuation of application No. 17/234,457, filed on Apr. 19, 2021, now Pat. No. 11,671,920, which is a (Continued)

(51) Int. Cl.
*H04W 52/02* (2009.01)
*G10L 15/22* (2006.01)
(Continued)

(52) U.S. Cl.
CPC ......... *H04W 52/0254* (2013.01); *G10L 15/22* (2013.01); *H04M 1/72403* (2021.01);
(Continued)

(58) Field of Classification Search
CPC .. G10L 15/22; G10L 2015/223; H04M 1/575; H04M 1/6066; H04M 1/6075;
(Continued)

(56) References Cited

U.S. PATENT DOCUMENTS 5,878,394 A 3/1999 Muhling
6,069,648 A 5/2000 Suso et al.
(Continued)

FOREIGN PATENT DOCUMENTS

AU 2014100581 B4 9/2014
AU 2015203483 A1 7/2015
(Continued)

OTHER PUBLICATIONS

Abdelaziz et al., "Speaker-Independent Speech-Driven Visual Speech Synthesis using Domain-Adapted Acoustic Models", May 15, 2019, 9 pages.

(Continued)

*Primary Examiner* — Kashif Siddiqui
(74) *Attorney, Agent, or Firm* — DLA Piper LLP (US)

(57) ABSTRACT

Methods and systems in which a portable electronic device can be voice activated are disclosed. The portable electronic device can be a multi-function electronic device. The voice activation can be robust and context sensitive. The voice activation can also be utilized without any preparatory user action with respect to the portable electronic device. The portable electronic device can also interact with a media system.

24 Claims, 15 Drawing Sheets

Related U.S. Application Data continuation of application No. 16/778,826, filed on Jan. 31, 2020, now Pat. No. 11,012,942, which is a continuation of application No. 14/605,793, filed on Jan. 26, 2015, now Pat. No. 10,568,032, which is a continuation of application No. 11/696,057, filed on Apr. 3, 2007, now Pat. No. 8,977,255.

(51) Int. Cl.

| | |
|---|---|
| ***H04M 1/57*** | (2006.01) |
| ***H04M 1/60*** | (2006.01) |
| ***H04M 1/72403*** | (2021.01) |
| ***H04M 1/72409*** | (2021.01) |
| ***H04M 1/72412*** | (2021.01) |
| ***H04M 1/72415*** | (2021.01) |
| ***H04M 1/7243*** | (2021.01) |
| ***H04M 1/72433*** | (2021.01) |
| ***H04M 1/72442*** | (2021.01) |
| ***H04M 1/72454*** | (2021.01) |

(52) U.S. Cl.

CPC ... *H04M 1/72409* (2021.01); *H04M 1/72415* (2021.01); *H04M 1/72454* (2021.01); *G10L 2015/223* (2013.01); *H04M 1/575* (2013.01); *H04M 1/6066* (2013.01); *H04M 1/6075* (2013.01); *H04M 1/72412* (2021.01); *H04M 1/7243* (2021.01); *H04M 1/72433* (2021.01); *H04M 1/72442* (2021.01); *H04M 2250/52* (2013.01); *H04M 2250/74* (2013.01); *Y02D 30/70* (2020.08)

(58) Field of Classification Search

CPC ......... H04M 1/72522; H04M 1/72527; H04M 1/7253; H04M 1/72533; H04M 1/72547; H04M 1/7255; H04M 1/72558; H04M 1/72569; H04M 2250/52; H04M 2250/74; H04W 52/0254; Y02D 30/70

See application file for complete search history.

(56) References Cited

U.S. PATENT DOCUMENTS

| | | | | |
|---|---|---|---|---|
| 6,212,408 | B1 * | 4/2001 | Son | H04M 1/271 455/565 |
| 6,240,303 | B1 | 5/2001 | Katzur | |
| 6,397,186 | B1 | 5/2002 | Bush et al. | |
| 6,895,257 | B2 | 5/2005 | Boman et al. | |
| 7,072,686 | B1 | 7/2006 | Schrager | |
| 8,345,665 | B2 | 1/2013 | Vieri et al. | |
| 8,346,563 | B1 | 1/2013 | Hjelm et al. | |
| 8,346,757 | B1 | 1/2013 | Lamping et al. | |
| 8,352,183 | B2 | 1/2013 | Thota et al. | |
| 8,352,268 | B2 | 1/2013 | Naik et al. | |
| 8,352,272 | B2 | 1/2013 | Rogers et al. | |
| 8,355,919 | B2 | 1/2013 | Silverman et al. | |
| 8,359,234 | B2 | 1/2013 | Vieri | |
| 8,370,145 | B2 | 2/2013 | Endo et al. | |
| 8,370,158 | B2 | 2/2013 | Gazdzinski | |
| 8,371,503 | B2 | 2/2013 | Gazdzinski | |
| 8,374,871 | B2 | 2/2013 | Ehsani et al. | |
| 8,375,320 | B2 | 2/2013 | Kotler et al. | |
| 8,380,504 | B1 | 2/2013 | Peden et al. | |
| 8,380,507 | B2 | 2/2013 | Herman et al. | |
| 8,381,107 | B2 | 2/2013 | Rottler et al. | |
| 8,381,135 | B2 | 2/2013 | Hotelling et al. | |
| 8,386,079 | B1 | 2/2013 | Kohler et al. | |
| 8,386,485 | B2 | 2/2013 | Kerschberg et al. | |
| 8,386,926 | B1 | 2/2013 | Matsuoka et al. | |
| 8,391,844 | B2 | 3/2013 | Novick et al. | |
| 8,392,717 | B2 | 3/2013 | Chai et al. | |
| 8,396,295 | B2 | 3/2013 | Gao et al. | |
| 8,396,714 | B2 | 3/2013 | Rogers et al. | |
| 8,396,715 | B2 | 3/2013 | Odell et al. | |
| 8,401,163 | B1 | 3/2013 | Kirchhoff et al. | |
| 8,406,745 | B1 | 3/2013 | Upadhyay et al. | |
| 8,407,239 | B2 | 3/2013 | Dean et al. | |
| 8,418,086 | B2 | 4/2013 | Weber et al. | |
| 8,423,288 | B2 | 4/2013 | Stahl et al. | |
| 8,428,758 | B2 | 4/2013 | Naik et al. | |
| 8,433,572 | B2 | 4/2013 | Caskey et al. | |
| 8,433,778 | B1 | 4/2013 | Shreesha et al. | |
| 8,434,133 | B2 | 4/2013 | Kulkarni et al. | |
| 8,442,821 | B1 | 5/2013 | Vanhoucke | |
| 8,447,612 | B2 | 5/2013 | Gazdzinski | |
| 8,452,597 | B2 | 5/2013 | Bringert et al. | |
| 8,452,602 | B1 | 5/2013 | Bringert et al. | |
| 8,453,058 | B1 | 5/2013 | Coccaro et al. | |
| 8,457,959 | B2 | 6/2013 | Kaiser | |
| 8,458,115 | B2 | 6/2013 | Cai et al. | |
| 8,458,278 | B2 | 6/2013 | Christie et al. | |
| 8,463,592 | B2 | 6/2013 | Lu et al. | |
| 8,464,150 | B2 | 6/2013 | Davidson et al. | |
| 8,468,502 | B2 | 6/2013 | Lui et al. | |
| 8,473,289 | B2 | 6/2013 | Jitkoff et al. | |
| 8,473,485 | B2 | 6/2013 | Wong et al. | |
| 8,477,323 | B2 | 7/2013 | Low et al. | |
| 8,478,816 | B2 | 7/2013 | Parks et al. | |
| 8,479,122 | B2 | 7/2013 | Hotelling et al. | |
| 8,484,027 | B1 | 7/2013 | Murphy | |
| 8,489,599 | B2 | 7/2013 | Bellotti | |
| 8,498,670 | B2 | 7/2013 | Cha et al. | |
| 8,498,857 | B2 | 7/2013 | Kopparapu et al. | |
| 8,514,197 | B2 | 8/2013 | Shahraray et al. | |
| 8,515,736 | B1 | 8/2013 | Duta | |
| 8,515,750 | B1 | 8/2013 | Lei et al. | |
| 8,521,513 | B2 | 8/2013 | Millett et al. | |
| 8,521,526 | B1 | 8/2013 | Lloyd et al. | |
| 8,521,531 | B1 | 8/2013 | Kim | |
| 8,521,533 | B1 | 8/2013 | Ostermann et al. | |
| 8,527,276 | B1 | 9/2013 | Senior et al. | |
| 8,533,266 | B2 | 9/2013 | Koulomzin et al. | |
| 8,537,033 | B2 | 9/2013 | Gueziec | |
| 8,539,342 | B1 | 9/2013 | Lewis | |
| 8,543,375 | B2 | 9/2013 | Hong | |
| 8,543,397 | B1 | 9/2013 | Nguyen | |
| 8,543,398 | B1 | 9/2013 | Strope et al. | |
| 8,560,229 | B1 | 10/2013 | Park et al. | |
| 8,560,366 | B2 | 10/2013 | Mikurak | |
| 8,571,528 | B1 | 10/2013 | Channakeshava | |
| 8,571,851 | B1 | 10/2013 | Tickner et al. | |
| 8,577,683 | B2 | 11/2013 | Dewitt | |
| 8,583,416 | B2 | 11/2013 | Huang et al. | |
| 8,583,511 | B2 | 11/2013 | Hendrickson | |
| 8,583,638 | B2 | 11/2013 | Donelli | |
| 8,589,156 | B2 | 11/2013 | Burke et al. | |
| 8,589,161 | B2 | 11/2013 | Kennewick et al. | |
| 8,589,374 | B2 | 11/2013 | Chaudhari | |
| 8,589,869 | B2 | 11/2013 | Wolfram | |
| 8,589,911 | B1 | 11/2013 | Sharkey et al. | |
| 8,595,004 | B2 | 11/2013 | Koshinaka | |
| 8,595,642 | B1 | 11/2013 | Lagassey | |
| 8,600,743 | B2 | 12/2013 | Lindahl et al. | |
| 8,600,746 | B1 | 12/2013 | Lei et al. | |
| 8,600,930 | B2 | 12/2013 | Sata et al. | |
| 8,606,090 | B2 | 12/2013 | Eyer | |
| 8,606,568 | B1 | 12/2013 | Tickner et al. | |
| 8,606,576 | B1 | 12/2013 | Barr et al. | |
| 8,606,577 | B1 | 12/2013 | Stewart et al. | |
| 8,615,221 | B1 | 12/2013 | Cosenza et al. | |
| 8,620,659 | B2 | 12/2013 | Di Cristo et al. | |
| 8,620,662 | B2 | 12/2013 | Bellegarda | |
| 8,626,681 | B1 | 1/2014 | Jurca et al. | |
| 8,630,841 | B2 | 1/2014 | Van Caldwell et al. | |
| 8,635,073 | B2 | 1/2014 | Chang | |
| 8,638,363 | B2 | 1/2014 | King et al. | |
| 8,639,516 | B2 | 1/2014 | Lindahl et al. | |
| 8,645,128 | B1 | 2/2014 | Agiomyrgiannakis | |
| 8,645,137 | B2 | 2/2014 | Bellegarda et al. | |
| 8,645,138 | B1 | 2/2014 | Weinstein et al. | |
| 8,654,936 | B1 | 2/2014 | Eslambolchi et al. | |

(56) References Cited

U.S. PATENT DOCUMENTS 8,655,646 B2 2/2014 Lee et al.
8,655,901 B1 2/2014 Li et al.
8,660,843 B2 2/2014 Falcon et al.
8,660,849 B2 2/2014 Gruber et al.
8,660,924 B2 2/2014 Hoch et al.
8,660,970 B1 2/2014 Fiedorowicz
8,661,112 B2 2/2014 Creamer et al.
8,661,340 B2 2/2014 Goldsmith et al.
8,670,979 B2 3/2014 Gruber et al.
8,675,084 B2 3/2014 Bolton et al.
8,676,273 B1 3/2014 Fujisaki
8,676,583 B2 3/2014 Gupta et al.
8,676,904 B2 3/2014 Lindahl
8,677,377 B2 3/2014 Cheyer et al.
8,681,950 B2 3/2014 Mack et al.
8,682,667 B2 3/2014 Haughay
8,687,777 B1 4/2014 Lavian et al.
8,688,446 B2 4/2014 Yanagihara
8,688,453 B1 4/2014 Joshi et al.
8,689,135 B2 4/2014 Portele et al.
8,694,322 B2 4/2014 Snitkovskiy et al.
8,695,074 B2 4/2014 Saraf et al.
8,696,364 B2 4/2014 Cohen
8,706,472 B2 4/2014 Ramerth et al.
8,706,474 B2 4/2014 Blume et al.
8,706,503 B2 4/2014 Cheyer et al.
8,707,195 B2 4/2014 Fleizach et al.
8,712,778 B1 4/2014 Thenthiruperai
8,713,119 B2 4/2014 Lindahl et al.
8,713,418 B2 4/2014 King et al.
8,719,006 B2 5/2014 Bellegarda
8,719,014 B2 5/2014 Wagner
8,719,039 B1 5/2014 Sharifi
8,731,610 B2 5/2014 Appaji
8,731,912 B1 5/2014 Tickner et al.
8,731,942 B2 5/2014 Cheyer et al.
8,739,208 B2 5/2014 Davis et al.
8,744,852 B1 6/2014 Seymour et al.
8,751,971 B2 6/2014 Fleizach et al.
8,760,537 B2 6/2014 Johnson et al.
8,762,145 B2 6/2014 Ouchi et al.
8,762,156 B2 6/2014 Chen
8,762,469 B2 6/2014 Lindahl
8,768,693 B2 7/2014 Somekh et al.
8,768,702 B2 7/2014 Mason et al.
8,775,154 B2 7/2014 Clinchant et al.
8,775,177 B1 7/2014 Heigold et al.
8,775,341 B1 7/2014 Commons
8,775,931 B2 7/2014 Fux et al.
8,781,456 B2 7/2014 Prociw
8,781,841 B1 7/2014 Wang
8,793,301 B2 7/2014 Wegenkittl et al.
8,798,255 B2 8/2014 Lubowich et al.
8,798,995 B1 8/2014 Edara
8,799,000 B2 8/2014 Guzzoni et al.
8,805,684 B1 8/2014 Aleksic et al.
8,805,690 B1 8/2014 Lebeau et al.
8,812,299 B1 8/2014 Su
8,812,302 B2 8/2014 Xiao et al.
8,812,321 B2 8/2014 Gilbert et al.
8,823,507 B1 9/2014 Touloumtzis
8,823,793 B2 9/2014 Clayton et al.
8,825,474 B1 9/2014 Zhai et al.
8,831,947 B2 9/2014 Wasserblat et al.
8,831,949 B1 9/2014 Smith et al.
8,838,457 B2 9/2014 Cerra et al.
8,843,369 B1 9/2014 Sharifi
8,855,915 B2 10/2014 Furuhata et al.
8,861,925 B1 10/2014 Ohme
8,862,252 B2 10/2014 Rottler et al.
8,868,111 B1 10/2014 Kahn et al.
8,868,409 B1 10/2014 Mengibar et al.
8,868,431 B2 10/2014 Yamazaki et al.
8,868,469 B2 10/2014 Xu et al.
8,868,529 B2 10/2014 Lerenc
8,880,405 B2 11/2014 Cerra et al.
8,886,534 B2 11/2014 Nakano et al.
8,886,540 B2 11/2014 Cerra et al.
8,886,541 B2 11/2014 Friedlander
8,892,446 B2 11/2014 Cheyer et al.
8,893,023 B2 11/2014 Perry et al.
8,897,822 B2 11/2014 Martin
8,898,064 B1 11/2014 Thomas et al.
8,898,568 B2 11/2014 Bull et al.
8,903,716 B2 12/2014 Chen et al.
8,909,693 B2 12/2014 Frissora et al.
8,918,321 B2 12/2014 Czahor
8,922,485 B1 12/2014 Lloyd
8,930,176 B2 1/2015 Li et al.
8,930,191 B2 1/2015 Gruber et al.
8,938,394 B1 1/2015 Faaborg et al.
8,938,450 B2 1/2015 Spivack et al.
8,938,688 B2 1/2015 Bradford et al.
8,942,986 B2 1/2015 Cheyer et al.
8,943,423 B2 1/2015 Merrill et al.
8,954,440 B1 2/2015 Gattani et al.
8,964,947 B1 2/2015 Noolu et al.
8,965,770 B2 2/2015 Petrushin
8,972,240 B2 3/2015 Brockett et al.
8,972,432 B2 3/2015 Shaw et al.
8,972,878 B2 3/2015 Mohler et al.
8,976,063 B1 3/2015 Hawkins et al.
8,976,108 B2 3/2015 Hawkins et al.
8,977,255 B2 * 3/2015 Freeman ........... H04M 1/72409 455/425
8,983,383 B1 3/2015 Haskin
8,984,098 B1 3/2015 Tomkins et al.
8,989,713 B2 3/2015 Doulton
8,990,235 B2 3/2015 King et al.
8,994,660 B2 3/2015 Neels et al.
8,995,972 B1 3/2015 Cronin
8,996,350 B1 3/2015 Dub et al.
8,996,376 B2 3/2015 Fleizach et al.
8,996,381 B2 3/2015 Mozer et al.
8,996,550 B2 3/2015 Ko et al.
8,996,639 B1 3/2015 Faaborg et al.
9,002,714 B2 4/2015 Kim et al.
9,009,046 B1 4/2015 Stewart
9,013,992 B2 4/2015 Perkins
9,015,036 B2 4/2015 Karov Zangvil et al.
9,020,804 B2 4/2015 Barbaiani et al.
9,026,425 B2 5/2015 Nikoulina et al.
9,026,426 B2 5/2015 Wu et al.
9,031,834 B2 5/2015 Coorman et al.
9,031,970 B1 5/2015 Das et al.
9,037,967 B1 5/2015 Al-Jefri et al.
9,043,208 B2 5/2015 Koch et al.
9,043,211 B2 5/2015 Haiut et al.
9,043,319 B1 5/2015 Burns et al.
9,046,932 B2 6/2015 Medlock et al.
9,049,255 B2 6/2015 Macfarlane et al.
9,049,295 B1 6/2015 Cooper et al.
9,053,706 B2 6/2015 Jitkoff et al.
9,058,105 B2 6/2015 Drory et al.
9,058,332 B1 6/2015 Darby et al.
9,058,811 B2 6/2015 Wang et al.
9,063,979 B2 6/2015 Chiu et al.
9,064,495 B1 6/2015 Torok et al.
9,065,660 B2 6/2015 Ellis et al.
9,070,247 B2 6/2015 Kuhn et al.
9,070,366 B1 6/2015 Mathias et al.
9,071,701 B2 6/2015 Donaldson et al.
9,075,435 B1 7/2015 Noble et al.
9,075,824 B2 7/2015 Gordo et al.
9,076,448 B2 7/2015 Bennett et al.
9,076,450 B1 7/2015 Sadek et al.
9,081,411 B2 7/2015 Kalns et al.
9,081,482 B1 7/2015 Zhai et al.
9,082,402 B2 7/2015 Yadgar et al.
9,083,581 B1 7/2015 Addepalli et al.
9,092,433 B2 7/2015 Rodriguez
9,092,789 B2 7/2015 Anshul
9,094,576 B1 7/2015 Karakotsios
9,094,636 B1 7/2015 Sanders et al.

(56) References Cited

U.S. PATENT DOCUMENTS 9,098,467 B1 8/2015 Blanksteen et al.
9,101,279 B2 8/2015 Ritchey et al.
9,112,984 B2 8/2015 Sejnoha et al.
9,117,212 B2 8/2015 Sheets et al.
9,117,447 B2 8/2015 Gruber et al.
9,123,338 B1 9/2015 Sanders et al.
9,143,907 B1 9/2015 Caldwell et al.
9,159,319 B1 10/2015 Hoffmeister
9,164,983 B2 10/2015 Liu et al.
9,171,541 B2 10/2015 Kennewick et al.
9,171,546 B1 10/2015 Pike
9,172,747 B2 10/2015 Walters et al.
9,183,845 B1 11/2015 Gopalakrishnan et al.
9,190,062 B2 11/2015 Haughay
9,196,245 B2 11/2015 Larcheveque et al.
9,197,848 B2 11/2015 Felkai et al.
9,201,955 B1 12/2015 Quintao et al.
9,202,520 B1 12/2015 Tang
9,208,153 B1 12/2015 Zaveri et al.
9,213,754 B1 12/2015 Zhan et al.
9,214,137 B2 12/2015 Bala et al.
9,218,122 B2 12/2015 Thoma et al.
9,218,809 B2 12/2015 Bellegard et al.
9,218,819 B1 12/2015 Stekkelpa et al.
9,223,529 B1 12/2015 Khafizova
9,223,537 B2 12/2015 Brown et al.
9,230,561 B2 1/2016 Ostermann et al.
9,232,293 B1 1/2016 Hanson
9,236,047 B2 1/2016 Rasmussen
9,241,073 B1 1/2016 Rensburg et al.
9,245,151 B2 1/2016 LeBeau et al.
9,245,388 B2 1/2016 Poulos et al.
9,246,984 B2 1/2016 Zises
9,250,703 B2 2/2016 Hernandez-Abrego et al.
9,251,713 B1 2/2016 Giovanniello et al.
9,251,787 B1 2/2016 Hart et al.
9,255,812 B2 2/2016 Maeoka et al.
9,257,120 B1 2/2016 Alvarez Guevara et al.
9,258,604 B1 2/2016 Bilobrov et al.
9,262,412 B2 2/2016 Yang et al.
9,262,612 B2 2/2016 Cheyer
9,263,058 B2 2/2016 Huang et al.
9,274,598 B2 3/2016 Beymer et al.
9,280,535 B2 3/2016 Varma et al.
9,282,211 B2 3/2016 Osawa
9,286,727 B2 3/2016 Kim et al.
9,286,910 B1 3/2016 Li et al.
9,292,487 B1 3/2016 Weber
9,292,489 B1 3/2016 Sak et al.
9,292,492 B2 3/2016 Sarikaya et al.
9,298,358 B1 3/2016 Wilden et al.
9,299,344 B2 3/2016 Braho et al.
9,300,718 B2 3/2016 Khanna
9,301,256 B2 3/2016 Mohan et al.
9,305,543 B2 4/2016 Fleizach et al.
9,305,548 B2 4/2016 Kennewick et al.
9,311,308 B2 4/2016 Sankarasubramaniam et al.
9,311,912 B1 4/2016 Swietlinski et al.
9,313,317 B1 4/2016 LeBeau et al.
9,318,108 B2 4/2016 Gruber et al.
9,325,809 B1 4/2016 Barros et al.
9,325,842 B1 4/2016 Siddiqi et al.
9,330,659 B2 5/2016 Ju et al.
9,330,668 B2 5/2016 Nanavati et al.
9,330,720 B2 5/2016 Lee
9,335,983 B2 5/2016 Breiner et al.
9,338,493 B2 5/2016 Van Os et al.
9,342,829 B2 5/2016 Zhou et al.
9,342,930 B1 5/2016 Kraft et al.
9,349,368 B1 5/2016 Lebeau et al.
9,355,472 B2 5/2016 Kocienda et al.
9,361,084 B1 6/2016 Costa
9,367,541 B1 6/2016 Servan et al.
9,368,114 B2 6/2016 Larson et al.
9,377,865 B2 6/2016 Berenson et al.
9,377,871 B2 6/2016 Waddell et al.
9,378,456 B2 6/2016 White et al.
9,378,740 B1 6/2016 Rosen et al.
9,380,155 B1 6/2016 Reding et al.
9,383,827 B1 7/2016 Faaborg et al.
9,384,185 B2 7/2016 Medlock et al.
9,390,726 B1 7/2016 Smus et al.
9,396,722 B2 7/2016 Chung et al.
9,400,779 B2 7/2016 Convertino et al.
9,401,140 B1 7/2016 Weber et al.
9,401,147 B2 7/2016 Jitkoff et al.
9,405,741 B1 8/2016 Schaaf et al.
9,406,224 B1 8/2016 Sanders et al.
9,406,299 B2 8/2016 Gollan et al.
9,408,182 B1 8/2016 Hurley et al.
9,412,392 B2 8/2016 Lindahl
9,418,650 B2 8/2016 Bharadwaj et al.
9,423,266 B2 8/2016 Clark et al.
9,424,246 B2 8/2016 Spencer et al.
9,424,840 B1 8/2016 Hart et al.
9,431,021 B1 8/2016 Scalise et al.
9,432,499 B2 8/2016 Hajdu et al.
9,436,918 B2 9/2016 Pantel et al.
9,437,186 B1 9/2016 Liu et al.
9,437,189 B2 9/2016 Epstein et al.
9,442,687 B2 9/2016 Park et al.
9,443,527 B1 9/2016 Watanabe et al.
9,454,599 B2 9/2016 Golden et al.
9,454,957 B1 9/2016 Mathias et al.
9,465,798 B2 10/2016 Lin
9,465,833 B2 10/2016 Aravamudan et al.
9,465,864 B2 10/2016 Hu et al.
9,466,027 B2 10/2016 Byrne et al.
9,466,121 B2 10/2016 Yang et al.
9,466,294 B1 10/2016 Tunstall-Pedoe et al.
9,471,566 B1 10/2016 Zhang et al.
9,472,196 B1 10/2016 Wang et al.
9,483,388 B2 11/2016 Sankaranarasimhan et al.
9,483,461 B2 11/2016 Fleizach et al.
9,483,529 B1 11/2016 Pasoi et al.
9,484,021 B1 11/2016 Mairesse et al.
9,485,286 B1 11/2016 Sellier et al.
9,495,129 B2 11/2016 Fleizach et al.
9,501,741 B2 11/2016 Cheyer et al.
9,502,025 B2 11/2016 Kennewick et al.
9,508,028 B2 11/2016 Bannister et al.
9,510,044 B1 11/2016 Pereira et al.
9,514,470 B2 12/2016 Topatan et al.
9,516,014 B2 12/2016 Zafiroglu et al.
9,519,453 B2 12/2016 Perkuhn et al.
9,524,355 B2 12/2016 Forbes et al.
9,529,500 B1 12/2016 Gauci et al.
9,531,803 B2 12/2016 Chen et al.
9,531,862 B1 12/2016 Vadodaria
9,535,906 B2 1/2017 Lee et al.
9,536,527 B1 1/2017 Carlson
9,536,544 B2 1/2017 Osterman et al.
9,547,647 B2 1/2017 Badaskar
9,548,050 B2 1/2017 Gruber et al.
9,548,979 B1 1/2017 Johnson et al.
9,569,549 B1 2/2017 Jenkins et al.
9,571,995 B1 2/2017 Scheer et al.
9,575,964 B2 2/2017 Yadgar et al.
9,576,575 B2 2/2017 Heide
9,578,173 B2 2/2017 Sanghavi et al.
9,584,946 B1 2/2017 Lyren et al.
9,586,318 B2 3/2017 Djugash et al.
9,602,946 B2 3/2017 Karkkainen et al.
9,607,612 B2 3/2017 Deleeuw
9,612,999 B2 4/2017 Prakah-Asante et al.
9,619,200 B2 4/2017 Chakladar et al.
9,619,459 B2 4/2017 Hebert et al.
9,620,113 B2 4/2017 Kennewick et al.
9,620,126 B2 4/2017 Chiba
9,626,695 B2 4/2017 Balasubramanian et al.
9,626,799 B2 4/2017 McArdle et al.
9,626,955 B2 4/2017 Fleizach et al.
9,633,004 B2 4/2017 Giuli et al.
9,633,191 B2 4/2017 Fleizach et al.

(56) References Cited

U.S. PATENT DOCUMENTS 9,633,660 B2 4/2017 Haughay
9,633,674 B2 4/2017 Sinha
9,646,313 B2 5/2017 Kim et al.
9,648,107 B1 5/2017 Penilla et al.
9,652,453 B2 5/2017 Mathur et al.
9,658,746 B2 5/2017 Cohn et al.
9,659,002 B2 5/2017 Medlock et al.
9,659,298 B2 5/2017 Lynch et al.
9,665,567 B2 5/2017 Li et al.
9,665,662 B1 5/2017 Gautam et al.
9,668,121 B2 5/2017 Naik et al.
9,672,725 B2 6/2017 Dotan-Cohen et al.
9,672,822 B2 6/2017 Brown et al.
9,678,664 B2 6/2017 Zhai et al.
9,690,542 B2 6/2017 Reddy et al.
9,691,161 B1 6/2017 Yalniz et al.
9,691,378 B1 6/2017 Meyers et al.
9,691,384 B1 6/2017 Wang et al.
9,696,963 B2 7/2017 Son et al.
9,697,016 B2 7/2017 Jacob
9,697,822 B1 7/2017 Naik et al.
9,697,827 B1 7/2017 Lilly et al.
9,697,828 B1 7/2017 Prasad et al.
9,698,999 B2 7/2017 Mutagi
9,711,148 B1 7/2017 Sharifi et al.
9,720,907 B2 8/2017 Bangalore et al.
9,721,566 B2 8/2017 Newendorp et al.
9,721,570 B1 8/2017 Beal et al.
9,723,130 B2 8/2017 Rand
9,734,817 B1 8/2017 Putrycz
9,734,839 B1 8/2017 Adams
9,741,343 B1 8/2017 Miles et al.
9,747,083 B1 8/2017 Roman et al.
9,747,093 B2 8/2017 Latino et al.
9,754,591 B1 9/2017 Kumar et al.
9,755,605 B1 9/2017 Li et al.
9,760,566 B2 9/2017 Heck et al.
9,767,710 B2 9/2017 Lee et al.
9,772,994 B2 9/2017 Karov et al.
9,786,271 B1 10/2017 Combs et al.
9,792,907 B2 10/2017 Bocklet et al.
9,798,719 B2 10/2017 Karov et al.
9,812,128 B2 11/2017 Mixter et al.
9,813,882 B1 11/2017 Masterman
9,818,400 B2 11/2017 Paulik et al.
9,823,811 B2 11/2017 Brown et al.
9,823,828 B2 11/2017 Zambetti et al.
9,824,379 B2 11/2017 Khandelwal et al.
9,824,691 B1 11/2017 Montero et al.
9,824,692 B1 11/2017 Khoury et al.
9,830,044 B2 11/2017 Brown et al.
9,830,449 B1 11/2017 Wagner
9,842,168 B2 12/2017 Heck et al.
9,842,584 B1 12/2017 Hart et al.
9,846,685 B2 12/2017 Li
9,846,836 B2 12/2017 Gao et al.
9,858,925 B2 1/2018 Gruber et al.
9,858,927 B2 1/2018 Williams et al.
9,886,953 B2 2/2018 Lemay et al.
9,887,949 B2 2/2018 Shepherd et al.
9,891,811 B2 2/2018 Federighi et al.
9,911,415 B2 3/2018 Vanblon et al.
9,916,839 B1 3/2018 Scalise et al.
9,922,642 B2 3/2018 Pitschel et al.
9,928,835 B1 3/2018 Tang
9,934,777 B1 4/2018 Joseph et al.
9,934,785 B1 4/2018 Hulaud
9,940,616 B1 4/2018 Morgan et al.
9,946,862 B2 4/2018 Yun et al.
9,948,728 B2 4/2018 Linn et al.
9,959,129 B2 5/2018 Kannan et al.
9,959,506 B1 5/2018 Karppanen
9,966,065 B2 5/2018 Gruber et al.
9,966,068 B2 5/2018 Cash et al.
9,967,381 B1 5/2018 Kashimba et al.
9,971,495 B2 5/2018 Shetty et al.
9,972,304 B2 5/2018 Paulik et al.
9,984,686 B1 5/2018 Mutagi et al.
9,986,419 B2 5/2018 Naik et al.
9,990,129 B2 6/2018 Yang et al.
9,990,176 B1 6/2018 Gray
9,990,921 B2 6/2018 Vanblon et al.
9,990,926 B1 6/2018 Pearce
9,996,626 B1 6/2018 Bailey et al.
9,998,552 B1 6/2018 Ledet
10,001,817 B2 6/2018 Zambetti et al.
10,013,416 B1 7/2018 Bhardwaj et al.
10,013,654 B1 7/2018 Levy et al.
10,013,979 B1 7/2018 Roma et al.
10,019,436 B2 7/2018 Huang
10,025,378 B2 7/2018 Venable et al.
10,026,209 B1 7/2018 Dagley et al.
10,026,401 B1 7/2018 Mutagi et al.
10,027,662 B1 7/2018 Mutagi et al.
10,032,451 B1 7/2018 Mamkina et al.
10,032,455 B2 7/2018 Newman et al.
10,037,758 B2 7/2018 Jing et al.
10,043,516 B2 8/2018 Saddler et al.
10,048,748 B2 8/2018 Sridharan et al.
10,049,161 B2 8/2018 Kaneko
10,049,663 B2 8/2018 Orr et al.
10,049,668 B2 8/2018 Huang et al.
10,055,390 B2 8/2018 Sharifi et al.
10,055,681 B2 8/2018 Brown et al.
10,068,570 B2 9/2018 Dai et al.
10,074,360 B2 9/2018 Kim
10,074,371 B1 9/2018 Wang et al.
10,078,487 B2 9/2018 Gruber et al.
10,083,213 B1 9/2018 Podgorny et al.
10,083,688 B2 9/2018 Piernot et al.
10,083,690 B2 9/2018 Giuli et al.
10,088,972 B2 10/2018 Brown et al.
10,089,072 B2 10/2018 Piersol et al.
10,096,319 B1 10/2018 Jin et al.
10,101,887 B2 10/2018 Bernstein et al.
10,102,359 B2 10/2018 Cheyer
10,115,055 B2 10/2018 Weiss et al.
10,127,901 B2 11/2018 Zhao et al.
10,127,908 B1 11/2018 Deller et al.
10,127,926 B2 11/2018 James
10,134,425 B1 11/2018 Johnson, Jr.
10,135,965 B2 11/2018 Woolsey et al.
10,142,222 B1 11/2018 Zhang
10,146,923 B2 12/2018 Pitkänen et al.
10,147,421 B2 12/2018 Liddell et al.
10,147,441 B1 12/2018 Pogue et al.
10,149,156 B1 12/2018 Tiku et al.
10,162,512 B2 12/2018 Seo et al.
10,162,817 B2 12/2018 Schlesinger et al.
10,169,329 B2 1/2019 Futrell et al.
10,170,123 B2 1/2019 Orr et al.
10,170,135 B1 1/2019 Pearce et al.
10,175,879 B2 1/2019 Missig et al.
10,176,167 B2 1/2019 Evermann
10,176,802 B1 1/2019 Ladhak et al.
10,176,808 B1 1/2019 Lovitt et al.
10,178,301 B1 1/2019 Welbourne et al.
10,185,542 B2 1/2019 Carson et al.
10,186,254 B2 1/2019 Williams et al.
10,186,266 B1 1/2019 Devaraj et al.
10,191,627 B2 1/2019 Cieplinski et al.
10,191,646 B2 1/2019 Zambetti et al.
10,191,718 B2 1/2019 Rhee et al.
10,192,546 B1 1/2019 Piersol et al.
10,192,552 B2 1/2019 Raitio et al.
10,192,557 B2 1/2019 Lee et al.
10,198,877 B1 2/2019 Maltsev et al.
10,199,051 B2 2/2019 Binder et al.
10,200,824 B2 2/2019 Gross et al.
10,204,627 B2 2/2019 Nitz et al.
10,210,860 B1 2/2019 Ward et al.
10,216,351 B2 2/2019 Yang
10,216,832 B2 2/2019 Bangalore et al.
10,223,066 B2 3/2019 Martel et al.

(56) References Cited

U.S. PATENT DOCUMENTS 10,225,711 B2 3/2019 Parks et al.
10,228,904 B2 3/2019 Raux
10,229,109 B1 3/2019 Cherepanov et al.
10,229,356 B1 3/2019 Liu et al.
10,229,680 B1 3/2019 Gillespie et al.
10,237,711 B2 3/2019 Linn et al.
10,242,501 B1 3/2019 Pusch et al.
10,248,308 B2 4/2019 Karunamuni et al.
10,248,771 B1 4/2019 Ziraknejad et al.
10,249,300 B2 4/2019 Booker et al.
10,249,305 B2 4/2019 Yu
10,255,922 B1 4/2019 Sharifi et al.
10,261,672 B1 4/2019 Dolbakian et al.
10,261,830 B2 4/2019 Gupta et al.
10,269,345 B2 4/2019 Castillo Sanchez et al.
10,275,513 B1 4/2019 Cowan et al.
10,282,737 B2 5/2019 Clark et al.
10,289,205 B1 5/2019 Sumter et al.
10,291,066 B1 5/2019 Leabman et al.
10,296,160 B2 5/2019 Shah et al.
10,297,253 B2 5/2019 Walker, II et al.
10,303,772 B2 5/2019 Hosn et al.
10,304,463 B2 5/2019 Mixter et al.
10,311,482 B2 6/2019 Baldwin
10,311,871 B2 6/2019 Newendorp et al.
10,325,598 B2 6/2019 Basye et al.
10,331,312 B2 6/2019 Napolitano et al.
10,332,509 B2 6/2019 Catanzaro et al.
10,332,513 B1 6/2019 D'souza et al.
10,332,518 B2 6/2019 Garg et al.
10,339,224 B2 7/2019 Fukuoka
10,339,714 B2 7/2019 Corso et al.
10,339,721 B1 7/2019 Dascola et al.
10,339,925 B1 7/2019 Rastrow et al.
10,346,540 B2 7/2019 Karov et al.
10,346,541 B1 7/2019 Phillips et al.
10,346,753 B2 7/2019 Soon-Shiong et al.
10,346,878 B1 7/2019 Ostermann et al.
10,353,975 B2 7/2019 Oh et al.
10,354,168 B2 7/2019 Bluche
10,354,677 B2 7/2019 Mohamed et al.
10,356,243 B2 7/2019 Sanghavi et al.
10,360,305 B2 7/2019 Larcheveque et al.
10,360,716 B1 7/2019 Van Der Meulen et al.
10,365,887 B1 7/2019 Mulherkar
10,366,160 B2 7/2019 Castelli et al.
10,366,692 B1 7/2019 Adams et al.
10,372,814 B2 8/2019 Gliozzo et al.
10,372,881 B2 8/2019 Ingrassia, Jr. et al.
10,373,381 B2 8/2019 Nuernberger et al.
10,389,876 B2 8/2019 Engelke et al.
10,402,066 B2 9/2019 Kawana
10,403,283 B1 9/2019 Schramm et al.
10,409,454 B2 9/2019 Kagan et al.
10,410,637 B2 9/2019 Paulik et al.
10,416,760 B2 9/2019 Burns et al.
10,417,037 B2 9/2019 Gruber et al.
10,417,344 B2 9/2019 Futrell et al.
10,417,554 B2 9/2019 Scheffler
10,431,210 B1 10/2019 Huang et al.
10,437,928 B2 10/2019 Bhaya et al.
10,446,142 B2 10/2019 Lim et al.
10,453,117 B1 10/2019 Reavely et al.
10,469,665 B1 11/2019 Bell et al.
10,474,961 B2 11/2019 Brigham et al.
10,475,446 B2 11/2019 Gruber et al.
10,482,875 B2 11/2019 Henry
10,490,195 B1 11/2019 Krishnamoorthy et al.
10,496,364 B2 12/2019 Yao
10,496,705 B1 12/2019 Irani et al.
10,497,365 B2 12/2019 Gruber et al.
10,497,366 B2 12/2019 Sapugay et al.
10,504,518 B1 12/2019 Irani et al.
10,512,750 B1 12/2019 Lewin et al.
10,515,133 B1 12/2019 Sharifi
10,515,623 B1 12/2019 Grizzel
10,521,946 B1 12/2019 Roche et al.
10,528,386 B2 1/2020 Yu
10,540,976 B2 1/2020 Van Os et al.
10,558,893 B2 2/2020 Bluche
10,559,225 B1 2/2020 Tao et al.
10,559,299 B1 2/2020 Arel et al.
10,566,007 B2 2/2020 Fawaz et al.
10,568,032 B2 * 2/2020 Freeman ........... H04M 1/72409
10,572,885 B1 2/2020 Guo et al.
10,579,401 B2 3/2020 Dawes
10,580,409 B2 3/2020 Walker, II et al.
10,582,355 B1 3/2020 Lebeau et al.
10,585,957 B2 3/2020 Heck et al.
10,586,369 B1 3/2020 Roche et al.
10,599,449 B1 3/2020 Chatzipanagiotis et al.
10,628,483 B1 4/2020 Rao et al.
10,629,186 B1 4/2020 Slifka
10,630,795 B2 4/2020 Aoki et al.
10,642,934 B2 5/2020 Heck et al.
10,649,652 B2 5/2020 Sun
10,659,851 B2 5/2020 Lister et al.
10,671,428 B2 6/2020 Zeitlin
10,679,007 B2 6/2020 Jia et al.
10,679,608 B2 6/2020 Mixter et al.
10,684,099 B2 6/2020 Zaetterqvist
10,684,703 B2 6/2020 Hindi et al.
10,699,697 B2 6/2020 Qian et al.
10,706,841 B2 7/2020 Gruber et al.
10,721,190 B2 7/2020 Zhao et al.
10,732,708 B1 8/2020 Roche et al.
10,743,107 B1 8/2020 Yoshioka et al.
10,748,529 B1 8/2020 Milden
10,748,546 B2 8/2020 Kim et al.
10,754,658 B2 8/2020 Tamiya
10,755,032 B2 8/2020 Douglas et al.
10,757,499 B1 8/2020 Vautrin et al.
10,769,385 B2 9/2020 Evermann
10,776,933 B2 9/2020 Faulkner
10,778,839 B1 9/2020 Newstadt et al.
10,783,151 B1 9/2020 Bushkin et al.
10,783,883 B2 9/2020 Mixter et al.
10,789,945 B2 9/2020 Acero et al.
10,791,176 B2 9/2020 Phipps et al.
10,795,944 B2 10/2020 Brown et al.
10,796,100 B2 10/2020 Bangalore et al.
10,803,255 B2 10/2020 Dubyak et al.
10,811,013 B1 10/2020 Secker-Walker et al.
10,818,288 B2 10/2020 Garcia et al.
10,831,494 B2 11/2020 Grocutt et al.
10,832,031 B2 11/2020 Kienzle et al.
10,842,968 B1 11/2020 Kahn et al.
10,846,618 B2 11/2020 Ravi et al.
10,847,142 B2 11/2020 Newendorp et al.
10,860,629 B1 12/2020 Gangadharaiah et al.
10,861,483 B2 12/2020 Feinauer et al.
10,877,637 B1 12/2020 Antos et al.
10,880,668 B1 12/2020 Robinson et al.
10,885,277 B2 1/2021 Ravi et al.
10,892,996 B2 1/2021 Piersol
10,909,459 B2 2/2021 Tsatsin et al.
10,937,263 B1 3/2021 Tout et al.
10,937,410 B1 3/2021 Rule
10,942,702 B2 3/2021 Piersol et al.
10,942,703 B2 3/2021 Martel et al.
10,944,859 B2 3/2021 Weinstein et al.
10,957,310 B1 3/2021 Mohajer et al.
10,957,311 B2 3/2021 Solomon et al.
10,957,337 B2 3/2021 Chen et al.
10,970,660 B1 4/2021 Harris et al.
10,974,139 B2 4/2021 Feder et al.
10,978,056 B1 4/2021 Challa et al.
10,978,090 B2 4/2021 Binder et al.
10,983,971 B2 4/2021 Carvalho et al.
11,009,970 B2 5/2021 Hindi et al.
11,012,942 B2 * 5/2021 Freeman ........... H04M 1/72403
11,017,766 B2 5/2021 Chao et al.
11,037,565 B2 6/2021 Kudurshian et al.
11,038,934 B1 6/2021 Hansen et al.

(56) References Cited

U.S. PATENT DOCUMENTS 11,043,220 B1 6/2021 Hansen et al.
11,061,543 B1 7/2021 Blatz et al.
11,072,344 B2 7/2021 Provost et al.
11,076,039 B2 7/2021 Weinstein et al.
11,080,336 B2 8/2021 Van Dusen
11,086,858 B1 8/2021 Koukoumidis et al.
11,094,311 B2 8/2021 Candelore et al.
11,113,598 B2 9/2021 Socher et al.
11,132,172 B1 9/2021 Naik et al.
11,133,008 B2 9/2021 Piernot et al.
11,151,899 B2 10/2021 Pitschel et al.
11,169,660 B2 11/2021 Gupta et al.
11,181,988 B1 11/2021 Bellegarda et al.
11,183,193 B1 11/2021 Hansen et al.
11,183,205 B1 11/2021 Ebenezer et al.
11,200,027 B2 12/2021 Aggarwal et al.
11,204,787 B2 12/2021 Radebaugh et al.
11,205,192 B1 12/2021 Rivera et al.
11,210,477 B2 12/2021 Srinivasan et al.
11,217,255 B2 1/2022 Kim et al.
11,235,248 B1 2/2022 Orrino et al.
11,269,426 B2 3/2022 Jorasch et al.
11,269,678 B2 3/2022 Gruber et al.
11,283,631 B2 3/2022 Yan et al.
11,289,082 B1 3/2022 Lacy et al.
11,418,461 B1 8/2022 Elfardy et al.
11,487,932 B2 11/2022 Kramer
11,507,183 B2 11/2022 Manjunath et al.
11,671,920 B2 * 6/2023 Freeman ........... H04W 52/0254 455/563
2002/0059066 A1 5/2002 O'Hagan
2002/0091511 A1 7/2002 Hellwig et al.
2004/0106432 A1 6/2004 Kanamori et al.
2005/0027385 A1 2/2005 Yueh
2006/0252457 A1 * 11/2006 Schrager ............. H04M 1/6066 455/556.1
2007/0005370 A1 * 1/2007 Elshout ................... G10L 15/26 704/E15.045
2007/0079027 A1 4/2007 Marriott et al.
2008/0114604 A1 5/2008 Wei et al.
2008/0133956 A1 6/2008 Fadell
2008/0189110 A1 8/2008 Freeman et al.
2009/0154669 A1 6/2009 Wood et al.
2009/0300391 A1 12/2009 Jessup et al.
2010/0019834 A1 1/2010 Zerbe et al.
2011/0116480 A1 * 5/2011 Li ......................... H04W 28/04 370/332
2011/0295590 A1 12/2011 Lloyd et al.
2011/0301943 A1 * 12/2011 Patch ...................... G06F 3/167 704/9
2012/0035931 A1 2/2012 LeBeau et al.
2012/0310642 A1 12/2012 Cao et al.
2013/0002716 A1 1/2013 Walker et al.
2013/0005405 A1 1/2013 Prociw
2013/0006633 A1 1/2013 Grokop et al.
2013/0006637 A1 1/2013 Kanevsky et al.
2013/0006638 A1 1/2013 Lindahl
2013/0006957 A1 1/2013 Huang et al.
2013/0007240 A1 1/2013 Qiu et al.
2013/0007648 A1 1/2013 Gamon et al.
2013/0009858 A1 1/2013 Lacey
2013/0010575 A1 1/2013 He et al.
2013/0013313 A1 1/2013 Shechtman et al.
2013/0013319 A1 1/2013 Grant et al.
2013/0014026 A1 1/2013 Beringer et al.
2013/0014143 A1 1/2013 Bhatia et al.
2013/0018659 A1 1/2013 Chi
2013/0018863 A1 1/2013 Regan et al.
2013/0022189 A1 1/2013 Ganong et al.
2013/0024277 A1 1/2013 Tuchman et al.
2013/0024576 A1 1/2013 Dishneau et al.
2013/0027875 A1 1/2013 Zhu et al.
2013/0028404 A1 1/2013 Omalley et al.
2013/0030787 A1 1/2013 Cancedda et al.
2013/0030789 A1 1/2013 Dalce
2013/0030804 A1 1/2013 Zavaliagkos et al.
2013/0030815 A1 1/2013 Madhvanath et al.
2013/0030904 A1 1/2013 Aidasani et al.
2013/0030913 A1 1/2013 Zhu et al.
2013/0030955 A1 1/2013 David
2013/0031162 A1 1/2013 Willis et al.
2013/0031476 A1 1/2013 Coin et al.
2013/0176208 A1 1/2013 Tanaka et al.
2013/0033643 A1 2/2013 Kim et al.
2013/0035086 A1 2/2013 Chardon et al.
2013/0035942 A1 2/2013 Kim et al.
2013/0035961 A1 2/2013 Yegnanarayanan
2013/0035994 A1 2/2013 Pattan et al.
2013/0036200 A1 2/2013 Roberts et al.
2013/0038437 A1 2/2013 Talati et al.
2013/0038618 A1 2/2013 Urbach
2013/0041647 A1 2/2013 Ramerth et al.
2013/0041654 A1 2/2013 Walker et al.
2013/0041661 A1 2/2013 Lee et al.
2013/0041665 A1 2/2013 Jang et al.
2013/0041667 A1 2/2013 Longe et al.
2013/0041685 A1 2/2013 Yegnanarayanan
2013/0041968 A1 2/2013 Cohen et al.
2013/0046544 A1 2/2013 Kay et al.
2013/0047178 A1 2/2013 Moon et al.
2013/0050089 A1 2/2013 Neels et al.
2013/0054550 A1 2/2013 Bolohan
2013/0054609 A1 2/2013 Rajput et al.
2013/0054613 A1 2/2013 Bishop
2013/0054631 A1 2/2013 Govani et al.
2013/0054675 A1 2/2013 Jenkins et al.
2013/0054706 A1 2/2013 Graham et al.
2013/0054945 A1 2/2013 Free et al.
2013/0055099 A1 2/2013 Yao et al.
2013/0055147 A1 2/2013 Vasudev et al.
2013/0055201 A1 2/2013 No et al.
2013/0055402 A1 2/2013 Amit et al.
2013/0060571 A1 3/2013 Soemo et al.
2013/0060807 A1 3/2013 Rambhia et al.
2013/0061139 A1 3/2013 Mahkovec et al.
2013/0063611 A1 3/2013 Papakipos et al.
2013/0064104 A1 3/2013 Bekiares et al.
2013/0066832 A1 3/2013 Sheehan et al.
2013/0067307 A1 3/2013 Tian et al.
2013/0067312 A1 3/2013 Rose
2013/0067421 A1 3/2013 Osman et al.
2013/0069769 A1 3/2013 Pennington et al.
2013/0073286 A1 3/2013 Bastea-Forte et al.
2013/0073293 A1 3/2013 Jang et al.
2013/0073346 A1 3/2013 Chun et al.
2013/0073580 A1 3/2013 Mehanna et al.
2013/0073676 A1 3/2013 Cockcroft
2013/0077772 A1 3/2013 Lichorowic et al.
2013/0078930 A1 3/2013 Chen et al.
2013/0080152 A1 3/2013 Brun et al.
2013/0080162 A1 3/2013 Chang et al.
2013/0080167 A1 3/2013 Mozer
2013/0080177 A1 3/2013 Chen
2013/0080178 A1 3/2013 Kang et al.
2013/0080251 A1 3/2013 Dempski
2013/0080890 A1 3/2013 Krishnamurthi
2013/0080972 A1 3/2013 Moshrefi et al.
2013/0082967 A1 4/2013 Hillis et al.
2013/0084882 A1 4/2013 Khorashadi et al.
2013/0085755 A1 4/2013 Bringert et al.
2013/0085757 A1 4/2013 Nakamura et al.
2013/0085761 A1 4/2013 Bringert et al.
2013/0086609 A1 4/2013 Levy et al.
2013/0090921 A1 4/2013 Liu et al.
2013/0091090 A1 4/2013 Spivack et al.
2013/0095805 A1 4/2013 LeBeau et al.
2013/0096909 A1 4/2013 Brun et al.
2013/0096911 A1 4/2013 Beaufort et al.
2013/0096917 A1 4/2013 Edgar et al.
2013/0097566 A1 4/2013 Berglund
2013/0097682 A1 4/2013 Zeljkovic et al.
2013/0100017 A1 4/2013 Papakipos et al.
2013/0100268 A1 4/2013 Mihailidis et al.

(56) References Cited

U.S. PATENT DOCUMENTS

2013/0103383 A1 4/2013 Du et al.
2013/0103391 A1 4/2013 Millmore et al.
2013/0103405 A1 4/2013 Namba et al.
2013/0103698 A1 4/2013 Schlipf
2013/0106742 A1 5/2013 Lee et al.
2013/0107053 A1 5/2013 Ozaki
2013/0109412 A1 5/2013 Nguyen et al.
2013/0110505 A1 5/2013 Gruber et al.
2013/0110511 A1 5/2013 Spiegel et al.
2013/0110515 A1 5/2013 Guzzoni et al.
2013/0110518 A1 5/2013 Gruber et al.
2013/0110519 A1 5/2013 Cheyer et al.
2013/0110520 A1 5/2013 Cheyer et al.
2013/0110943 A1 5/2013 Menon et al.
2013/0111330 A1 5/2013 Staikos et al.
2013/0111348 A1 5/2013 Gruber et al.
2013/0111365 A1 5/2013 Chen et al.
2013/0111487 A1 5/2013 Cheyer et al.
2013/0111581 A1 5/2013 Griffin et al.
2013/0115927 A1 5/2013 Gruber et al.
2013/0117022 A1 5/2013 Chen et al.
2013/0124187 A1 5/2013 Qin
2013/0124189 A1 5/2013 Baldwin et al.
2013/0124672 A1 5/2013 Pan
2013/0125168 A1 5/2013 Agnihotri et al.
2013/0130669 A1 5/2013 Xiao et al.
2013/0132081 A1 5/2013 Ryu et al.
2013/0132084 A1 5/2013 Stonehocker et al.
2013/0132089 A1 5/2013 Fanty et al.
2013/0132094 A1 5/2013 Lim
2013/0132871 A1 5/2013 Zeng et al.
2013/0138440 A1 5/2013 Strope et al.
2013/0141551 A1 6/2013 Kim
2013/0142317 A1 6/2013 Reynolds
2013/0142345 A1 6/2013 Waldmann
2013/0144594 A1 6/2013 Bangalore et al.
2013/0144616 A1 6/2013 Bangalore
2013/0151258 A1 6/2013 Chandrasekar et al.
2013/0151339 A1 6/2013 Kim et al.
2013/0152092 A1 6/2013 Yadgar
2013/0154811 A1 6/2013 Ferren et al.
2013/0155948 A1 6/2013 Pinheiro et al.
2013/0156198 A1 6/2013 Kim et al.
2013/0157629 A1 6/2013 Lee et al.
2013/0158977 A1 6/2013 Senior
2013/0159847 A1 6/2013 Banke et al.
2013/0159861 A1 6/2013 Rottler et al.
2013/0165232 A1 6/2013 Nelson et al.
2013/0166278 A1 6/2013 James et al.
2013/0166303 A1 6/2013 Chang et al.
2013/0166332 A1 6/2013 Hammad
2013/0166442 A1 6/2013 Nakajima et al.
2013/0167242 A1 6/2013 Paliwal
2013/0170738 A1 7/2013 Capuozzo et al.
2013/0172022 A1 7/2013 Seymour et al.
2013/0173258 A1 7/2013 Liu et al.
2013/0173268 A1 7/2013 Weng et al.
2013/0173513 A1 7/2013 Chu et al.
2013/0173610 A1 7/2013 Hu et al.
2013/0173614 A1 7/2013 Ismalon
2013/0174034 A1 7/2013 Brown et al.
2013/0176147 A1 7/2013 Anderson et al.
2013/0176244 A1 7/2013 Yamamoto et al.
2013/0176592 A1 7/2013 Sasaki
2013/0177296 A1 7/2013 Geisner et al.
2013/0179168 A1 7/2013 Bae et al.
2013/0179172 A1 7/2013 Nakamura et al.
2013/0179440 A1 7/2013 Gordon
2013/0179806 A1 7/2013 Bastide et al.
2013/0183942 A1 7/2013 Novick et al.
2013/0183944 A1 7/2013 Mozer et al.
2013/0185059 A1 7/2013 Riccardi
2013/0185066 A1 7/2013 Tzirkel-Hancock et al.
2013/0185074 A1 7/2013 Gruber et al.
2013/0185081 A1 7/2013 Cheyer et al.
2013/0185336 A1 7/2013 Singh et al.
2013/0187850 A1 7/2013 Schulz et al.
2013/0187857 A1 7/2013 Griffin et al.
2013/0190021 A1 7/2013 Vieri et al.
2013/0191117 A1 7/2013 Atti et al.
2013/0191408 A1 7/2013 Volkert
2013/0197911 A1 8/2013 Wei et al.
2013/0197914 A1 8/2013 Yelvington et al.
2013/0198159 A1 8/2013 Hendry
2013/0198841 A1 8/2013 Poulson
2013/0204813 A1 8/2013 Master et al.
2013/0204897 A1 8/2013 McDougall
2013/0204967 A1 8/2013 Seo et al.
2013/0207898 A1 8/2013 Sullivan et al.
2013/0210410 A1 8/2013 Xu
2013/0210492 A1 8/2013 You et al.
2013/0212501 A1 8/2013 Anderson et al.
2013/0218553 A1 8/2013 Fujii et al.
2013/0218560 A1 8/2013 Hsiao et al.
2013/0218574 A1 8/2013 Falcon et al.
2013/0218899 A1 8/2013 Raghavan et al.
2013/0219333 A1 8/2013 Palwe et al.
2013/0222249 A1 8/2013 Pasquero et al.
2013/0223279 A1 8/2013 Tinnakornsrisuphap et al.
2013/0225128 A1 8/2013 Gomar
2013/0226580 A1 8/2013 Witt-Ehsani
2013/0226935 A1 8/2013 Bai et al.
2013/0226996 A1 8/2013 Itagaki et al.
2013/0231917 A1 9/2013 Naik
2013/0234947 A1 9/2013 Kristensson et al.
2013/0235987 A1 9/2013 Arroniz-Escobar
2013/0238312 A1 9/2013 Waibel
2013/0238326 A1 9/2013 Kim et al.
2013/0238334 A1 9/2013 Ma et al.
2013/0238540 A1 9/2013 O'Donoghue et al.
2013/0238647 A1 9/2013 Thompson
2013/0238729 A1 9/2013 Holzman et al.
2013/0244615 A1 9/2013 Miller
2013/0244633 A1 9/2013 Jacobs et al.
2013/0246048 A1 9/2013 Nagase et al.
2013/0246050 A1 9/2013 Yu et al.
2013/0246329 A1 9/2013 Pasquero et al.
2013/0246920 A1 9/2013 Fields et al.
2013/0247055 A1 9/2013 Berner et al.
2013/0253911 A1 9/2013 Petri et al.
2013/0253912 A1 9/2013 Medlock et al.
2013/0260739 A1 10/2013 Saino
2013/0262168 A1 10/2013 Makanawala et al.
2013/0268263 A1 10/2013 Park et al.
2013/0268956 A1 10/2013 Recco
2013/0275117 A1 10/2013 Winer
2013/0275136 A1 10/2013 Czahor
2013/0275138 A1 10/2013 Gruber et al.
2013/0275164 A1 10/2013 Gruber et al.
2013/0275199 A1 10/2013 Proctor, Jr. et al.
2013/0275625 A1 10/2013 Taivalsaari et al.
2013/0275875 A1 10/2013 Gruber et al.
2013/0275899 A1 10/2013 Schubert et al.
2013/0279724 A1 10/2013 Stafford et al.
2013/0282709 A1 10/2013 Zhu et al.
2013/0283168 A1 10/2013 Brown et al.
2013/0283199 A1 10/2013 Selig et al.
2013/0283283 A1 10/2013 Wang et al.
2013/0285913 A1 10/2013 Griffin et al.
2013/0288722 A1 10/2013 Ramanujam et al.
2013/0289991 A1 10/2013 Eshwar et al.
2013/0289993 A1 10/2013 Rao
2013/0289994 A1 10/2013 Newman et al.
2013/0290001 A1 10/2013 Yun et al.
2013/0290222 A1 10/2013 Gordo et al.
2013/0290905 A1 10/2013 Luvogt et al.
2013/0291015 A1 10/2013 Pan
2013/0297078 A1 11/2013 Kolavennu
2013/0297198 A1 11/2013 Velde et al.
2013/0297317 A1 11/2013 Lee et al.
2013/0297319 A1 11/2013 Kim
2013/0297348 A1 11/2013 Cardoza et al.
2013/0298139 A1 11/2013 Resnick et al.
2013/0300645 A1 11/2013 Fedorov

(56) References Cited

U.S. PATENT DOCUMENTS

2013/0300648 A1 11/2013 Kim et al.
2013/0303106 A1 11/2013 Martin
2013/0304476 A1 11/2013 Kim et al.
2013/0304479 A1 11/2013 Teller et al.
2013/0304758 A1 11/2013 Gruber et al.
2013/0304815 A1 11/2013 Puente et al.
2013/0305119 A1 11/2013 Kern et al.
2013/0307855 A1 11/2013 Lamb et al.
2013/0307997 A1 11/2013 O'Keefe et al.
2013/0308922 A1 11/2013 Sano et al.
2013/0311179 A1 11/2013 Wagner
2013/0311184 A1 11/2013 Badavne et al.
2013/0311487 A1 11/2013 Moore et al.
2013/0311997 A1 11/2013 Gruber et al.
2013/0315038 A1 11/2013 Ferren et al.
2013/0316679 A1 11/2013 Miller et al.
2013/0316746 A1 11/2013 Miller et al.
2013/0317921 A1 11/2013 Havas
2013/0318478 A1 11/2013 Ogura
2013/0321267 A1 12/2013 Bhatti et al.
2013/0322634 A1 12/2013 Bennett et al.
2013/0322665 A1 12/2013 Bennett et al.
2013/0325340 A1 12/2013 Forstall et al.
2013/0325436 A1 12/2013 Wang et al.
2013/0325443 A1 12/2013 Begeja et al.
2013/0325447 A1 12/2013 Levien et al.
2013/0325448 A1 12/2013 Levien et al.
2013/0325460 A1 12/2013 Kim et al.
2013/0325473 A1 12/2013 Larcher et al.
2013/0325480 A1 12/2013 Lee et al.
2013/0325481 A1 12/2013 Van Os et al.
2013/0325484 A1 12/2013 Chakladar et al.
2013/0325844 A1 12/2013 Plaisant
2013/0325967 A1 12/2013 Parks et al.
2013/0325970 A1 12/2013 Roberts et al.
2013/0325979 A1 12/2013 Mansfield et al.
2013/0326576 A1 12/2013 Zhang et al.
2013/0328809 A1 12/2013 Smith
2013/0329023 A1 12/2013 Suplee, III et al.
2013/0331127 A1 12/2013 Sabatelli et al.
2013/0332113 A1 12/2013 Piemonte et al.
2013/0332159 A1 12/2013 Federighi et al.
2013/0332162 A1 12/2013 Keen
2013/0332164 A1 12/2013 Nalk
2013/0332168 A1 12/2013 Kim et al.
2013/0332172 A1 12/2013 Prakash et al.
2013/0332400 A1 12/2013 González
2013/0332538 A1 12/2013 Clark et al.
2013/0332721 A1 12/2013 Chaudhri et al.
2013/0332886 A1 12/2013 Cranfill et al.
2013/0337771 A1 12/2013 Klein et al.
2013/0339028 A1 12/2013 Rosner et al.
2013/0339256 A1 12/2013 Shroff
2013/0339454 A1 12/2013 Walker et al.
2013/0339991 A1 12/2013 Ricci
2013/0342487 A1 12/2013 Jeon
2013/0342672 A1 12/2013 Gray et al.
2013/0343584 A1 12/2013 Bennett et al.
2013/0343721 A1 12/2013 Abecassis
2013/0346016 A1 12/2013 Suzuki et al.
2013/0346065 A1 12/2013 Davidson et al.
2013/0346068 A1 12/2013 Solem et al.
2013/0346347 A1 12/2013 Patterson et al.
2013/0346488 A1 12/2013 Lunt et al.
2013/0347018 A1 12/2013 Limp et al.
2013/0347029 A1 12/2013 Tang et al.
2013/0347102 A1 12/2013 Shi
2013/0347117 A1 12/2013 Parks et al.
2014/0001255 A1 1/2014 Anthoine
2014/0002338 A1 1/2014 Raffa et al.
2014/0006012 A1 1/2014 Zhou et al.
2014/0006025 A1 1/2014 Krishnan et al.
2014/0006027 A1 1/2014 Kim et al.
2014/0006028 A1 1/2014 Hu
2014/0006030 A1 1/2014 Fleizach et al.
2014/0006153 A1 1/2014 Thangam et al.
2014/0006191 A1 1/2014 Shankar et al.
2014/0006483 A1 1/2014 Garmark et al.
2014/0006496 A1 1/2014 Dearman et al.
2014/0006562 A1 1/2014 Handa et al.
2014/0006947 A1 1/2014 Garmark et al.
2014/0006951 A1 1/2014 Hunter
2014/0006955 A1 1/2014 Greenzeiger et al.
2014/0008163 A1 1/2014 Mikonaho et al.
2014/0012574 A1 1/2014 Pasupalak et al.
2014/0012575 A1 1/2014 Ganong et al.
2014/0012580 A1 1/2014 Ganong, III et al.
2014/0012586 A1 1/2014 Rubin et al.
2014/0012587 A1 1/2014 Park
2014/0013336 A1 1/2014 Yang
2014/0019116 A1 1/2014 Lundberg et al.
2014/0019133 A1 1/2014 Bao et al.
2014/0019460 A1 1/2014 Sambrani et al.
2014/0019873 A1 1/2014 Gupta et al.
2014/0026037 A1 1/2014 Garb et al.
2014/0028029 A1 1/2014 Jochman
2014/0028477 A1 1/2014 Michalske
2014/0028603 A1 1/2014 Xie et al.
2014/0028735 A1 1/2014 Williams et al.
2014/0032453 A1 1/2014 Eustice et al.
2014/0032678 A1 1/2014 Koukoumidis et al.
2014/0033071 A1 1/2014 Gruber et al.
2014/0035823 A1 2/2014 Khoe et al.
2014/0037075 A1 2/2014 Bouzid et al.
2014/0039888 A1 2/2014 Taubman et al.
2014/0039893 A1 2/2014 Weiner et al.
2014/0039894 A1 2/2014 Shostak
2014/0040228 A1 2/2014 Kritt et al.
2014/0040274 A1 2/2014 Aravamudan et al.
2014/0040748 A1 2/2014 Lemay et al.
2014/0040754 A1 2/2014 Donelli
2014/0040801 A1 2/2014 Patel et al.
2014/0040905 A1 2/2014 Tsunoda et al.
2014/0040918 A1 2/2014 Li
2014/0040961 A1 2/2014 Green et al.
2014/0046922 A1 2/2014 Crook et al.
2014/0046934 A1 2/2014 Zhou et al.
2014/0047001 A1 2/2014 Phillips et al.
2014/0051399 A1 2/2014 Walker
2014/0052451 A1 2/2014 Cheong et al.
2014/0052680 A1 2/2014 Nitz et al.
2014/0052791 A1 2/2014 Chakra et al.
2014/0053082 A1 2/2014 Park
2014/0053101 A1 2/2014 Buehler et al.
2014/0053210 A1 2/2014 Cheong et al.
2014/0057610 A1* 2/2014 Olincy .................... H04W 4/16 455/414.1
2014/0058732 A1 2/2014 Labsky et al.
2014/0059030 A1 2/2014 Hakkani-Tur et al.
2014/0059423 A1 2/2014 Gorga et al.
2014/0067361 A1 3/2014 Nikoulina et al.
2014/0067371 A1 3/2014 Liensberger
2014/0067402 A1 3/2014 Kim
2014/0067738 A1 3/2014 Kingsbury
2014/0067740 A1 3/2014 Solari
2014/0068751 A1 3/2014 Last
2014/0071241 A1 3/2014 Yang et al.
2014/0074454 A1 3/2014 Brown et al.
2014/0074466 A1 3/2014 Sharifi et al.
2014/0074470 A1 3/2014 Jansche et al.
2014/0074472 A1 3/2014 Lin et al.
2014/0074482 A1 3/2014 Ohno
2014/0074483 A1 3/2014 Van Os
2014/0074589 A1 3/2014 Nielsen et al.
2014/0074815 A1 3/2014 Plimton
2014/0074846 A1 3/2014 Moss et al.
2014/0075453 A1 3/2014 Bellessort et al.
2014/0078065 A1 3/2014 Akkok
2014/0079195 A1 3/2014 Srivastava et al.
2014/0080410 A1 3/2014 Jung et al.
2014/0080428 A1 3/2014 Rhoads et al.
2014/0081619 A1 3/2014 Solntseva et al.
2014/0081633 A1 3/2014 Badaskar
2014/0081635 A1 3/2014 Yanagihara

(56) References Cited

U.S. PATENT DOCUMENTS

2014/0081829 A1 3/2014 Milne
2014/0081941 A1 3/2014 Bai et al.
2014/0082500 A1 3/2014 Wilensky et al.
2014/0082501 A1 3/2014 Bae et al.
2014/0082545 A1 3/2014 Zhai et al.
2014/0082715 A1 3/2014 Grajek et al.
2014/0086458 A1 3/2014 Rogers
2014/0087711 A1 3/2014 Geyer et al.
2014/0088952 A1 3/2014 Fife et al.
2014/0088961 A1 3/2014 Woodward et al.
2014/0088964 A1 3/2014 Bellegarda
2014/0088970 A1 3/2014 Kang
2014/0092007 A1 4/2014 Kim et al.
2014/0095171 A1 4/2014 Lynch et al.
2014/0095172 A1 4/2014 Cabaco et al.
2014/0095173 A1 4/2014 Lynch et al.
2014/0095432 A1 4/2014 Trumbull et al.
2014/0095601 A1 4/2014 Abuelsaad et al.
2014/0095965 A1 4/2014 Li
2014/0096077 A1 4/2014 Jacob et al.
2014/0096209 A1 4/2014 Saraf et al.
2014/0098247 A1 4/2014 Rao et al.
2014/0100847 A1 4/2014 Ishii et al.
2014/0101127 A1 4/2014 Simhon et al.
2014/0104175 A1 4/2014 Ouyang et al.
2014/0108017 A1 4/2014 Mason et al.
2014/0108357 A1 4/2014 Procops et al.
2014/0108391 A1 4/2014 Volkert
2014/0108792 A1 4/2014 Borzycki et al.
2014/0112556 A1 4/2014 Kalinli-Akbacak
2014/0114554 A1 4/2014 Lagassey
2014/0115062 A1 4/2014 Liu et al.
2014/0115114 A1 4/2014 Garmark et al.
2014/0118155 A1 5/2014 Bowers et al.
2014/0118624 A1 5/2014 Jang et al.
2014/0120961 A1 5/2014 Buck
2014/0122057 A1 5/2014 Chelba et al.
2014/0122059 A1 5/2014 Patel et al.
2014/0122085 A1 5/2014 Piety et al.
2014/0122086 A1 5/2014 Kapur et al.
2014/0122136 A1 5/2014 Jayanthi
2014/0122153 A1 5/2014 Truitt
2014/0122589 A1 5/2014 Fyke et al.
2014/0123022 A1 5/2014 Lee et al.
2014/0128021 A1 5/2014 Walker et al.
2014/0129006 A1 5/2014 Chen et al.
2014/0129226 A1 5/2014 Lee et al.
2014/0132935 A1 5/2014 Kim et al.
2014/0134983 A1 5/2014 Jung et al.
2014/0135036 A1 5/2014 Bonanni et al.
2014/0136013 A1 5/2014 Wolverton et al.
2014/0136187 A1 5/2014 Wolverton et al.
2014/0136195 A1 5/2014 Abdossalami et al.
2014/0136212 A1 5/2014 Kwon et al.
2014/0136946 A1 5/2014 Matas
2014/0136987 A1 5/2014 Rodriguez
2014/0142922 A1 5/2014 Liang et al.
2014/0142923 A1 5/2014 Jones et al.
2014/0142934 A1 5/2014 Kim
2014/0142935 A1 5/2014 Lindahl et al.
2014/0142953 A1 5/2014 Kim et al.
2014/0143550 A1 5/2014 Ganong, III et al.
2014/0143721 A1 5/2014 Suzuki et al.
2014/0143784 A1 5/2014 Mistry et al.
2014/0146200 A1 5/2014 Scott et al.
2014/0148209 A1 5/2014 Weng et al.
2014/0149118 A1 5/2014 Lee et al.
2014/0152577 A1 6/2014 Yuen et al.
2014/0153709 A1 6/2014 Byrd et al.
2014/0155031 A1 6/2014 Lee et al.
2014/0156262 A1 6/2014 Yuen et al.
2014/0156269 A1 6/2014 Lee et al.
2014/0156279 A1 6/2014 Okamoto et al.
2014/0156564 A1 6/2014 Knight et al.
2014/0157319 A1 6/2014 Kimura et al.
2014/0157422 A1 6/2014 Livshits et al.
2014/0163751 A1 6/2014 Davis et al.
2014/0163951 A1 6/2014 Nikoulina et al.
2014/0163953 A1 6/2014 Parikh
2014/0163954 A1 6/2014 Joshi et al.
2014/0163962 A1 6/2014 Castelli et al.
2014/0163976 A1 6/2014 Park et al.
2014/0163977 A1 6/2014 Hoffmeister et al.
2014/0163978 A1 6/2014 Basye et al.
2014/0163981 A1 6/2014 Cook et al.
2014/0163995 A1 6/2014 Burns et al.
2014/0164305 A1 6/2014 Lynch et al.
2014/0164312 A1 6/2014 Lynch et al.
2014/0164476 A1 6/2014 Thomson
2014/0164508 A1 6/2014 Lynch et al.
2014/0164532 A1 6/2014 Lynch et al.
2014/0164533 A1 6/2014 Lynch et al.
2014/0164953 A1 6/2014 Lynch et al.
2014/0165006 A1 6/2014 Chaudhri et al.
2014/0169795 A1 6/2014 Clough
2014/0171064 A1 6/2014 Das
2014/0172412 A1 6/2014 Viegas et al.
2014/0172878 A1 6/2014 Clark et al.
2014/0173445 A1 6/2014 Grassiotto
2014/0173460 A1 6/2014 Kim
2014/0176814 A1 6/2014 Ahn
2014/0179295 A1 6/2014 Luebbers et al.
2014/0180499 A1 6/2014 Cooper et al.
2014/0180689 A1 6/2014 Kim
2014/0180697 A1 6/2014 Torok et al.
2014/0181123 A1 6/2014 Tuffet Blaise et al.
2014/0181703 A1 6/2014 Sullivan et al.
2014/0181715 A1 6/2014 Axelrod et al.
2014/0181741 A1 6/2014 Apacible et al.
2014/0181865 A1 6/2014 Koganei
2014/0188335 A1 7/2014 Madhok et al.
2014/0188460 A1 7/2014 Ouyang et al.
2014/0188477 A1 7/2014 Zhang
2014/0188478 A1 7/2014 Zhang
2014/0188485 A1 7/2014 Kim et al.
2014/0188835 A1 7/2014 Zhang et al.
2014/0195226 A1 7/2014 Yun et al.
2014/0195230 A1 7/2014 Han et al.
2014/0195233 A1 7/2014 Bapat et al.
2014/0195244 A1 7/2014 Cha et al.
2014/0195251 A1 7/2014 Zeinstra et al.
2014/0195252 A1 7/2014 Gruber et al.
2014/0198048 A1 7/2014 Unruh et al.
2014/0200891 A1 7/2014 Larcheveque et al.
2014/0201655 A1 7/2014 Mahaffey et al.
2014/0203939 A1 7/2014 Harrington et al.
2014/0205076 A1 7/2014 Kumar et al.
2014/0207439 A1 7/2014 Venkatapathy et al.
2014/0207446 A1 7/2014 Klein et al.
2014/0207447 A1 7/2014 Jiang et al.
2014/0207466 A1 7/2014 Smadi
2014/0207468 A1 7/2014 Bartnik
2014/0207582 A1 7/2014 Flinn et al.
2014/0211944 A1 7/2014 Hayward et al.
2014/0214429 A1 7/2014 Pantel
2014/0214537 A1 7/2014 Yoo et al.
2014/0215367 A1 7/2014 Kim et al.
2014/0215513 A1 7/2014 Ramer et al.
2014/0218372 A1 8/2014 Missig et al.
2014/0222422 A1 8/2014 Sarikaya et al.
2014/0222435 A1 8/2014 Li et al.
2014/0222436 A1 8/2014 Binder et al.
2014/0222678 A1 8/2014 Sheets et al.
2014/0222967 A1 8/2014 Harrang et al.
2014/0223377 A1 8/2014 Shaw et al.
2014/0223481 A1 8/2014 Fundament
2014/0226503 A1 8/2014 Cooper et al.
2014/0229158 A1 8/2014 Zweig et al.
2014/0229184 A1 8/2014 Shires
2014/0230055 A1 8/2014 Boehl
2014/0232570 A1 8/2014 Skinder et al.
2014/0232656 A1 8/2014 Pasquero et al.
2014/0236595 A1 8/2014 Gray
2014/0236986 A1 8/2014 Guzman

(56) References Cited

U.S. PATENT DOCUMENTS

2014/0237042 A1 8/2014 Ahmed et al.
2014/0237366 A1 8/2014 Poulos et al.
2014/0244248 A1 8/2014 Arisoy et al.
2014/0244249 A1 8/2014 Mohamed et al.
2014/0244254 A1 8/2014 Ju et al.
2014/0244257 A1 8/2014 Colibro et al.
2014/0244258 A1 8/2014 Song et al.
2014/0244263 A1 8/2014 Pontual et al.
2014/0244266 A1 8/2014 Brown et al.
2014/0244268 A1 8/2014 Abdelsamie et al.
2014/0244270 A1 8/2014 Han et al.
2014/0244271 A1 8/2014 Lindahl
2014/0244712 A1 8/2014 Walters et al.
2014/0245140 A1 8/2014 Brown et al.
2014/0247383 A1 9/2014 Dave et al.
2014/0247926 A1 9/2014 Gainsboro et al.
2014/0249812 A1 9/2014 Bou-Ghazale et al.
2014/0249816 A1 9/2014 Pickering et al.
2014/0249817 A1 9/2014 Hart et al.
2014/0249820 A1 9/2014 Hsu et al.
2014/0249821 A1 9/2014 Kennewick et al.
2014/0250046 A1 9/2014 Winn et al.
2014/0253455 A1 9/2014 Mauro et al.
2014/0257809 A1 9/2014 Goel et al.
2014/0257815 A1 9/2014 Zhao et al.
2014/0257902 A1 9/2014 Moore et al.
2014/0258324 A1 9/2014 Mauro et al.
2014/0258357 A1 9/2014 Singh et al.
2014/0258857 A1 9/2014 Dykstra-Erickson et al.
2014/0258905 A1 9/2014 Lee et al.
2014/0267022 A1 9/2014 Kim
2014/0267599 A1 9/2014 Drouin et al.
2014/0267933 A1 9/2014 Young
2014/0272821 A1 9/2014 Pitschel et al.
2014/0273979 A1 9/2014 Van Os et al.
2014/0274005 A1 9/2014 Luna et al.
2014/0274203 A1 9/2014 Ganong, III et al.
2014/0274211 A1 9/2014 Sejnoha et al.
2014/0278051 A1 9/2014 Mcgavran et al.
2014/0278343 A1 9/2014 Tran
2014/0278349 A1 9/2014 Grieves et al.
2014/0278379 A1 9/2014 Coccaro et al.
2014/0278390 A1 9/2014 Kingsbury et al.
2014/0278391 A1 9/2014 Braho et al.
2014/0278394 A1 9/2014 Bastyr et al.
2014/0278406 A1 9/2014 Tsumura et al.
2014/0278413 A1 9/2014 Pitschel et al.
2014/0278426 A1 9/2014 Jost et al.
2014/0278429 A1 9/2014 Ganong, III
2014/0278435 A1 9/2014 Ganong, III et al.
2014/0278436 A1 9/2014 Khanna et al.
2014/0278438 A1 9/2014 Hart et al.
2014/0278443 A1 9/2014 Gunn et al.
2014/0278444 A1 9/2014 Larson et al.
2014/0278513 A1 9/2014 Prakash et al.
2014/0279622 A1 9/2014 Lamoureux et al.
2014/0279739 A1 9/2014 Elkington et al.
2014/0279787 A1 9/2014 Cheng et al.
2014/0280072 A1 9/2014 Coleman
2014/0280107 A1 9/2014 Heymans et al.
2014/0280138 A1 9/2014 Li et al.
2014/0280292 A1 9/2014 Skinder
2014/0280353 A1 9/2014 Delaney et al.
2014/0280450 A1 9/2014 Luna
2014/0280757 A1 9/2014 Tran
2014/0281944 A1 9/2014 Winer
2014/0281983 A1 9/2014 Xian et al.
2014/0281997 A1 9/2014 Fleizach et al.
2014/0282003 A1 9/2014 Gruber et al.
2014/0282007 A1 9/2014 Fleizach
2014/0282045 A1 9/2014 Ayanam et al.
2014/0282178 A1 9/2014 Borzello et al.
2014/0282201 A1 9/2014 Pasquero et al.
2014/0282203 A1 9/2014 Pasquero et al.
2014/0282559 A1 9/2014 Verduzco et al.
2014/0282586 A1 9/2014 Shear et al.
2014/0282743 A1 9/2014 Howard et al.
2014/0288990 A1 9/2014 Moore et al.
2014/0289508 A1 9/2014 Wang
2014/0297267 A1 10/2014 Spencer et al.
2014/0297281 A1 10/2014 Togawa et al.
2014/0297284 A1 10/2014 Gruber et al.
2014/0297288 A1 10/2014 Yu et al.
2014/0298395 A1 10/2014 Yang et al.
2014/0304086 A1 10/2014 Dasdan et al.
2014/0304605 A1 10/2014 Ohmura et al.
2014/0309990 A1 10/2014 Gandrabur et al.
2014/0309996 A1 10/2014 Zhang
2014/0310001 A1 10/2014 Kalns et al.
2014/0310002 A1 10/2014 Nitz et al.
2014/0310348 A1 10/2014 Keskitalo et al.
2014/0310365 A1 10/2014 Sample et al.
2014/0310595 A1 10/2014 Acharya et al.
2014/0313007 A1 10/2014 Harding
2014/0315492 A1 10/2014 Woods
2014/0316585 A1 10/2014 Boesveld et al.
2014/0317030 A1 10/2014 Shen et al.
2014/0317502 A1 10/2014 Brown et al.
2014/0324429 A1 10/2014 Weilhammer et al.
2014/0324884 A1 10/2014 Lindahl et al.
2014/0330560 A1 11/2014 Venkatesha et al.
2014/0330569 A1 11/2014 Kolavennu et al.
2014/0330951 A1 11/2014 Sukoff et al.
2014/0335823 A1 11/2014 Heredia et al.
2014/0337037 A1 11/2014 Chi
2014/0337048 A1 11/2014 Brown et al.
2014/0337266 A1 11/2014 Wolverton et al.
2014/0337370 A1 11/2014 Aravamudan et al.
2014/0337371 A1 11/2014 Li
2014/0337438 A1 11/2014 Govande et al.
2014/0337621 A1 11/2014 Nakhimov
2014/0337751 A1 11/2014 Lim et al.
2014/0337814 A1 11/2014 Kalns et al.
2014/0341217 A1 11/2014 Eisner et al.
2014/0342762 A1 11/2014 Hajdu et al.
2014/0343834 A1 11/2014 Demerchant et al.
2014/0343943 A1 11/2014 Al-telmissani
2014/0343946 A1 11/2014 Torok et al.
2014/0344205 A1 11/2014 Luna et al.
2014/0344627 A1 11/2014 Schaub et al.
2014/0344687 A1 11/2014 Durham et al.
2014/0347181 A1 11/2014 Luna et al.
2014/0350847 A1 11/2014 Ichinokawa
2014/0350924 A1 11/2014 Zurek et al.
2014/0350933 A1 11/2014 Bak et al.
2014/0351741 A1 11/2014 Medlock et al.
2014/0351760 A1 11/2014 Skory et al.
2014/0358519 A1 12/2014 Mirkin et al.
2014/0358521 A1 12/2014 Mikutel et al.
2014/0358523 A1 12/2014 Sheth et al.
2014/0358549 A1 12/2014 O'connor et al.
2014/0359456 A1 12/2014 Thiele et al.
2014/0359637 A1 12/2014 Yan
2014/0359709 A1 12/2014 Nassar et al.
2014/0361973 A1 12/2014 Raux et al.
2014/0363074 A1 12/2014 Dolfing et al.
2014/0364149 A1 12/2014 Marti et al.
2014/0365209 A1 12/2014 Evermann
2014/0365214 A1 12/2014 Bayley
2014/0365216 A1 12/2014 Gruber et al.
2014/0365226 A1 12/2014 Sinha
2014/0365227 A1 12/2014 Cash et al.
2014/0365407 A1 12/2014 Brown et al.
2014/0365505 A1 12/2014 Clark et al.
2014/0365880 A1 12/2014 Bellegarda
2014/0365885 A1 12/2014 Carson et al.
2014/0365895 A1 12/2014 Magahern et al.
2014/0365922 A1 12/2014 Yang
2014/0365945 A1 12/2014 Karunamuni et al.
2014/0370817 A1 12/2014 Luna
2014/0370841 A1 12/2014 Roberts et al.
2014/0372112 A1 12/2014 Xue et al.
2014/0372356 A1 12/2014 Bilal et al.
2014/0372468 A1 12/2014 Collins et al.

(56) References Cited

U.S. PATENT DOCUMENTS

2014/0372931 A1 12/2014 Zhai et al.
2014/0379326 A1 12/2014 Sarikaya et al.
2014/0379334 A1 12/2014 Fry
2014/0379338 A1 12/2014 Fry
2014/0379341 A1 12/2014 Seo et al.
2014/0379798 A1 12/2014 Bunner et al.
2014/0380214 A1 12/2014 Huang et al.
2014/0380285 A1 12/2014 Gabel et al.
2015/0003797 A1 1/2015 Schmidt
2015/0004958 A1 1/2015 Wang et al.
2015/0005009 A1 1/2015 Tomkins et al.
2015/0006147 A1 1/2015 Schmidt
2015/0006148 A1 1/2015 Goldszmit et al.
2015/0006157 A1 1/2015 Silva et al.
2015/0006167 A1 1/2015 Kato et al.
2015/0006176 A1 1/2015 Pogue et al.
2015/0006178 A1 1/2015 Peng et al.
2015/0006184 A1 1/2015 Marti et al.
2015/0006199 A1 1/2015 Snider et al.
2015/0012271 A1 1/2015 Peng et al.
2015/0012862 A1 1/2015 Ikeda et al.
2015/0019219 A1 1/2015 Tzirkel-Hancock et al.
2015/0019221 A1 1/2015 Lee et al.
2015/0019445 A1 1/2015 Glass et al.
2015/0019944 A1 1/2015 Kalgi
2015/0019954 A1 1/2015 Dalal et al.
2015/0019974 A1 1/2015 Doi et al.
2015/0025405 A1 1/2015 Vairavan et al.
2015/0025890 A1 1/2015 Jagatheesan et al.
2015/0026620 A1 1/2015 Kwon et al.
2015/0027178 A1 1/2015 Scalisi
2015/0031416 A1 1/2015 Labowicz et al.
2015/0032443 A1 1/2015 Karov et al.
2015/0032457 A1 1/2015 Koo et al.
2015/0033130 A1 1/2015 Scheessele
2015/0033219 A1 1/2015 Breiner et al.
2015/0033275 A1 1/2015 Natani et al.
2015/0034855 A1 2/2015 Shen
2015/0038161 A1 2/2015 Jakobson et al.
2015/0039292 A1 2/2015 Suleman et al.
2015/0039295 A1 2/2015 Soschen
2015/0039299 A1 2/2015 Weinstein et al.
2015/0039305 A1 2/2015 Huang
2015/0039606 A1 2/2015 Salaka et al.
2015/0040012 A1 2/2015 Faaborg et al.
2015/0042640 A1 2/2015 Algreatly
2015/0045003 A1 2/2015 Vora et al.
2015/0045007 A1 2/2015 Cash
2015/0045068 A1 2/2015 Soffer et al.
2015/0046375 A1 2/2015 Mandel et al.
2015/0046434 A1 2/2015 Lim et al.
2015/0046537 A1 2/2015 Rakib
2015/0046828 A1 2/2015 Desai et al.
2015/0049884 A1 2/2015 Ye
2015/0050633 A1 2/2015 Christmas et al.
2015/0050923 A1 2/2015 Tu et al.
2015/0051754 A1 2/2015 Kwon et al.
2015/0051901 A1 2/2015 Stonehouse et al.
2015/0053779 A1 2/2015 Adamek et al.
2015/0053781 A1 2/2015 Nelson et al.
2015/0055879 A1 2/2015 Yang
2015/0058013 A1 2/2015 Pakhomov et al.
2015/0058018 A1 2/2015 Georges et al.
2015/0058720 A1 2/2015 Smadja et al.
2015/0058785 A1 2/2015 Ookawara
2015/0065149 A1 3/2015 Russell et al.
2015/0065200 A1 3/2015 Namgung et al.
2015/0066473 A1 3/2015 Jeong et al.
2015/0066479 A1 3/2015 Pasupalak et al.
2015/0066494 A1 3/2015 Salvador et al.
2015/0066496 A1 3/2015 Deoras et al.
2015/0066506 A1 3/2015 Romano et al.
2015/0066516 A1 3/2015 Nishikawa et al.
2015/0066817 A1 3/2015 Slayton et al.
2015/0067485 A1 3/2015 Kim et al.
2015/0067819 A1 3/2015 Shribman et al.
2015/0067822 A1 3/2015 Randall
2015/0071121 A1 3/2015 Patil et al.
2015/0073788 A1 3/2015 Sak et al.
2015/0073804 A1 3/2015 Senior et al.
2015/0074524 A1 3/2015 Nicholson et al.
2015/0074615 A1 3/2015 Han et al.
2015/0081295 A1 3/2015 Yun et al.
2015/0082180 A1 3/2015 Ames et al.
2015/0082229 A1 3/2015 Ouyang et al.
2015/0086174 A1 3/2015 Abecassis et al.
2015/0088511 A1 3/2015 Bharadwaj et al.
2015/0088514 A1 3/2015 Typrin
2015/0088518 A1 3/2015 Kim et al.
2015/0088522 A1 3/2015 Hendrickson et al.
2015/0088523 A1 3/2015 Schuster
2015/0088998 A1 3/2015 Isensee et al.
2015/0092520 A1 4/2015 Robison et al.
2015/0094834 A1 4/2015 Vega et al.
2015/0095031 A1 4/2015 Conkie et al.
2015/0095159 A1 4/2015 Kennewick et al.
2015/0095268 A1 4/2015 Greenzeiger et al.
2015/0095278 A1 4/2015 Flinn et al.
2015/0095310 A1 4/2015 Beaurepaire
2015/0100144 A1 4/2015 Lee et al.
2015/0100313 A1 4/2015 Sharma
2015/0100316 A1 4/2015 Williams et al.
2015/0100537 A1 4/2015 Grieves et al.
2015/0100983 A1 4/2015 Pan
2015/0106061 A1 4/2015 Yang et al.
2015/0106085 A1 4/2015 Lindahl
2015/0106093 A1 4/2015 Weeks et al.
2015/0106737 A1 4/2015 Montoy-Wilson et al.
2015/0112684 A1 4/2015 Scheffer et al.
2015/0113407 A1 4/2015 Hoffert et al.
2015/0113435 A1 4/2015 Phillips
2015/0113454 A1 4/2015 McLaughlin
2015/0120296 A1 4/2015 Stern et al.
2015/0120641 A1 4/2015 Soon-Shiong et al.
2015/0120723 A1 4/2015 Deshmukh et al.
2015/0121216 A1 4/2015 Brown et al.
2015/0121227 A1 4/2015 Peng
2015/0123898 A1 5/2015 Kim et al.
2015/0127336 A1 5/2015 Lei et al.
2015/0127337 A1 5/2015 Heigold et al.
2015/0127348 A1 5/2015 Follis
2015/0127350 A1 5/2015 Agiomyrgiannakis
2015/0128058 A1 5/2015 Anajwala
2015/0130716 A1 5/2015 Sridharan et al.
2015/0133049 A1 5/2015 Lee et al.
2015/0133109 A1 5/2015 Freeman et al.
2015/0134318 A1 5/2015 Cuthbert et al.
2015/0134322 A1 5/2015 Cuthbert et al.
2015/0134323 A1 5/2015 Cuthbert et al.
2015/0134334 A1 5/2015 Sachidanandam et al.
2015/0135085 A1 5/2015 Shoham et al.
2015/0135123 A1 5/2015 Carr et al.
2015/0140934 A1 5/2015 Abdurrahman et al.
2015/0140990 A1 5/2015 Kim et al.
2015/0141150 A1 5/2015 Zha
2015/0142420 A1 5/2015 Sarikaya et al.
2015/0142438 A1 5/2015 Dai et al.
2015/0142440 A1 5/2015 Parkinson et al.
2015/0142447 A1 5/2015 Kennewick et al.
2015/0142851 A1 5/2015 Gupta et al.
2015/0143419 A1 5/2015 Bhagwat et al.
2015/0148013 A1 5/2015 Baldwin et al.
2015/0149146 A1 5/2015 Abramovitz et al.
2015/0149177 A1 5/2015 Kalns et al.
2015/0149182 A1 5/2015 Kalns et al.
2015/0149354 A1 5/2015 McCoy
2015/0149469 A1 5/2015 Xu et al.
2015/0149899 A1 5/2015 Bernstein et al.
2015/0149964 A1 5/2015 Bernstein et al.
2015/0154001 A1 6/2015 Knox et al.
2015/0154185 A1 6/2015 Waibel
2015/0154976 A1 6/2015 Mutagi
2015/0160635 A1 6/2015 Schofield et al.
2015/0160855 A1 6/2015 Bi

(56) References Cited

U.S. PATENT DOCUMENTS

2015/0161108 A1 6/2015 Back
2015/0161291 A1 6/2015 Gur et al.
2015/0161370 A1 6/2015 North et al.
2015/0161521 A1 6/2015 Shah et al.
2015/0161989 A1 6/2015 Hsu et al.
2015/0161997 A1 6/2015 Wetsel et al.
2015/0162000 A1 6/2015 Di Censo et al.
2015/0162001 A1 6/2015 Kar et al.
2015/0162006 A1 6/2015 Kummer
2015/0163558 A1 6/2015 Wheatley
2015/0169081 A1 6/2015 Neels et al.
2015/0169195 A1 6/2015 Choi
2015/0169284 A1 6/2015 Quast et al.
2015/0169336 A1 6/2015 Harper et al.
2015/0169696 A1 6/2015 Krishnappa et al.
2015/0170073 A1 6/2015 Baker
2015/0170664 A1 6/2015 Doherty et al.
2015/0172262 A1 6/2015 Ortiz, Jr. et al.
2015/0172463 A1 6/2015 Quast et al.
2015/0177945 A1 6/2015 Sengupta et al.
2015/0178388 A1 6/2015 Winnemoeller et al.
2015/0178785 A1 6/2015 Salonen
2015/0179168 A1 6/2015 Hakkani-tur et al.
2015/0179176 A1 6/2015 Ryu et al.
2015/0181285 A1 6/2015 Zhang et al.
2015/0185718 A1 7/2015 Tappan et al.
2015/0185964 A1 7/2015 Stout
2015/0185993 A1 7/2015 Wheatley et al.
2015/0185996 A1 7/2015 Brown et al.
2015/0186012 A1 7/2015 Coleman et al.
2015/0186110 A1 7/2015 Kannan
2015/0186154 A1 7/2015 Brown et al.
2015/0186155 A1 7/2015 Brown et al.
2015/0186156 A1 7/2015 Brown et al.
2015/0186351 A1 7/2015 Hicks et al.
2015/0186538 A1 7/2015 Yan et al.
2015/0186783 A1 7/2015 Byrne et al.
2015/0186892 A1 7/2015 Zhang et al.
2015/0187355 A1 7/2015 Parkinson et al.
2015/0187369 A1 7/2015 Dadu et al.
2015/0189362 A1 7/2015 Lee et al.
2015/0193379 A1 7/2015 Mehta
2015/0193391 A1 7/2015 Khvostichenko et al.
2015/0193392 A1 7/2015 Greenblatt et al.
2015/0194152 A1 7/2015 Katuri et al.
2015/0194165 A1 7/2015 Faaborg et al.
2015/0195379 A1 7/2015 Zhang et al.
2015/0195606 A1 7/2015 McDevitt
2015/0199077 A1 7/2015 Zuger et al.
2015/0199960 A1 7/2015 Huo et al.
2015/0199965 A1 7/2015 Leak et al.
2015/0199967 A1 7/2015 Reddy et al.
2015/0200879 A1 7/2015 Wu et al.
2015/0201064 A1 7/2015 Bells et al.
2015/0201077 A1 7/2015 Konig et al.
2015/0205425 A1 7/2015 Kuscher et al.
2015/0205568 A1 7/2015 Matsuoka
2015/0205632 A1 7/2015 Gaster
2015/0205858 A1 7/2015 Xie et al.
2015/0206529 A1 7/2015 Kwon et al.
2015/0208226 A1 7/2015 Kuusilinna et al.
2015/0212791 A1 7/2015 Kumar et al.
2015/0213140 A1 7/2015 Volkert
2015/0213796 A1 7/2015 Waltermann et al.
2015/0215258 A1 7/2015 Nowakowski et al.
2015/0215350 A1 7/2015 Slayton et al.
2015/0217870 A1 8/2015 Mccullough et al.
2015/0220264 A1 8/2015 Lewis et al.
2015/0220507 A1 8/2015 Mohajer et al.
2015/0220715 A1 8/2015 Kim et al.
2015/0220972 A1 8/2015 Subramanya et al.
2015/0221302 A1 8/2015 Han et al.
2015/0221304 A1 8/2015 Stewart
2015/0221307 A1 8/2015 Shah et al.
2015/0222586 A1 8/2015 Ebersman et al.
2015/0224848 A1 8/2015 Eisenhour
2015/0227505 A1 8/2015 Morimoto
2015/0227633 A1 8/2015 Shapira
2015/0228274 A1 8/2015 Leppanen et al.
2015/0228275 A1 8/2015 Watanabe et al.
2015/0228281 A1 8/2015 Raniere
2015/0228282 A1 8/2015 Evrard
2015/0228283 A1 8/2015 Ehsani et al.
2015/0228292 A1 8/2015 Goldstein et al.
2015/0230095 A1 8/2015 Smith et al.
2015/0234556 A1 8/2015 Shaofeng et al.
2015/0234636 A1 8/2015 Barnes, Jr.
2015/0234800 A1 8/2015 Patrick et al.
2015/0235434 A1 8/2015 Miller et al.
2015/0235540 A1 8/2015 Verna et al.
2015/0237301 A1 8/2015 Shi et al.
2015/0242091 A1 8/2015 Lu et al.
2015/0242385 A1 8/2015 Bao et al.
2015/0243278 A1 8/2015 Kibre et al.
2015/0243279 A1 8/2015 Morse et al.
2015/0243283 A1 8/2015 Halash et al.
2015/0244665 A1 8/2015 Choi et al.
2015/0245154 A1 8/2015 Dadu et al.
2015/0248494 A1 9/2015 Mital
2015/0248651 A1 9/2015 Akutagawa et al.
2015/0248886 A1 9/2015 Sarikaya et al.
2015/0249715 A1 9/2015 Helvik et al.
2015/0253146 A1 9/2015 Annapureddy et al.
2015/0253885 A1 9/2015 Kagan et al.
2015/0254057 A1 9/2015 Klein et al.
2015/0254058 A1 9/2015 Klein et al.
2015/0254333 A1 9/2015 Fife et al.
2015/0255068 A1 9/2015 Kim et al.
2015/0255071 A1 9/2015 Chiba
2015/0256873 A1 9/2015 Klein et al.
2015/0261298 A1 9/2015 Li
2015/0261496 A1 9/2015 Faaborg et al.
2015/0261850 A1 9/2015 Mittal
2015/0261944 A1 9/2015 Hosom et al.
2015/0262443 A1 9/2015 Chong
2015/0262573 A1 9/2015 Brooks et al.
2015/0262583 A1 9/2015 Kanda et al.
2015/0269139 A1 9/2015 McAteer et al.
2015/0269420 A1 9/2015 Kim et al.
2015/0269617 A1 9/2015 Mikurak
2015/0269677 A1 9/2015 Milne
2015/0269943 A1 9/2015 VanBlon et al.
2015/0277574 A1 10/2015 Jain et al.
2015/0278199 A1 10/2015 Hazen et al.
2015/0278348 A1 10/2015 Paruchuri et al.
2015/0278370 A1 10/2015 Stratvert et al.
2015/0278737 A1 10/2015 Chen Huebscher et al.
2015/0279354 A1 10/2015 Gruenstein et al.
2015/0279358 A1 10/2015 Kingsbury et al.
2015/0279360 A1 10/2015 Mengibar et al.
2015/0279366 A1 10/2015 Krestnikov et al.
2015/0281380 A1 10/2015 Wang et al.
2015/0281401 A1 10/2015 Le et al.
2015/0286627 A1 10/2015 Chang et al.
2015/0286716 A1 10/2015 Snibbe et al.
2015/0286937 A1 10/2015 Hildebrand
2015/0287401 A1 10/2015 Lee et al.
2015/0287408 A1 10/2015 Svendsen et al.
2015/0287409 A1 10/2015 Jang
2015/0287411 A1 10/2015 Kojima et al.
2015/0288629 A1 10/2015 Choi et al.
2015/0293602 A1 10/2015 Kay et al.
2015/0294086 A1 10/2015 Kare et al.
2015/0294377 A1 10/2015 Chow
2015/0294516 A1 10/2015 Chiang
2015/0294670 A1 10/2015 Roblek et al.
2015/0295915 A1 10/2015 Xiu
2015/0296065 A1 10/2015 Narita et al.
2015/0301796 A1 10/2015 Visser et al.
2015/0302316 A1 10/2015 Buryak et al.
2015/0302855 A1 10/2015 Kim et al.
2015/0302856 A1 10/2015 Kim et al.
2015/0302857 A1 10/2015 Yamada
2015/0302870 A1 10/2015 Burke et al.

(56) References Cited

U.S. PATENT DOCUMENTS

2015/0308470 A1 10/2015 Graham et al.
2015/0309691 A1 10/2015 Seo et al.
2015/0309997 A1 10/2015 Lee et al.
2015/0310114 A1 10/2015 Ryger et al.
2015/0310852 A1 10/2015 Spizzo et al.
2015/0310858 A1 10/2015 Li et al.
2015/0310862 A1 10/2015 Dauphin et al.
2015/0310879 A1 10/2015 Buchanan et al.
2015/0310888 A1 10/2015 Chen
2015/0312182 A1 10/2015 Langholz
2015/0312409 A1 10/2015 Czarnecki et al.
2015/0314454 A1 11/2015 Breazeal et al.
2015/0317069 A1 11/2015 Clements et al.
2015/0317310 A1 11/2015 Eiche et al.
2015/0319264 A1 11/2015 Allen et al.
2015/0319411 A1 11/2015 Kasmir et al.
2015/0324041 A1 11/2015 Varley et al.
2015/0324334 A1 11/2015 Lee et al.
2015/0324362 A1 11/2015 Glass et al.
2015/0331664 A1 11/2015 Osawa et al.
2015/0331711 A1 11/2015 Huang et al.
2015/0332667 A1 11/2015 Mason
2015/0334346 A1 11/2015 Cheatham, III et al.
2015/0339049 A1 11/2015 Kasemset et al.
2015/0339391 A1 11/2015 Kang et al.
2015/0340033 A1 11/2015 Di Fabbrizio et al.
2015/0340034 A1 11/2015 Schalkwyk et al.
2015/0340040 A1 11/2015 Mun et al.
2015/0340042 A1 11/2015 Sejnoha et al.
2015/0341717 A1 11/2015 Song et al.
2015/0346845 A1 12/2015 Di Censo et al.
2015/0347086 A1 12/2015 Liedholm et al.
2015/0347381 A1 12/2015 Bellegarda
2015/0347382 A1 12/2015 Dolfing et al.
2015/0347383 A1 12/2015 Willmore et al.
2015/0347385 A1 12/2015 Flor et al.
2015/0347393 A1 12/2015 Futrell et al.
2015/0347552 A1 12/2015 Habouzit et al.
2015/0347733 A1 12/2015 Tsou et al.
2015/0347985 A1 12/2015 Gross et al.
2015/0348533 A1 12/2015 Saddler et al.
2015/0348547 A1 12/2015 Paulik et al.
2015/0348548 A1 12/2015 Piernot et al.
2015/0348549 A1 12/2015 Giuli et al.
2015/0348551 A1 12/2015 Gruber et al.
2015/0348554 A1 12/2015 Orr et al.
2015/0348555 A1 12/2015 Sugita
2015/0348565 A1 12/2015 Rhoten et al.
2015/0349934 A1 12/2015 Pollack et al.
2015/0350031 A1 12/2015 Burks et al.
2015/0350147 A1 12/2015 Shepherd et al.
2015/0350342 A1 12/2015 Thorpe et al.
2015/0350594 A1 12/2015 Mate et al.
2015/0352999 A1 12/2015 Bando et al.
2015/0355879 A1 12/2015 Beckhardt et al.
2015/0356410 A1 12/2015 Faith et al.
2015/0363587 A1 12/2015 Ahn et al.
2015/0364128 A1 12/2015 Zhao et al.
2015/0364140 A1 12/2015 Thörn
2015/0365251 A1 12/2015 Kinoshita et al.
2015/0370455 A1 12/2015 Van Os et al.
2015/0370531 A1 12/2015 Faaborg
2015/0370780 A1 12/2015 Wang et al.
2015/0370787 A1 12/2015 Akbacak et al.
2015/0370884 A1 12/2015 Hurley et al.
2015/0371215 A1 12/2015 Zhou et al.
2015/0371529 A1 12/2015 Dolecki
2015/0371639 A1 12/2015 Foerster et al.
2015/0371663 A1 12/2015 Gustafson et al.
2015/0371664 A1 12/2015 Bar-Or et al.
2015/0371665 A1 12/2015 Naik et al.
2015/0373183 A1 12/2015 Woolsey et al.
2015/0373428 A1 12/2015 Trollope et al.
2015/0379118 A1 12/2015 Wickenkamp et al.
2015/0379414 A1 12/2015 Yeh et al.
2015/0379993 A1 12/2015 Subhojit et al.
2015/0381923 A1 12/2015 Wickenkamp et al.
2015/0382047 A1 12/2015 Van Os et al.
2015/0382079 A1 12/2015 Lister et al.
2015/0382147 A1 12/2015 Clark et al.
2015/0382322 A1 12/2015 Migicovsky et al.
2016/0004499 A1 1/2016 Kim et al.
2016/0004690 A1 1/2016 Bangalore et al.
2016/0005320 A1 1/2016 deCharms et al.
2016/0006795 A1 1/2016 Yunten
2016/0012038 A1 1/2016 Edwards et al.
2016/0014476 A1 1/2016 Caliendo, Jr. et al.
2016/0018872 A1 1/2016 Tu et al.
2016/0018899 A1 1/2016 Tu et al.
2016/0018900 A1 1/2016 Tu et al.
2016/0018959 A1 1/2016 Yamashita et al.
2016/0019886 A1 1/2016 Hong
2016/0019896 A1 1/2016 Alvarez Guevara et al.
2016/0021414 A1 1/2016 Padi et al.
2016/0026242 A1 1/2016 Burns et al.
2016/0026258 A1 1/2016 Ou et al.
2016/0027431 A1 1/2016 Kurzweil et al.
2016/0028666 A1 1/2016 Li
2016/0028802 A1 1/2016 Balasingh et al.
2016/0029316 A1 1/2016 Mohan et al.
2016/0034042 A1 2/2016 Joo
2016/0034447 A1 2/2016 Shin et al.
2016/0034811 A1 2/2016 Paulik et al.
2016/0036750 A1 2/2016 Yuan et al.
2016/0036953 A1 2/2016 Lee et al.
2016/0041809 A1 2/2016 Clayton et al.
2016/0042735 A1 2/2016 Vibbert et al.
2016/0042748 A1 2/2016 Jain et al.
2016/0043905 A1 2/2016 Fiedler
2016/0048666 A1 2/2016 Dey et al.
2016/0050254 A1 2/2016 Rao et al.
2016/0055422 A1 2/2016 Li
2016/0057203 A1 2/2016 Gärdenfors et al.
2016/0057475 A1 2/2016 Liu
2016/0061623 A1 3/2016 Pahwa et al.
2016/0062459 A1 3/2016 Publicover et al.
2016/0062605 A1 3/2016 Agarwal et al.
2016/0063094 A1 3/2016 Udupa et al.
2016/0063095 A1 3/2016 Nassar et al.
2016/0063998 A1 3/2016 Krishnamoorthy et al.
2016/0065155 A1 3/2016 Bharj et al.
2016/0065626 A1 3/2016 Jain et al.
2016/0066020 A1 3/2016 Mountain
2016/0066360 A1 3/2016 Vinegrad et al.
2016/0070581 A1 3/2016 Soon-Shiong
2016/0071516 A1 3/2016 Lee et al.
2016/0071517 A1 3/2016 Beaver et al.
2016/0071520 A1 3/2016 Hayakawa
2016/0071521 A1 3/2016 Haughay
2016/0072940 A1 3/2016 Cronin
2016/0077794 A1 3/2016 Kim et al.
2016/0078359 A1 3/2016 Csurka et al.
2016/0078860 A1 3/2016 Paulik et al.
2016/0080165 A1 3/2016 Ehsani et al.
2016/0080475 A1 3/2016 Singh et al.
2016/0085295 A1 3/2016 Shimy et al.
2016/0085827 A1 3/2016 Chadha et al.
2016/0086116 A1 3/2016 Rao et al.
2016/0086599 A1 3/2016 Kurata et al.
2016/0088335 A1 3/2016 Zucchetta
2016/0091871 A1 3/2016 Marti et al.
2016/0091967 A1 3/2016 Prokofieva et al.
2016/0092046 A1 3/2016 Hong et al.
2016/0092074 A1 3/2016 Raux et al.
2016/0092434 A1 3/2016 Bellegarda
2016/0092447 A1 3/2016 Pathurudeen et al.
2016/0092766 A1 3/2016 Sainath et al.
2016/0093291 A1 3/2016 Kim
2016/0093298 A1 3/2016 Naik et al.
2016/0093301 A1 3/2016 Bellegarda et al.
2016/0093304 A1 3/2016 Kim et al.
2016/0094700 A1 3/2016 Lee et al.
2016/0094889 A1 3/2016 Venkataraman et al.
2016/0094979 A1 3/2016 Naik et al.

(56) References Cited

U.S. PATENT DOCUMENTS

2016/0098991 A1 4/2016 Luo et al.
2016/0098992 A1 4/2016 Renard et al.
2016/0099892 A1 4/2016 Palakovich et al.
2016/0099984 A1 4/2016 Karagiannis et al.
2016/0104480 A1 4/2016 Sharifi
2016/0104486 A1 4/2016 Penilla et al.
2016/0105308 A1 4/2016 Dutt
2016/0111091 A1 4/2016 Bakish
2016/0112746 A1 4/2016 Zhang et al.
2016/0112792 A1 4/2016 Lee et al.
2016/0116980 A1 4/2016 George-Svahn et al.
2016/0117386 A1 4/2016 Ajmera et al.
2016/0118048 A1 4/2016 Heide
2016/0119338 A1 4/2016 Cheyer
2016/0125048 A1 5/2016 Hamada
2016/0125071 A1 5/2016 Gabbai
2016/0132046 A1 5/2016 Beoughter et al.
2016/0132290 A1 5/2016 Raux
2016/0132484 A1 5/2016 Nauze et al.
2016/0132488 A1 5/2016 Clark et al.
2016/0133254 A1 5/2016 Vogel et al.
2016/0139662 A1 5/2016 Dabhade
2016/0140951 A1 5/2016 Agiomyrgiannakis et al.
2016/0140962 A1 5/2016 Sharifi
2016/0147725 A1 5/2016 Patten et al.
2016/0147739 A1 5/2016 Lim et al.
2016/0148610 A1 5/2016 Kennewick, Jr. et al.
2016/0148612 A1 5/2016 Guo et al.
2016/0148613 A1 5/2016 Kwon et al.
2016/0149966 A1 5/2016 Remash et al.
2016/0150020 A1 5/2016 Farmer et al.
2016/0151668 A1 6/2016 Barnes et al.
2016/0154624 A1 6/2016 Son et al.
2016/0154792 A1 6/2016 Sarikaya et al.
2016/0154880 A1 6/2016 Hoarty
2016/0155442 A1 6/2016 Kannan et al.
2016/0155443 A1 6/2016 Khan et al.
2016/0156574 A1 6/2016 Hum et al.
2016/0156990 A1 6/2016 Miccoy et al.
2016/0162456 A1 6/2016 Munro et al.
2016/0163311 A1 6/2016 Crook et al.
2016/0163312 A1 6/2016 Naik et al.
2016/0169267 A1 6/2016 Pool
2016/0170710 A1 6/2016 Kim et al.
2016/0170966 A1 6/2016 Kolo
2016/0171980 A1 6/2016 Liddell et al.
2016/0173578 A1 6/2016 Sharma et al.
2016/0173617 A1 6/2016 Allinson
2016/0173929 A1 6/2016 Klappert
2016/0173960 A1 6/2016 Snibbe et al.
2016/0179462 A1 6/2016 Bjorkengren
2016/0179464 A1 6/2016 Reddy et al.
2016/0179787 A1 6/2016 Deleeuw
2016/0180840 A1 6/2016 Siddiq et al.
2016/0180844 A1 6/2016 Vanblon et al.
2016/0182410 A1 6/2016 Janakiraman et al.
2016/0182709 A1 6/2016 Kim et al.
2016/0188181 A1 6/2016 Smith
2016/0188738 A1 6/2016 Gruber et al.
2016/0189198 A1 6/2016 Daniel et al.
2016/0189715 A1 6/2016 Nishikawa
2016/0189717 A1 6/2016 Kannan et al.
2016/0196110 A1 7/2016 Yehoshua et al.
2016/0198319 A1 7/2016 Huang et al.
2016/0202957 A1 7/2016 Siddall et al.
2016/0203002 A1 7/2016 Kannan et al.
2016/0203193 A1 7/2016 Kevin et al.
2016/0210551 A1 7/2016 Lee et al.
2016/0210981 A1 7/2016 Lee
2016/0212206 A1 7/2016 Wu et al.
2016/0212208 A1 7/2016 Kulkarni et al.
2016/0212488 A1 7/2016 Os et al.
2016/0217784 A1 7/2016 Gelfenbeyn et al.
2016/0217794 A1 7/2016 Imoto et al.
2016/0224540 A1 8/2016 Stewart et al.
2016/0224559 A1 8/2016 Hicks et al.
2016/0224774 A1 8/2016 Pender
2016/0225372 A1 8/2016 Cheung et al.
2016/0226956 A1 8/2016 Hong et al.
2016/0227107 A1 8/2016 Beaumont
2016/0227633 A1 8/2016 Sun et al.
2016/0232500 A1 8/2016 Wang et al.
2016/0234206 A1 8/2016 Tunnell et al.
2016/0239480 A1 8/2016 Larcheveque et al.
2016/0239568 A1 8/2016 Packer et al.
2016/0239645 A1 8/2016 Heo et al.
2016/0239848 A1 8/2016 Chang et al.
2016/0240187 A1 8/2016 Fleizach et al.
2016/0240189 A1 8/2016 Lee et al.
2016/0240192 A1 8/2016 Raghuvir
2016/0242148 A1 8/2016 Reed
2016/0247061 A1 8/2016 Trask et al.
2016/0249319 A1 8/2016 Dotan-Cohen et al.
2016/0253312 A1 9/2016 Rhodes
2016/0253528 A1 9/2016 Gao et al.
2016/0259623 A1 9/2016 Sumner et al.
2016/0259656 A1 9/2016 Sumner et al.
2016/0259779 A1 9/2016 Labskýet al.
2016/0260431 A1 9/2016 Newendorp et al.
2016/0260433 A1 9/2016 Sumner et al.
2016/0260434 A1 9/2016 Gelfenbeyn et al.
2016/0260436 A1 9/2016 Lemay et al.
2016/0262442 A1 9/2016 Davila et al.
2016/0266871 A1 9/2016 Schmid et al.
2016/0267904 A1 9/2016 Biadsy et al.
2016/0269540 A1 9/2016 Butcher et al.
2016/0274938 A1 9/2016 Strinati et al.
2016/0275941 A1 9/2016 Bellegarda et al.
2016/0275947 A1 9/2016 Li et al.
2016/0282824 A1 9/2016 Smallwood et al.
2016/0282956 A1 9/2016 Ouyang et al.
2016/0283055 A1 9/2016 Haghighat et al.
2016/0283185 A1 9/2016 Mclaren et al.
2016/0284005 A1 9/2016 Daniel et al.
2016/0284199 A1 9/2016 Dotan-Cohen et al.
2016/0285808 A1 9/2016 Franklin et al.
2016/0286045 A1 9/2016 Shaltiel et al.
2016/0291831 A1 10/2016 Baek
2016/0292603 A1 10/2016 Prajapati et al.
2016/0293157 A1 10/2016 Chen et al.
2016/0293167 A1 10/2016 Chen et al.
2016/0293168 A1 10/2016 Chen
2016/0294755 A1 10/2016 Prabhu
2016/0294813 A1 10/2016 Zou
2016/0299685 A1 10/2016 Zhai et al.
2016/0299882 A1 10/2016 Hegerty et al.
2016/0299883 A1 10/2016 Zhu et al.
2016/0299977 A1 10/2016 Hreha
2016/0300571 A1 10/2016 Foerster et al.
2016/0301639 A1 10/2016 Liu et al.
2016/0306683 A1 10/2016 Standley et al.
2016/0307566 A1 10/2016 Bellegarda
2016/0308799 A1 10/2016 Schubert et al.
2016/0309035 A1 10/2016 Li
2016/0313906 A1 10/2016 Kilchenko et al.
2016/0314788 A1 10/2016 Jitkoff et al.
2016/0314789 A1 10/2016 Marcheret et al.
2016/0314792 A1 10/2016 Alvarez et al.
2016/0315996 A1 10/2016 Ha et al.
2016/0316349 A1 10/2016 Lee et al.
2016/0317924 A1 11/2016 Tanaka et al.
2016/0320838 A1 11/2016 Teller et al.
2016/0321239 A1 11/2016 Iso-Sipiläet al.
2016/0321243 A1 11/2016 Walia et al.
2016/0321261 A1 11/2016 Spasojevic et al.
2016/0321358 A1 11/2016 Kanani et al.
2016/0322043 A1 11/2016 Bellegarda
2016/0322044 A1 11/2016 Jung et al.
2016/0322045 A1 11/2016 Hatfield et al.
2016/0322048 A1 11/2016 Amano et al.
2016/0322050 A1 11/2016 Wang et al.
2016/0322055 A1 11/2016 Sainath et al.
2016/0328134 A1 11/2016 Xu
2016/0328147 A1 11/2016 Zhang et al.

(56) References Cited

U.S. PATENT DOCUMENTS

2016/0328205 A1 11/2016 Agrawal et al.
2016/0328893 A1 11/2016 Cordova et al.
2016/0329060 A1 11/2016 Ito et al.
2016/0334973 A1 11/2016 Reckhow et al.
2016/0335138 A1 11/2016 Surti et al.
2016/0335139 A1 11/2016 Hurley et al.
2016/0335532 A1 11/2016 Sanghavi et al.
2016/0336007 A1 11/2016 Hanazawa et al.
2016/0336010 A1 11/2016 Lindahl
2016/0336011 A1 11/2016 Koll et al.
2016/0336024 A1 11/2016 Choi et al.
2016/0337299 A1 11/2016 Lane et al.
2016/0337301 A1 11/2016 Rollins et al.
2016/0342317 A1 11/2016 Lim et al.
2016/0342685 A1 11/2016 Basu et al.
2016/0342781 A1 11/2016 Jeon
2016/0342803 A1 11/2016 Goodridge et al.
2016/0350070 A1 12/2016 Sung et al.
2016/0350650 A1 12/2016 Leeman-Munk et al.
2016/0350812 A1 12/2016 Priness et al.
2016/0351190 A1 12/2016 Piernot et al.
2016/0352567 A1 12/2016 Robbins et al.
2016/0352924 A1 12/2016 Senarath et al.
2016/0357304 A1 12/2016 Hatori et al.
2016/0357728 A1 12/2016 Bellegarda et al.
2016/0357790 A1 12/2016 Elkington et al.
2016/0357861 A1 12/2016 Carlhian et al.
2016/0357870 A1 12/2016 Hentschel et al.
2016/0358598 A1 12/2016 Williams et al.
2016/0358600 A1 12/2016 Nallasamy et al.
2016/0358603 A1 12/2016 Azam et al.
2016/0358609 A1 12/2016 Connell et al.
2016/0358619 A1 12/2016 Ramprashad et al.
2016/0359771 A1 12/2016 Sridhar
2016/0360039 A1 12/2016 Sanghavi et al.
2016/0360336 A1 12/2016 Gross et al.
2016/0360382 A1 12/2016 Gross et al.
2016/0364378 A1 12/2016 Futrell et al.
2016/0364382 A1 12/2016 Sarikaya
2016/0365101 A1 12/2016 Foy et al.
2016/0371054 A1 12/2016 Beaumont et al.
2016/0371250 A1 12/2016 Rhodes
2016/0372112 A1 12/2016 Miller et al.
2016/0372119 A1 12/2016 Sak et al.
2016/0378747 A1 12/2016 Orr et al.
2016/0379091 A1 12/2016 Lin et al.
2016/0379105 A1 12/2016 Moore, Jr.
2016/0379626 A1 12/2016 Deisher et al.
2016/0379632 A1 12/2016 Hoffmeister et al.
2016/0379633 A1 12/2016 Lehman et al.
2016/0379639 A1 12/2016 Weinstein et al.
2016/0379641 A1 12/2016 Liu et al.
2017/0000348 A1 1/2017 Karsten et al.
2017/0003931 A1 1/2017 Dvortsov et al.
2017/0004209 A1 1/2017 Johl et al.
2017/0004409 A1 1/2017 Chu et al.
2017/0004824 A1 1/2017 Yoo et al.
2017/0005818 A1 1/2017 Gould
2017/0006329 A1 1/2017 Jang et al.
2017/0011091 A1 1/2017 Chehreghani
2017/0011279 A1 1/2017 Soldevila et al.
2017/0011303 A1 1/2017 Annapureddy et al.
2017/0011742 A1 1/2017 Jing et al.
2017/0013124 A1 1/2017 Havelka et al.
2017/0013331 A1 1/2017 Watanabe et al.
2017/0018271 A1 1/2017 Khan et al.
2017/0019987 A1 1/2017 Dragone et al.
2017/0023963 A1 1/2017 Davis et al.
2017/0025124 A1 1/2017 Mixter et al.
2017/0026318 A1 1/2017 Daniel et al.
2017/0026509 A1 1/2017 Rand
2017/0027522 A1 2/2017 Van Hasselt et al.
2017/0031576 A1 2/2017 Saoji et al.
2017/0031711 A1 2/2017 Wu et al.
2017/0032440 A1 2/2017 Paton
2017/0032783 A1 2/2017 Lord et al.
2017/0032787 A1 2/2017 Dayal
2017/0032791 A1 2/2017 Elson et al.
2017/0034087 A1 2/2017 Borenstein et al.
2017/0039283 A1 2/2017 Bennett et al.
2017/0039475 A1 2/2017 Cheyer et al.
2017/0040002 A1 2/2017 Basson et al.
2017/0041388 A1 2/2017 Tal et al.
2017/0046025 A1 2/2017 Dascola et al.
2017/0046330 A1 2/2017 Si et al.
2017/0047063 A1 2/2017 Ohmura et al.
2017/0052760 A1 2/2017 Johnson et al.
2017/0053652 A1 2/2017 Choi et al.
2017/0055895 A1 3/2017 Jardins et al.
2017/0060853 A1 3/2017 Lee et al.
2017/0061423 A1 3/2017 Bryant et al.
2017/0068423 A1 3/2017 Napolitano et al.
2017/0068513 A1 3/2017 Stasior et al.
2017/0068550 A1 3/2017 Zeitlin
2017/0068670 A1 3/2017 Orr et al.
2017/0069308 A1 3/2017 Aleksic et al.
2017/0069321 A1 3/2017 Toiyama
2017/0069327 A1 3/2017 Heigold et al.
2017/0075653 A1 3/2017 Dawidowsky et al.
2017/0076518 A1 3/2017 Patterson et al.
2017/0076720 A1 3/2017 Gopalan et al.
2017/0076721 A1 3/2017 Bargetzi et al.
2017/0078490 A1 3/2017 Kaminsky et al.
2017/0083179 A1 3/2017 Gruber et al.
2017/0083285 A1 3/2017 Meyers et al.
2017/0083504 A1 3/2017 Huang
2017/0083506 A1 3/2017 Liu et al.
2017/0084277 A1 3/2017 Sharifi
2017/0085547 A1 3/2017 De Aguiar et al.
2017/0085696 A1 3/2017 Abkairov
2017/0090428 A1 3/2017 Oohara
2017/0090569 A1 3/2017 Levesque
2017/0090864 A1 3/2017 Jorgovanovic
2017/0091168 A1 3/2017 Bellegarda et al.
2017/0091169 A1 3/2017 Bellegarda et al.
2017/0091612 A1 3/2017 Gruber et al.
2017/0092259 A1 3/2017 Jeon
2017/0092270 A1 3/2017 Newendorp et al.
2017/0092278 A1 3/2017 Evermann et al.
2017/0093356 A1 3/2017 Cudak et al.
2017/0097743 A1 4/2017 Hameed et al.
2017/0102837 A1 4/2017 Toumpelis
2017/0102915 A1 4/2017 Kuscher et al.
2017/0103749 A1 4/2017 Zhao et al.
2017/0103752 A1 4/2017 Senior et al.
2017/0105190 A1 4/2017 Logan et al.
2017/0108236 A1 4/2017 Guan et al.
2017/0110117 A1 4/2017 Chakladar et al.
2017/0110125 A1 4/2017 Xu et al.
2017/0116177 A1 4/2017 Walia
2017/0116982 A1 4/2017 Gelfenbeyn et al.
2017/0116987 A1 4/2017 Kang et al.
2017/0116989 A1 4/2017 Yadgar et al.
2017/0124190 A1 5/2017 Wang et al.
2017/0124311 A1 5/2017 Li et al.
2017/0124531 A1 5/2017 McCormack
2017/0125016 A1 5/2017 Wang
2017/0127124 A9 5/2017 Wilson et al.
2017/0131778 A1 5/2017 Iyer
2017/0132019 A1 5/2017 Karashchuk et al.
2017/0132199 A1 5/2017 Vescovi et al.
2017/0133007 A1 5/2017 Drewes
2017/0133009 A1 5/2017 Cho et al.
2017/0134807 A1 5/2017 Shaw et al.
2017/0140041 A1 5/2017 Dotan-Cohen et al.
2017/0140052 A1 5/2017 Bufe, III et al.
2017/0140644 A1 5/2017 Hwang et al.
2017/0140760 A1 5/2017 Sachdev
2017/0147722 A1 5/2017 Greenwood
2017/0147841 A1 5/2017 Stagg et al.
2017/0148044 A1 5/2017 Fukuda et al.
2017/0148307 A1 5/2017 Yeom et al.
2017/0154033 A1 6/2017 Lee
2017/0154055 A1 6/2017 Dimson et al.

(56) References Cited

U.S. PATENT DOCUMENTS

2017/0154628 A1 6/2017 Mohajer et al.
2017/0155940 A1 6/2017 Jin et al.
2017/0155965 A1 6/2017 Ward
2017/0161018 A1 6/2017 Lemay et al.
2017/0161268 A1 6/2017 Badaskar
2017/0161293 A1 6/2017 Ionescu et al.
2017/0161393 A1 6/2017 Oh et al.
2017/0161439 A1 6/2017 Raduchel et al.
2017/0161500 A1 6/2017 Yang
2017/0162191 A1 6/2017 Grost et al.
2017/0162202 A1 6/2017 Anthony et al.
2017/0162203 A1 6/2017 Huang et al.
2017/0169506 A1 6/2017 Wishne et al.
2017/0169818 A1 6/2017 Vanblon et al.
2017/0169819 A1 6/2017 Mese et al.
2017/0171139 A1 6/2017 Marra et al.
2017/0171387 A1 6/2017 Vendrow
2017/0177080 A1 6/2017 Deleeuw
2017/0177547 A1 6/2017 Ciereszko et al.
2017/0178619 A1 6/2017 Naik et al.
2017/0178620 A1 6/2017 Fleizach et al.
2017/0178626 A1 6/2017 Gruber et al.
2017/0178666 A1 6/2017 Yu
2017/0180499 A1 6/2017 Gelfenbeyn et al.
2017/0185375 A1 6/2017 Martel et al.
2017/0185581 A1 6/2017 Boja et al.
2017/0186429 A1 6/2017 Giuli et al.
2017/0186446 A1 6/2017 Wosk et al.
2017/0187711 A1 6/2017 Joo et al.
2017/0193083 A1 7/2017 Bhatt et al.
2017/0195493 A1 7/2017 Sudarsan et al.
2017/0195495 A1 7/2017 Deora et al.
2017/0195636 A1 7/2017 Child et al.
2017/0195856 A1 7/2017 Snyder et al.
2017/0199870 A1 7/2017 Zheng et al.
2017/0199874 A1 7/2017 Patel et al.
2017/0200066 A1 7/2017 Wang et al.
2017/0201609 A1 7/2017 Salmenkaita et al.
2017/0201613 A1 7/2017 Engelke et al.
2017/0201846 A1 7/2017 Katayama et al.
2017/0206002 A1 7/2017 Badger et al.
2017/0206899 A1 7/2017 Bryant et al.
2017/0215052 A1 7/2017 Koum et al.
2017/0220212 A1 8/2017 Yang et al.
2017/0221486 A1 8/2017 Kurata et al.
2017/0222961 A1 8/2017 Beach et al.
2017/0223189 A1 8/2017 Meredith et al.
2017/0227935 A1 8/2017 Su et al.
2017/0228367 A1 8/2017 Pasupalak et al.
2017/0228382 A1 8/2017 Haviv et al.
2017/0229121 A1 8/2017 Taki et al.
2017/0230429 A1 8/2017 Garmark et al.
2017/0230497 A1 8/2017 Kim et al.
2017/0230709 A1 8/2017 Van Os et al.
2017/0235361 A1 8/2017 Rigazio et al.
2017/0235618 A1 8/2017 Lin et al.
2017/0235721 A1 8/2017 Almosallam et al.
2017/0236512 A1 8/2017 Williams et al.
2017/0236514 A1 8/2017 Nelson
2017/0236517 A1 8/2017 Yu et al.
2017/0238039 A1 8/2017 Sabattini
2017/0242478 A1 8/2017 Ma
2017/0242653 A1 8/2017 Lang et al.
2017/0242657 A1 8/2017 Jarvis et al.
2017/0242840 A1 8/2017 Lu et al.
2017/0243468 A1 8/2017 Dotan-Cohen et al.
2017/0243576 A1 8/2017 Millington et al.
2017/0243583 A1 8/2017 Raichelgauz et al.
2017/0243586 A1 8/2017 Civelli et al.
2017/0249291 A1 8/2017 Patel
2017/0249309 A1 8/2017 Sarikaya
2017/0256256 A1 9/2017 Wang et al.
2017/0257723 A1 9/2017 Morishita et al.
2017/0262051 A1 9/2017 Tall et al.
2017/0262432 A1 9/2017 Sarikaya et al.
2017/0263247 A1 9/2017 Kang et al.
2017/0263248 A1 9/2017 Gruber et al.
2017/0263249 A1 9/2017 Akbacak et al.
2017/0263254 A1 9/2017 Dewan et al.
2017/0264451 A1 9/2017 Yu et al.
2017/0264711 A1 9/2017 Natarajan et al.
2017/0270092 A1 9/2017 He et al.
2017/0270715 A1 9/2017 Lindsay et al.
2017/0270822 A1 9/2017 Cohen
2017/0270912 A1 9/2017 Levit et al.
2017/0273044 A1 9/2017 Alsina
2017/0277691 A1 9/2017 Agarwal
2017/0278513 A1 9/2017 Li et al.
2017/0278514 A1 9/2017 Mathias et al.
2017/0285915 A1 10/2017 Napolitano et al.
2017/0286397 A1 10/2017 Gonzalez
2017/0286407 A1 10/2017 Chochowski et al.
2017/0287218 A1 10/2017 Nuernberger et al.
2017/0287472 A1 10/2017 Ogawa et al.
2017/0289305 A1 10/2017 Liensberger et al.
2017/0295446 A1 10/2017 Shivappa
2017/0301348 A1 10/2017 Chen et al.
2017/0308552 A1 10/2017 Soni et al.
2017/0308589 A1 10/2017 Liu et al.
2017/0308609 A1 10/2017 Berkhin et al.
2017/0311005 A1 10/2017 Lin
2017/0316775 A1 11/2017 Le et al.
2017/0316779 A1 11/2017 Mohapatra et al.
2017/0316782 A1 11/2017 Haughay
2017/0319123 A1 11/2017 Voss et al.
2017/0323637 A1 11/2017 Naik
2017/0329466 A1 11/2017 Krenkler et al.
2017/0329490 A1 11/2017 Esinovskaya et al.
2017/0329572 A1 11/2017 Shah et al.
2017/0329630 A1 11/2017 Jann et al.
2017/0330567 A1 11/2017 Van Wissen et al.
2017/0336920 A1 11/2017 Chan et al.
2017/0337035 A1 11/2017 Choudhary et al.
2017/0337478 A1 11/2017 Sarikaya et al.
2017/0337540 A1 11/2017 Buckman et al.
2017/0345411 A1 11/2017 Raitio et al.
2017/0345420 A1 11/2017 Barnett, Jr.
2017/0345429 A1 11/2017 Hardee et al.
2017/0346949 A1 11/2017 Sanghavi et al.
2017/0347180 A1 11/2017 Petrank
2017/0347222 A1 11/2017 Kanter
2017/0351487 A1 12/2017 Avilés-Casco et al.
2017/0352346 A1 12/2017 Paulik et al.
2017/0352350 A1 12/2017 Booker et al.
2017/0357478 A1 12/2017 Piersol et al.
2017/0357529 A1 12/2017 Venkatraman et al.
2017/0357632 A1 12/2017 Pagallo et al.
2017/0357633 A1 12/2017 Wang et al.
2017/0357637 A1 12/2017 Nell et al.
2017/0357640 A1 12/2017 Bellegarda et al.
2017/0357716 A1 12/2017 Bellegarda et al.
2017/0358300 A1 12/2017 Laurens et al.
2017/0358301 A1 12/2017 Raitio et al.
2017/0358302 A1 12/2017 Orr et al.
2017/0358303 A1 12/2017 Walker, II et al.
2017/0358304 A1 12/2017 Castillo et al.
2017/0358305 A1 12/2017 Kudurshian et al.
2017/0358317 A1 12/2017 James
2017/0359680 A1 12/2017 Ledvina et al.
2017/0365251 A1 12/2017 Park et al.
2017/0371509 A1 12/2017 Jung et al.
2017/0371865 A1 12/2017 Eck et al.
2017/0371866 A1 12/2017 Eck
2017/0371885 A1 12/2017 Aggarwal et al.
2017/0372703 A1 12/2017 Sung et al.
2017/0372719 A1 12/2017 Li et al.
2017/0374093 A1 12/2017 Dhar et al.
2017/0374176 A1 12/2017 Agrawal et al.
2018/0004372 A1 1/2018 Zurek et al.
2018/0004396 A1 1/2018 Ying
2018/0005112 A1 1/2018 Iso-Sipila et al.
2018/0007060 A1 1/2018 Leblang et al.
2018/0007096 A1 1/2018 Levin et al.
2018/0007210 A1 1/2018 Todasco

(56) References Cited

U.S. PATENT DOCUMENTS

2018/0007538 A1 1/2018 Naik et al.
2018/0012596 A1 1/2018 Piernot et al.
2018/0018248 A1 1/2018 Bhargava et al.
2018/0018590 A1 1/2018 Szeto et al.
2018/0018814 A1 1/2018 Patrik et al.
2018/0018959 A1 1/2018 Des Jardins et al.
2018/0018973 A1 1/2018 Moreno et al.
2018/0020093 A1 1/2018 Bentitou et al.
2018/0024985 A1 1/2018 Asano
2018/0025124 A1 1/2018 Mohr et al.
2018/0025287 A1 1/2018 Mathew et al.
2018/0028918 A1 2/2018 Tang et al.
2018/0033431 A1 2/2018 Newendorp et al.
2018/0033435 A1 2/2018 Jacobs, II
2018/0033436 A1 2/2018 Zhou
2018/0039239 A1 2/2018 Burchard
2018/0041571 A1 2/2018 Rogers et al.
2018/0045963 A1 2/2018 Hoover et al.
2018/0046340 A1 2/2018 Mall
2018/0046851 A1 2/2018 Kienzle et al.
2018/0047201 A1 2/2018 Filev et al.
2018/0047288 A1 2/2018 Cordell et al.
2018/0047391 A1 2/2018 Baik et al.
2018/0047393 A1 2/2018 Tian et al.
2018/0047406 A1 2/2018 Park
2018/0052909 A1 2/2018 Sharifi et al.
2018/0054505 A1 2/2018 Hart et al.
2018/0060032 A1 3/2018 Boesen
2018/0060301 A1 3/2018 Li et al.
2018/0060312 A1 3/2018 Won
2018/0060555 A1 3/2018 Boesen
2018/0061400 A1 3/2018 Carbune et al.
2018/0061401 A1 3/2018 Sarikaya et al.
2018/0062691 A1 3/2018 Barnett, Jr.
2018/0063276 A1 3/2018 Foged
2018/0063308 A1 3/2018 Crystal et al.
2018/0063324 A1 3/2018 Van Meter, II
2018/0063624 A1 3/2018 Boesen
2018/0067904 A1 3/2018 Li
2018/0067914 A1 3/2018 Chen et al.
2018/0067918 A1 3/2018 Bellegarda et al.
2018/0067929 A1 3/2018 Ahn
2018/0068074 A1 3/2018 Shen
2018/0068194 A1 3/2018 Matsuda
2018/0069743 A1 3/2018 Bakken et al.
2018/0075659 A1 3/2018 Browy et al.
2018/0075847 A1 3/2018 Lee et al.
2018/0075849 A1 3/2018 Khoury et al.
2018/0077095 A1 3/2018 Deyle et al.
2018/0077648 A1 3/2018 Nguyen
2018/0081739 A1 3/2018 Gravenites et al.
2018/0082692 A1 3/2018 Khoury et al.
2018/0083898 A1 3/2018 Pham
2018/0088788 A1 3/2018 Cheung et al.
2018/0088902 A1 3/2018 Mese et al.
2018/0088969 A1 3/2018 Vanblon et al.
2018/0089166 A1 3/2018 Meyer et al.
2018/0089588 A1 3/2018 Ravi et al.
2018/0090143 A1 3/2018 Saddler et al.
2018/0091604 A1 3/2018 Yamashita et al.
2018/0091732 A1 3/2018 Wilson et al.
2018/0091847 A1 3/2018 Wu et al.
2018/0096683 A1 4/2018 James et al.
2018/0096690 A1 4/2018 Mixter et al.
2018/0097812 A1 4/2018 Gillett et al.
2018/0101599 A1 4/2018 Kenneth et al.
2018/0101925 A1 4/2018 Brinig et al.
2018/0102914 A1 4/2018 Kawachi et al.
2018/0103209 A1 4/2018 Fischler et al.
2018/0107917 A1 4/2018 Hewavitharana et al.
2018/0107945 A1 4/2018 Gao et al.
2018/0108346 A1 4/2018 Paulik et al.
2018/0108351 A1 4/2018 Beckhardt et al.
2018/0108357 A1 4/2018 Liu
2018/0109920 A1 4/2018 Aggarwal et al.
2018/0113673 A1 4/2018 Sheynblat
2018/0114591 A1 4/2018 Pribanic et al.
2018/0314362 A1 4/2018 Kim et al.
2018/0121430 A1 5/2018 Kagoshima et al.
2018/0121432 A1 5/2018 Parson et al.
2018/0122376 A1 5/2018 Kojima
2018/0122378 A1 5/2018 Mixter et al.
2018/0126260 A1 5/2018 Chansoriya et al.
2018/0129967 A1 5/2018 Herreshoff
2018/0130470 A1 5/2018 Lemay et al.
2018/0130471 A1 5/2018 Trufinescu et al.
2018/0137097 A1 5/2018 Lim et al.
2018/0137404 A1 5/2018 Fauceglia et al.
2018/0137856 A1 5/2018 Gilbert
2018/0137857 A1 5/2018 Zhou et al.
2018/0137865 A1 5/2018 Ling
2018/0143857 A1 5/2018 Anbazhagan et al.
2018/0143967 A1 5/2018 Anbazhagan et al.
2018/0144465 A1 5/2018 Hsieh et al.
2018/0144615 A1 5/2018 Kinney et al.
2018/0144746 A1 5/2018 Mishra et al.
2018/0144748 A1 5/2018 Leong
2018/0146089 A1 5/2018 Rauenbuehler et al.
2018/0150744 A1 5/2018 Orr et al.
2018/0152557 A1 5/2018 White et al.
2018/0152558 A1 5/2018 Chan et al.
2018/0152803 A1 5/2018 Seefeldt et al.
2018/0157372 A1 6/2018 Kurabayashi
2018/0157398 A1 6/2018 Kaehler et al.
2018/0157408 A1 6/2018 Yu et al.
2018/0157992 A1 6/2018 Susskind et al.
2018/0158548 A1 6/2018 Taheri et al.
2018/0158552 A1 6/2018 Liu et al.
2018/0165278 A1 6/2018 He et al.
2018/0165801 A1 6/2018 Kim et al.
2018/0165857 A1 6/2018 Lee et al.
2018/0166076 A1 6/2018 Higuchi et al.
2018/0167884 A1 6/2018 Dawid et al.
2018/0173403 A1 6/2018 Carbune et al.
2018/0173542 A1 6/2018 Chan et al.
2018/0174406 A1 6/2018 Arashi et al.
2018/0174576 A1 6/2018 Soltau et al.
2018/0174597 A1 6/2018 Lee et al.
2018/0181370 A1 6/2018 Parkinson
2018/0182376 A1 6/2018 Gysel et al.
2018/0188840 A1 7/2018 Tamura et al.
2018/0188948 A1 7/2018 Ouyang et al.
2018/0189267 A1 7/2018 Takiel
2018/0190263 A1 7/2018 Calef, III
2018/0190273 A1 7/2018 Karimli et al.
2018/0190279 A1 7/2018 Anderson et al.
2018/0191670 A1 7/2018 Suyama
2018/0196683 A1 7/2018 Radebaugh et al.
2018/0205983 A1 7/2018 Lee et al.
2018/0210874 A1 7/2018 Fuxman et al.
2018/0213448 A1 7/2018 Segal et al.
2018/0214061 A1 8/2018 Knoth et al.
2018/0217810 A1 8/2018 Agrawal
2018/0218735 A1 8/2018 Hunt et al.
2018/0221783 A1 8/2018 Gamero
2018/0225131 A1 8/2018 Tommy et al.
2018/0225274 A1 8/2018 Tommy et al.
2018/0232203 A1 8/2018 Gelfenbeyn et al.
2018/0232608 A1 8/2018 Pradeep et al.
2018/0232688 A1 8/2018 Pike et al.
2018/0233132 A1 8/2018 Herold et al.
2018/0233140 A1 8/2018 Koishida et al.
2018/0247065 A1 8/2018 Rhee et al.
2018/0253209 A1 9/2018 Jaygarl et al.
2018/0253652 A1 9/2018 Palzer et al.
2018/0260680 A1 9/2018 Finkelstein et al.
2018/0267952 A1 9/2018 Osborne et al.
2018/0268023 A1 9/2018 Korpusik et al.
2018/0268106 A1 9/2018 Velaga
2018/0268337 A1 9/2018 Miller et al.
2018/0270343 A1 9/2018 Rout et al.
2018/0275839 A1 9/2018 Kocienda et al.
2018/0276197 A1 9/2018 Nell et al.
2018/0277113 A1 9/2018 Hartung et al.

(56) References Cited

U.S. PATENT DOCUMENTS

2018/0278740 A1 9/2018 Choi et al.
2018/0285056 A1 10/2018 Cutler et al.
2018/0293086 A1 10/2018 Laird-Mcconnell et al.
2018/0293984 A1 10/2018 Lindahl
2018/0293988 A1 10/2018 Huang et al.
2018/0293989 A1 10/2018 De et al.
2018/0299878 A1 10/2018 Cella et al.
2018/0300317 A1 10/2018 Bradbury
2018/0300400 A1 10/2018 Paulus
2018/0300608 A1 10/2018 Sevrens et al.
2018/0300952 A1 10/2018 Evans et al.
2018/0307216 A1 10/2018 Ypma et al.
2018/0307603 A1 10/2018 Che
2018/0308470 A1 10/2018 Park et al.
2018/0308477 A1 10/2018 Nagasaka
2018/0308480 A1 10/2018 Jang et al.
2018/0308485 A1 10/2018 Kudurshian et al.
2018/0308486 A1 10/2018 Saddler et al.
2018/0308491 A1 10/2018 Oktem et al.
2018/0314552 A1 11/2018 Kim et al.
2018/0314689 A1 11/2018 Wang et al.
2018/0314981 A1 11/2018 Chen
2018/0315415 A1 11/2018 Mosley et al.
2018/0315416 A1 11/2018 Berthelsen et al.
2018/0322112 A1 11/2018 Bellegarda et al.
2018/0322881 A1 11/2018 Min et al.
2018/0324518 A1 11/2018 Dusan et al.
2018/0329508 A1 11/2018 Klein et al.
2018/0329512 A1 11/2018 Liao et al.
2018/0329677 A1 11/2018 Gruber et al.
2018/0329957 A1 11/2018 Frazzingaro et al.
2018/0329982 A1 11/2018 Patel et al.
2018/0329998 A1 11/2018 Thomson et al.
2018/0330714 A1 11/2018 Paulik et al.
2018/0330721 A1 11/2018 Thomson et al.
2018/0330722 A1 11/2018 Newendorp et al.
2018/0330723 A1 11/2018 Acero et al.
2018/0330729 A1 11/2018 Golipour et al.
2018/0330730 A1 11/2018 Garg et al.
2018/0330731 A1 11/2018 Zeitlin et al.
2018/0330733 A1 11/2018 Orr et al.
2018/0330737 A1 11/2018 Paulik et al.
2018/0332118 A1 11/2018 Phipps et al.
2018/0332389 A1 11/2018 Ekkizogloy et al.
2018/0335903 A1 11/2018 Coffman et al.
2018/0336006 A1 11/2018 Chakraborty et al.
2018/0336049 A1 11/2018 Mukherjee et al.
2018/0336184 A1 11/2018 Bellegarda et al.
2018/0336197 A1 11/2018 Skilling et al.
2018/0336275 A1 11/2018 Graham et al.
2018/0336439 A1 11/2018 Kliger et al.
2018/0336449 A1 11/2018 Adan et al.
2018/0336880 A1 11/2018 Arik et al.
2018/0336885 A1 11/2018 Mukherjee et al.
2018/0336892 A1 11/2018 Kim et al.
2018/0336893 A1 11/2018 Robinson et al.
2018/0336894 A1 11/2018 Graham et al.
2018/0336904 A1 11/2018 Piercy et al.
2018/0336905 A1 11/2018 Kim et al.
2018/0336911 A1 11/2018 Dahl et al.
2018/0336920 A1 11/2018 Bastian et al.
2018/0338191 A1 11/2018 Van Scheltinga et al.
2018/0341643 A1 11/2018 Alders et al.
2018/0342243 A1 11/2018 Vanblon et al.
2018/0343557 A1 11/2018 Naik et al.
2018/0349084 A1 12/2018 Nagasaka et al.
2018/0349346 A1 12/2018 Hatori et al.
2018/0349349 A1 12/2018 Bellegarda et al.
2018/0349447 A1 12/2018 Maccartney et al.
2018/0349472 A1 12/2018 Kohlschuetter et al.
2018/0349728 A1 12/2018 Wang et al.
2018/0350345 A1 12/2018 Naik
2018/0350353 A1 12/2018 Gruber et al.
2018/0357073 A1 12/2018 Johnson et al.
2018/0357308 A1 12/2018 Cheyer
2018/0358015 A1 12/2018 Cash et al.
2018/0358019 A1 12/2018 Mont-Reynaud
2018/0365653 A1 12/2018 Cleaver et al.
2018/0366105 A1 12/2018 Kim
2018/0366110 A1 12/2018 Hashem et al.
2018/0366116 A1 12/2018 Nicholson et al.
2018/0373487 A1 12/2018 Gruber et al.
2018/0373493 A1 12/2018 Watson et al.
2018/0373796 A1 12/2018 Rathod
2018/0374484 A1 12/2018 Huang et al.
2019/0005024 A1 1/2019 Somech et al.
2019/0012141 A1 1/2019 Piersol et al.
2019/0012445 A1 1/2019 Lesso et al.
2019/0012449 A1 1/2019 Cheyer
2019/0012599 A1 1/2019 El Kaliouby et al.
2019/0013018 A1 1/2019 Rekstad
2019/0013025 A1 1/2019 Alcorn et al.
2019/0014450 A1 1/2019 Gruber et al.
2019/0019077 A1 1/2019 Griffin et al.
2019/0019508 A1 1/2019 Rochford et al.
2019/0020482 A1 1/2019 Gupta et al.
2019/0027152 A1 1/2019 Huang et al.
2019/0034040 A1 1/2019 Shah et al.
2019/0034826 A1 1/2019 Ahmad et al.
2019/0035385 A1 1/2019 Lawson et al.
2019/0035405 A1 1/2019 Haughay
2019/0037258 A1 1/2019 Justin et al.
2019/0042059 A1 2/2019 Baer
2019/0042627 A1 2/2019 Osotio et al.
2019/0043507 A1 2/2019 Huang et al.
2019/0044854 A1 2/2019 Yang et al.
2019/0045040 A1 2/2019 Lee et al.
2019/0051306 A1 2/2019 Torama et al.
2019/0051309 A1 2/2019 Kim et al.
2019/0057697 A1 2/2019 Giuli et al.
2019/0065144 A1 2/2019 Sumner et al.
2019/0065993 A1 2/2019 Srinivasan et al.
2019/0066674 A1 2/2019 Jaygarl et al.
2019/0068810 A1 2/2019 Okamoto et al.
2019/0173996 A1 2/2019 Butcher et al.
2019/0073607 A1 3/2019 Jia et al.
2019/0073998 A1 3/2019 Leblang et al.
2019/0074009 A1 3/2019 Kim et al.
2019/0074015 A1 3/2019 Orr et al.
2019/0074016 A1 3/2019 Orr et al.
2019/0079476 A1 3/2019 Funes
2019/0079724 A1 3/2019 Feuz et al.
2019/0080685 A1 3/2019 Johnson, Jr.
2019/0080698 A1 3/2019 Miller
2019/0082044 A1 3/2019 Olivia et al.
2019/0087205 A1 3/2019 Guday
2019/0087412 A1 3/2019 Seyed Ibrahim et al.
2019/0087455 A1 3/2019 He et al.
2019/0090812 A1 3/2019 Martin et al.
2019/0095050 A1 3/2019 Gruber et al.
2019/0095069 A1 3/2019 Proctor et al.
2019/0095171 A1 3/2019 Carson et al.
2019/0096134 A1 3/2019 Amacker et al.
2019/0102145 A1 4/2019 Wilberding et al.
2019/0102378 A1 4/2019 Piernot et al.
2019/0102381 A1 4/2019 Futrell et al.
2019/0103103 A1 4/2019 Ni et al.
2019/0103112 A1 4/2019 Walker et al.
2019/0108834 A1 4/2019 Nelson et al.
2019/0114320 A1 4/2019 Patwardhan et al.
2019/0116264 A1 4/2019 Sanghavi et al.
2019/0122666 A1 4/2019 Raitio et al.
2019/0122692 A1 4/2019 Binder et al.
2019/0124019 A1 4/2019 Leon et al.
2019/0129499 A1 5/2019 Li
2019/0129615 A1 5/2019 Sundar et al.
2019/0132694 A1 5/2019 Hanes et al.
2019/0134501 A1 5/2019 Feder et al.
2019/0138704 A1 5/2019 Shrivastava et al.
2019/0139058 A1 5/2019 Clark et al.
2019/0139541 A1 5/2019 Andersen et al.
2019/0139563 A1 5/2019 Chen et al.
2019/0141494 A1 5/2019 Gross et al.
2019/0147052 A1 5/2019 Lu et al.

(56) References Cited

U.S. PATENT DOCUMENTS

2019/0147369 A1 5/2019 Gupta et al.
2019/0147880 A1 5/2019 Booker et al.
2019/0147883 A1 5/2019 Mellenthin et al.
2019/0149972 A1 5/2019 Parks et al.
2019/0156830 A1 5/2019 Devaraj et al.
2019/0158994 A1 5/2019 Gross et al.
2019/0163667 A1 5/2019 Feuz et al.
2019/0164546 A1 5/2019 Piernot et al.
2019/0172243 A1 6/2019 Mishra et al.
2019/0172458 A1 6/2019 Mishra et al.
2019/0172465 A1 6/2019 Lee et al.
2019/0172467 A1 6/2019 Kim et al.
2019/0179607 A1 6/2019 Thangarathnam et al.
2019/0179890 A1 6/2019 Evermann
2019/0180749 A1 6/2019 Carey et al.
2019/0180750 A1 6/2019 Renard et al.
2019/0180770 A1 6/2019 Kothari et al.
2019/0182176 A1 6/2019 Niewczas
2019/0187787 A1 6/2019 White et al.
2019/0188326 A1 6/2019 Daianu et al.
2019/0188328 A1 6/2019 Oyenan et al.
2019/0189118 A1 6/2019 Piernot et al.
2019/0189125 A1 6/2019 Van Os et al.
2019/0190898 A1 6/2019 Cui
2019/0197053 A1 6/2019 Graham et al.
2019/0197119 A1 6/2019 Zhang et al.
2019/0213498 A1 7/2019 Adjaoute
2019/0213601 A1 7/2019 Hackman et al.
2019/0213774 A1 7/2019 Jiao et al.
2019/0213999 A1 7/2019 Grupen et al.
2019/0214024 A1 7/2019 Gruber et al.
2019/0220245 A1 7/2019 Martel et al.
2019/0220246 A1 7/2019 Orr et al.
2019/0220247 A1 7/2019 Lemay et al.
2019/0220704 A1 7/2019 Schulz-Trieglaff et al.
2019/0220727 A1 7/2019 Dohrmann et al.
2019/0222684 A1 7/2019 Li et al.
2019/0224049 A1 7/2019 Creasy et al.
2019/0228581 A1 7/2019 Dascola et al.
2019/0230215 A1 7/2019 Zhu et al.
2019/0230426 A1 7/2019 Chun
2019/0236130 A1 8/2019 Li et al.
2019/0236459 A1 8/2019 Cheyer et al.
2019/0237061 A1 8/2019 Rusak et al.
2019/0243902 A1 8/2019 Saeki et al.
2019/0244618 A1 8/2019 Newendorp et al.
2019/0251167 A1 8/2019 Krishnapura Subbaraya et al.
2019/0251339 A1 8/2019 Hawker
2019/0251960 A1 8/2019 Maker et al.
2019/0258852 A1 8/2019 Shimauchi et al.
2019/0259386 A1 8/2019 Kudurshian et al.
2019/0265886 A1 8/2019 Moon et al.
2019/0266246 A1 8/2019 Wang et al.
2019/0272318 A1 9/2019 Suzuki et al.
2019/0272818 A1 9/2019 Fernandez et al.
2019/0272825 A1 9/2019 O'Malley et al.
2019/0272831 A1 9/2019 Kajarekar
2019/0273963 A1 9/2019 Jobanputra et al.
2019/0278841 A1 9/2019 Pusateri et al.
2019/0279622 A1 9/2019 Liu et al.
2019/0281387 A1 9/2019 Woo et al.
2019/0287012 A1 9/2019 Asli et al.
2019/0287522 A1 9/2019 Lambourne et al.
2019/0294769 A1 9/2019 Lesso
2019/0294962 A1 9/2019 Vezer et al.
2019/0295529 A1 9/2019 Tomita
2019/0295540 A1 9/2019 Grima
2019/0295544 A1 9/2019 Garcia et al.
2019/0303442 A1 10/2019 Peitz et al.
2019/0303504 A1 10/2019 Pasumarthy
2019/0304438 A1 10/2019 Qian et al.
2019/0310765 A1 10/2019 Napolitano et al.
2019/0311031 A1 10/2019 Powell et al.
2019/0311708 A1 10/2019 Bengio et al.
2019/0311720 A1 10/2019 Pasko
2019/0318722 A1 10/2019 Bromand
2019/0318724 A1 10/2019 Chao et al.
2019/0318725 A1 10/2019 Le Roux et al.
2019/0318732 A1 10/2019 Huang et al.
2019/0318735 A1 10/2019 Chao et al.
2019/0318739 A1 10/2019 Garg et al.
2019/0324780 A1 10/2019 Zhu et al.
2019/0324925 A1 10/2019 Toyoda et al.
2019/0325081 A1 10/2019 Liu et al.
2019/0325866 A1 10/2019 Bromand et al.
2019/0333523 A1 10/2019 Kim et al.
2019/0335567 A1 10/2019 Boudreau et al.
2019/0339784 A1 11/2019 Lemay et al.
2019/0340252 A1 11/2019 Huyghe
2019/0341027 A1 11/2019 Vescovi et al.
2019/0341056 A1 11/2019 Paulik et al.
2019/0347063 A1 11/2019 Liu et al.
2019/0347525 A1 11/2019 Liem et al.
2019/0348022 A1 11/2019 Park et al.
2019/0349333 A1 11/2019 Pickover et al.
2019/0349622 A1 11/2019 Kim et al.
2019/0354256 A1 11/2019 Karunamuni et al.
2019/0354548 A1 11/2019 Orr et al.
2019/0355346 A1 11/2019 Bellegarda
2019/0355384 A1 11/2019 Sereshki et al.
2019/0361729 A1 11/2019 Gruber et al.
2019/0361978 A1 11/2019 Ray et al.
2019/0362252 A1 11/2019 Miller et al.
2019/0362557 A1 11/2019 Lacey et al.
2019/0369748 A1 12/2019 Hindi et al.
2019/0369842 A1 12/2019 Dolbakian et al.
2019/0369868 A1 12/2019 Jin et al.
2019/0370292 A1 12/2019 Irani et al.
2019/0370323 A1 12/2019 Davidson et al.
2019/0370443 A1 12/2019 Lesso
2019/0371315 A1 12/2019 Newendorp et al.
2019/0371316 A1 12/2019 Weinstein et al.
2019/0371317 A1 12/2019 Irani et al.
2019/0371331 A1 12/2019 Schramm et al.
2019/0372902 A1 12/2019 Piersol
2019/0373102 A1 12/2019 Weinstein et al.
2019/0377955 A1 12/2019 Swaminathan et al.
2019/0385043 A1 12/2019 Choudhary et al.
2019/0385418 A1 12/2019 Mixter et al.
2019/0387352 A1 12/2019 Jot et al.
2019/0391726 A1 12/2019 Iskandar et al.
2020/0012718 A1 1/2020 Kung et al.
2020/0019609 A1 1/2020 Yu et al.
2020/0020326 A1 1/2020 Srinivasan et al.
2020/0034421 A1 1/2020 Ferrucci et al.
2020/0035224 A1 1/2020 Ward et al.
2020/0042334 A1 2/2020 Radebaugh et al.
2020/0043467 A1 2/2020 Qian et al.
2020/0043471 A1 2/2020 Ma et al.
2020/0043482 A1 2/2020 Gruber et al.
2020/0043489 A1 2/2020 Bradley et al.
2020/0044485 A1 2/2020 Smith et al.
2020/0045164 A1 2/2020 Kwatra et al.
2020/0051554 A1 2/2020 Kim et al.
2020/0051565 A1 2/2020 Singh
2020/0051583 A1 2/2020 Wu et al.
2020/0053218 A1 2/2020 Gray
2020/0058299 A1 2/2020 Lee et al.
2020/0065601 A1 2/2020 Andreassen
2020/0073629 A1 3/2020 Lee et al.
2020/0075018 A1 3/2020 Chen
2020/0075040 A1 3/2020 Provost et al.
2020/0076538 A1 3/2020 Soultan et al.
2020/0081615 A1 3/2020 Yi et al.
2020/0082807 A1 3/2020 Kim et al.
2020/0084572 A1 3/2020 Jadav et al.
2020/0090393 A1 3/2020 Shin et al.
2020/0090658 A1 3/2020 Shin et al.
2020/0091958 A1 3/2020 Curtis et al.
2020/0092625 A1 3/2020 Raffle
2020/0098352 A1 3/2020 Feinstein et al.
2020/0098362 A1 3/2020 Piernot et al.
2020/0098368 A1 3/2020 Lemay et al.
2020/0103963 A1 4/2020 Kelly et al.

(56) References Cited

U.S. PATENT DOCUMENTS

2020/0104357 A1 4/2020 Bellegarda et al.
2020/0104362 A1 4/2020 Yang et al.
2020/0104369 A1 4/2020 Bellegarda
2020/0104668 A1 4/2020 Sanghavi et al.
2020/0105260 A1 4/2020 Piernot et al.
2020/0112454 A1 4/2020 Brown et al.
2020/0117717 A1 4/2020 Ramamurti et al.
2020/0118566 A1 4/2020 Zhou
2020/0118568 A1 4/2020 Kudurshian et al.
2020/0125820 A1 4/2020 Kim et al.
2020/0127988 A1 4/2020 Bradley et al.
2020/0134316 A1 4/2020 Krishnamurthy et al.
2020/0135180 A1 4/2020 Mukherjee et al.
2020/0135209 A1 4/2020 Delfarah et al.
2020/0135213 A1 4/2020 Kim et al.
2020/0135226 A1 4/2020 Mittal et al.
2020/0137230 A1 4/2020 Spohrer
2020/0142505 A1 5/2020 Choi et al.
2020/0142554 A1 5/2020 Lin et al.
2020/0143812 A1 5/2020 Walker, II et al.
2020/0143819 A1 5/2020 Delcroix et al.
2020/0152186 A1 5/2020 Koh et al.
2020/0159579 A1 5/2020 Shear et al.
2020/0159651 A1 5/2020 Myers
2020/0159801 A1 5/2020 Sekine
2020/0160179 A1 5/2020 Chien et al.
2020/0160838 A1 5/2020 Lee
2020/0168120 A1 5/2020 Rodriguez Bravo
2020/0169637 A1 5/2020 Sanghavi et al.
2020/0175566 A1 6/2020 Bender et al.
2020/0176004 A1 6/2020 Kleijn et al.
2020/0176018 A1 6/2020 Feinauer et al.
2020/0184057 A1 6/2020 Mukund
2020/0184964 A1 6/2020 Myers et al.
2020/0184966 A1 6/2020 Yavagal
2020/0193997 A1 6/2020 Piernot et al.
2020/0210142 A1 7/2020 Mu et al.
2020/0211566 A1 7/2020 Kang et al.
2020/0218074 A1 7/2020 Hoover et al.
2020/0218780 A1 7/2020 Jun et al.
2020/0218805 A1 7/2020 Liu et al.
2020/0219517 A1 7/2020 Wang et al.
2020/0220914 A1 7/2020 Carrigan et al.
2020/0221155 A1 7/2020 Hansen et al.
2020/0226481 A1 7/2020 Sim et al.
2020/0226823 A1 7/2020 Stachniak et al.
2020/0227034 A1 7/2020 Summa et al.
2020/0227044 A1 7/2020 Lindahl
2020/0228774 A1 7/2020 Kar et al.
2020/0243069 A1 7/2020 Amores et al.
2020/0243094 A1 7/2020 Thomson et al.
2020/0249985 A1 8/2020 Zeitlin
2020/0251111 A1 8/2020 Temkin et al.
2020/0252508 A1 8/2020 Gray
2020/0258508 A1 8/2020 Aggarwal et al.
2020/0258512 A1 8/2020 Smith et al.
2020/0258513 A1 8/2020 Smith et al.
2020/0267222 A1 8/2020 Phipps et al.
2020/0267503 A1 8/2020 Watkins et al.
2020/0272485 A1 8/2020 Karashchuk et al.
2020/0275216 A1 8/2020 Mckinney et al.
2020/0279556 A1 9/2020 Gruber et al.
2020/0279576 A1 9/2020 Binder et al.
2020/0279627 A1 9/2020 Nida et al.
2020/0285327 A1 9/2020 Hindi et al.
2020/0286472 A1 9/2020 Newendorp et al.
2020/0286493 A1 9/2020 Orr et al.
2020/0294487 A1 9/2020 Donohoe et al.
2020/0294494 A1 9/2020 Suyama et al.
2020/0294508 A1 9/2020 Kwasiborski et al.
2020/0298394 A1 9/2020 Han et al.
2020/0301950 A1 9/2020 Theo et al.
2020/0302356 A1 9/2020 Gruber et al.
2020/0302919 A1 9/2020 Greborio et al.
2020/0302925 A1 9/2020 Shah et al.
2020/0302930 A1 9/2020 Chen et al.
2020/0302932 A1 9/2020 Schramm et al.
2020/0304955 A1 9/2020 Gross et al.
2020/0304972 A1 9/2020 Gross et al.
2020/0305084 A1 9/2020 Freeman et al.
2020/0310513 A1 10/2020 Nicholson et al.
2020/0312315 A1 10/2020 Li et al.
2020/0312317 A1 10/2020 Kothari et al.
2020/0314191 A1 10/2020 Madhavan et al.
2020/0319850 A1 10/2020 Stasior et al.
2020/0320592 A1 10/2020 Soule et al.
2020/0320988 A1 10/2020 Rastogi et al.
2020/0322571 A1 10/2020 Awai
2020/0327895 A1 10/2020 Gruber et al.
2020/0333875 A1 10/2020 Bansal et al.
2020/0334068 A1 10/2020 Krishnamurthy et al.
2020/0334492 A1 10/2020 Zheng et al.
2020/0335121 A1 10/2020 Mosseri et al.
2020/0342082 A1 10/2020 Sapozhnykov et al.
2020/0342182 A1 10/2020 Johnson Premkumar et al.
2020/0342849 A1 10/2020 Yu et al.
2020/0342863 A1 10/2020 Aggarwal et al.
2020/0348813 A1 11/2020 Sharifi et al.
2020/0356243 A1 11/2020 Meyer et al.
2020/0356589 A1 11/2020 Rekik et al.
2020/0356610 A1 11/2020 Coimbra et al.
2020/0356634 A1 11/2020 Srinivasan et al.
2020/0357387 A1 11/2020 Prabhavalkar et al.
2020/0357391 A1 11/2020 Ghoshal et al.
2020/0357406 A1 11/2020 York et al.
2020/0357409 A1 11/2020 Sun et al.
2020/0364411 A1 11/2020 Evermann
2020/0364858 A1 11/2020 Kaethner et al.
2020/0365155 A1 11/2020 Milden
2020/0367006 A1 11/2020 Beckhardt
2020/0372633 A1 11/2020 Lee, II et al.
2020/0372719 A1 11/2020 Andjelic et al.
2020/0372904 A1 11/2020 Vescovi et al.
2020/0372905 A1 11/2020 Wang et al.
2020/0374243 A1 11/2020 Jina et al.
2020/0379610 A1 12/2020 Ford et al.
2020/0379640 A1 12/2020 Bellegarda et al.
2020/0379726 A1 12/2020 Blatz et al.
2020/0379727 A1 12/2020 Blatz et al.
2020/0379728 A1 12/2020 Gada et al.
2020/0380389 A1 12/2020 Eldeeb et al.
2020/0380956 A1 12/2020 Rossi et al.
2020/0380963 A1 12/2020 Chappidi et al.
2020/0380966 A1 12/2020 Acero et al.
2020/0380973 A1 12/2020 Novitchenko et al.
2020/0380980 A1 12/2020 Shum et al.
2020/0380984 A1 12/2020 Venkatraman et al.
2020/0380985 A1 12/2020 Gada et al.
2020/0382616 A1 12/2020 Vaishampayan et al.
2020/0382635 A1 12/2020 Vora et al.
2020/0411002 A1 12/2020 Lee et al.
2021/0110106 A1 12/2020 Vescovi et al.
2021/0006943 A1 1/2021 Gross et al.
2021/0011557 A1 1/2021 Lemay et al.
2021/0012113 A1 1/2021 Petill et al.
2021/0012775 A1 1/2021 Kang et al.
2021/0012776 A1 1/2021 Peterson et al.
2021/0035567 A1 2/2021 Newendorp et al.
2021/0043190 A1 2/2021 Wang et al.
2021/0065698 A1 3/2021 Topcu et al.
2021/0067631 A1 3/2021 Van Os et al.
2021/0072953 A1 3/2021 Amarilio et al.
2021/0073254 A1 3/2021 Ghafourifar et al.
2021/0073293 A1 3/2021 Fenton et al.
2021/0074264 A1 3/2021 Liang et al.
2021/0074295 A1 3/2021 Moreno et al.
2021/0082400 A1 3/2021 Vishnoi et al.
2021/0082420 A1 3/2021 Kraljic et al.
2021/0089124 A1 3/2021 Manjunath et al.
2021/0090314 A1 3/2021 Hussen et al.
2021/0092128 A1 3/2021 Leblang
2021/0097998 A1 4/2021 Kim et al.
2021/0099317 A1 4/2021 Hilleli et al.
2021/0104232 A1 4/2021 Lee et al.

(56) References Cited

U.S. PATENT DOCUMENTS

2021/0104236 A1 4/2021 Doggett et al.
2021/0105528 A1 4/2021 Van Os et al.
2021/0110115 A1 4/2021 Moritz et al.
2021/0110254 A1 4/2021 Duy et al.
2021/0117214 A1 4/2021 Presant et al.
2021/0124597 A1 4/2021 Ramakrishnan et al.
2021/0127031 A1 4/2021 Kanemoto
2021/0127220 A1 4/2021 Mathieu et al.
2021/0134318 A1 5/2021 Harvey et al.
2021/0141839 A1 5/2021 Tang et al.
2021/0143987 A1 5/2021 Xu et al.
2021/0149629 A1 5/2021 Martel et al.
2021/0149996 A1 5/2021 Bellegarda
2021/0150151 A1 5/2021 Jiaming et al.
2021/0151041 A1 5/2021 Gruber et al.
2021/0151053 A1 5/2021 Takahashi et al.
2021/0151070 A1 5/2021 Binder et al.
2021/0152684 A1 5/2021 Weinstein et al.
2021/0165826 A1 6/2021 Graham et al.
2021/0173555 A1 6/2021 Kandur Raja et al.
2021/0174020 A1 6/2021 Sohn et al.
2021/0174022 A1 6/2021 Ishikawa et al.
2021/0174403 A1 6/2021 Bellini et al.
2021/0176521 A1 6/2021 Matthews
2021/0182716 A1 6/2021 Muramoto et al.
2021/0191603 A1 6/2021 Napolitano et al.
2021/0191968 A1 6/2021 Orr et al.
2021/0208752 A1 7/2021 Hwang
2021/0208841 A1 7/2021 Wilberding
2021/0210089 A1 7/2021 Ma et al.
2021/0216134 A1 7/2021 Fukunaga et al.
2021/0216760 A1 7/2021 Dominic et al.
2021/0224032 A1 7/2021 Ryan et al.
2021/0224474 A1 7/2021 Jerome et al.
2021/0233532 A1 7/2021 Aram et al.
2021/0247959 A1 8/2021 Agarwal et al.
2021/0248804 A1 8/2021 Hussen Abdelaziz et al.
2021/0249009 A1 8/2021 Manjunath et al.
2021/0256980 A1 8/2021 George-Svahn et al.
2021/0258554 A1 8/2021 Bruls et al.
2021/0258881 A1 8/2021 Freeman et al.
2021/0264913 A1 8/2021 Schramm et al.
2021/0264916 A1 8/2021 Kim et al.
2021/0271333 A1 9/2021 Hindi et al.
2021/0273894 A1 9/2021 Tian et al.
2021/0278956 A1 9/2021 Dolbakian et al.
2021/0279548 A1 9/2021 Adan et al.
2021/0280180 A1 9/2021 Skobeltsyn et al.
2021/0281965 A1 9/2021 Malik et al.
2021/0287080 A1 9/2021 Moloney
2021/0294569 A1 9/2021 Piersol et al.
2021/0294571 A1 9/2021 Carson et al.
2021/0295602 A1 9/2021 Scapel et al.
2021/0303116 A1 9/2021 Barlow
2021/0303342 A1 9/2021 Dunn et al.
2021/0304075 A1 9/2021 Duong et al.
2021/0306812 A1 9/2021 Gross et al.
2021/0312917 A1 10/2021 Weksler et al.
2021/0312930 A1 10/2021 Sugaya
2021/0312931 A1 10/2021 Paulik et al.
2021/0313019 A1 10/2021 Pribanic et al.
2021/0314440 A1 10/2021 Matias et al.
2021/0318901 A1 10/2021 Gruber et al.
2021/0319178 A1 10/2021 Zhang
2021/0327409 A1 10/2021 Naik
2021/0327410 A1 10/2021 Beaufays et al.
2021/0334528 A1 10/2021 Bray et al.
2021/0335342 A1 10/2021 Yuan et al.
2021/0342050 A1 11/2021 Wang
2021/0342212 A1 11/2021 Neumann
2021/0349605 A1 11/2021 Nonaka et al.
2021/0349608 A1 11/2021 Blatz et al.
2021/0350799 A1 11/2021 Hansen et al.
2021/0350803 A1 11/2021 Hansen et al.
2021/0350810 A1 11/2021 Phipps et al.
2021/0352115 A1 11/2021 Hansen et al.
2021/0357172 A1 11/2021 Sinesio et al.
2021/0358294 A1 11/2021 Parashar et al.
2021/0365161 A1 11/2021 Ellis et al.
2021/0365174 A1 11/2021 Ellis et al.
2021/0365641 A1 11/2021 Zhang et al.
2021/0365863 A1 11/2021 Friske et al.
2021/0366473 A1 11/2021 Maeng
2021/0366475 A1 11/2021 Wilkosz et al.
2021/0366480 A1 11/2021 Lemay et al.
2021/0373851 A1 12/2021 Stasior et al.
2021/0375275 A1 12/2021 Yoon et al.
2021/0375290 A1 12/2021 Hu et al.
2021/0377381 A1 12/2021 Aggarwal et al.
2021/0390259 A1 12/2021 Hildick-Smith et al.
2021/0390955 A1 12/2021 Piernot et al.
2021/0393168 A1 12/2021 Santarelli et al.
2021/0398187 A1 12/2021 Narayanan et al.
2021/0402306 A1 12/2021 Huang
2021/0406260 A1 12/2021 Sharifi et al.
2021/0407318 A1 12/2021 Pitschel et al.
2021/0407502 A1 12/2021 Vescovi et al.
2022/0004825 A1 1/2022 Xie et al.
2022/0013106 A1 1/2022 Deng et al.
2022/0019292 A1 1/2022 Lemay et al.
2022/0020367 A1 1/2022 Orkin et al.
2022/0021631 A1 1/2022 Jina et al.
2022/0021978 A1 1/2022 Gui et al.
2022/0028379 A1 1/2022 Carbune et al.
2022/0028387 A1 1/2022 Walker et al.
2022/0030345 A1 1/2022 Gong et al.
2022/0035999 A1 2/2022 Pawelec
2022/0043986 A1 2/2022 Nell et al.
2022/0050661 A1 2/2022 Lange et al.
2022/0067283 A1 3/2022 Bellegarda et al.
2022/0068278 A1 3/2022 York et al.
2022/0083986 A1 3/2022 Duffy et al.
2022/0084511 A1 3/2022 Nickson et al.
2022/0092262 A1 3/2022 Ni et al.
2022/0093088 A1 3/2022 Sridhar et al.
2022/0093095 A1 3/2022 Dighe et al.
2022/0093098 A1 3/2022 Samal et al.
2022/0093101 A1 3/2022 Krishnan et al.
2022/0093109 A1 3/2022 Orr et al.
2022/0093110 A1 3/2022 Kim et al.
2022/0094765 A1 3/2022 Niewczas
2022/0100789 A1 3/2022 Kumar et al.
2022/0103491 A1 3/2022 Yang et al.
2022/0107780 A1 4/2022 Gruber et al.
2022/0114327 A1 4/2022 Faaborg et al.
2022/0115016 A1 4/2022 Whalin
2022/0122615 A1 4/2022 Chen et al.
2022/0130126 A1 4/2022 Delgado et al.
2022/0139396 A1 5/2022 Gada et al.
2022/0148587 A1 5/2022 Drummie et al.
2022/0155857 A1 5/2022 Lee et al.
2022/0156041 A1 5/2022 Newendorp et al.
2022/0157310 A1 5/2022 Newendorp et al.
2022/0157315 A1 5/2022 Raux et al.
2022/0180868 A1 6/2022 Sharifi et al.
2022/0197491 A1 6/2022 Meyer et al.
2022/0198025 A1 6/2022 Gupta et al.
2022/0206298 A1 6/2022 Goodman
2022/0214775 A1 7/2022 Shah et al.
2022/0215159 A1 7/2022 Qian et al.
2022/0222437 A1 7/2022 Lauber
2022/0229985 A1 7/2022 Bellegarda et al.
2022/0230653 A1 7/2022 Binder et al.
2022/0253969 A1 8/2022 Kamenetskaya et al.
2022/0254338 A1 8/2022 Gruber et al.
2022/0254339 A1 8/2022 Acero et al.
2022/0254347 A1 8/2022 Lindahl
2022/0261468 A1 8/2022 Lin et al.
2022/0262354 A1 8/2022 Greborio et al.
2022/0264262 A1 8/2022 Gruber et al.
2022/0284901 A1 9/2022 Novitchenko et al.
2022/0291816 A1 9/2022 Fan et al.
2022/0292128 A1 9/2022 Sharifi et al.
2022/0293124 A1 9/2022 Weinberg et al.

(56) References Cited

U.S. PATENT DOCUMENTS

2022/0293125 A1 9/2022 Maddika et al.
2022/0295170 A1 9/2022 Ito et al.
2022/0300094 A1 9/2022 Hindi et al.
2022/0301549 A1 9/2022 Lee et al.
2022/0301566 A1 9/2022 Van Os et al.
2022/0308718 A1 9/2022 Klein et al.
2022/0329691 A1 10/2022 Chinthakunta et al.
2022/0343066 A1 10/2022 Kwong et al.
2022/0366889 A1 11/2022 Yerroju et al.
2022/0374109 A1 11/2022 Kramer et al.
2022/0374110 A1 11/2022 Ramaswamy et al.
2022/0374597 A1 11/2022 Bellegarda et al.
2022/0374727 A1 11/2022 Hansen et al.
2022/0375466 A1 11/2022 Hergenrader et al.
2022/0375553 A1 11/2022 Lasko et al.
2022/0382843 A1 12/2022 Gong et al.
2022/0382994 A1 12/2022 Cox et al.
2022/0383044 A1 12/2022 Bellegarda
2022/0383864 A1 12/2022 Gruber et al.
2022/0383872 A1 12/2022 Li et al.
2022/0391585 A1 12/2022 Bellegarda et al.
2022/0392446 A1 12/2022 Webber et al.
2022/0405117 A1 12/2022 Gruber et al.
2022/0406301 A1 12/2022 Barros et al.
2022/0406309 A1 12/2022 Piernot et al.
2022/0408173 A1 12/2022 Gong et al.
2023/0013615 A1 1/2023 Sanghavi et al.
2023/0017115 A1 1/2023 Sanghavi et al.
2023/0018457 A1 1/2023 Zeitlin
2023/0026764 A1 1/2023 Karashchuk et al.
2023/0029028 A1 1/2023 Aitken et al.
2023/0035643 A1 2/2023 Binder et al.
2023/0035941 A1 2/2023 Herman et al.
2023/0036059 A1 2/2023 Blatz et al.
2023/0036798 A1 2/2023 Newendorp et al.
2023/0040703 A1 2/2023 Lemay et al.
2023/0042224 A1 2/2023 Patel et al.
2023/0048256 A1 2/2023 Gui et al.
2023/0051062 A1 2/2023 Hu et al.
2023/0057442 A1 2/2023 Stasior et al.
2023/0058929 A1 2/2023 Lasko et al.
2023/0066552 A1 3/2023 Van Os et al.
2023/0072481 A1 3/2023 Acero et al.
2023/0081605 A1 3/2023 O'Mara et al.
2023/0087244 A1 3/2023 Akmal et al.
2023/0098174 A1 3/2023 Simes et al.
2023/0111509 A1 4/2023 Kim et al.
2023/0112859 A1 4/2023 Vilhauer et al.
2023/0134970 A1 5/2023 Rasipuram et al.

FOREIGN PATENT DOCUMENTS

AU 2015101171 A4 10/2015
AU 2017203668 A1 1/2018
AU 2018100187 A4 3/2018
AU 2017222436 A1 10/2018
CA 2666438 C 6/2013
CH 709795 A1 12/2015
CN 102866828 A 1/2013
CN 102870065 A 1/2013
CN 102882752 A 1/2013
CN 102890936 A 1/2013
CN 102893327 A 1/2013
CN 102915731 A 2/2013
CN 102917004 A 2/2013
CN 102917271 A 2/2013
CN 102918493 A 2/2013
CN 102939515 A 2/2013
CN 102955652 A 3/2013
CN 103035240 A 4/2013
CN 103035251 A 4/2013
CN 103038728 A 4/2013
CN 103064956 A 4/2013
CN 103078995 A 5/2013
CN 103093334 A 5/2013
CN 103093755 A 5/2013
CN 103105995 A 5/2013
CN 103109249 A 5/2013
CN 103135916 A 6/2013
CN 103187053 A 7/2013
CN 103197963 A 7/2013
CN 103198831 A 7/2013
CN 103209369 A 7/2013
CN 103217892 A 7/2013
CN 103226949 A 7/2013
CN 103236260 A 8/2013
CN 103246638 A 8/2013
CN 103268315 A 8/2013
CN 103277974 A 9/2013
CN 103280218 A 9/2013
CN 103282957 A 9/2013
CN 103292437 A 9/2013
CN 103324100 A 9/2013
CN 103327063 A 9/2013
CN 103365279 A 10/2013
CN 103366741 A 10/2013
CN 203249629 U 10/2013
CN 103390016 A 11/2013
CN 103412789 A 11/2013
CN 103414949 A 11/2013
CN 103426428 A 12/2013
CN 103455234 A 12/2013
CN 103456303 A 12/2013
CN 103456304 A 12/2013
CN 103456306 A 12/2013
CN 103457837 A 12/2013
CN 103475551 A 12/2013
CN 103477592 A 12/2013
CN 103533143 A 1/2014
CN 103533154 A 1/2014
CN 103543902 A 1/2014
CN 103546453 A 1/2014
CN 103562863 A 2/2014
CN 103582896 A 2/2014
CN 103593054 A 2/2014
CN 103608859 A 2/2014
CN 103620605 A 3/2014
CN 103645876 A 3/2014
CN 103677261 A 3/2014
CN 103686723 A 3/2014
CN 103714816 A 4/2014
CN 103716454 A 4/2014
CN 103727948 A 4/2014
CN 103730120 A 4/2014
CN 103744761 A 4/2014
CN 103748531 A 4/2014
CN 103760984 A 4/2014
CN 103761104 A 4/2014
CN 103765385 A 4/2014
CN 103778527 A 5/2014
CN 103780758 A 5/2014
CN 103792985 A 5/2014
CN 103794212 A 5/2014
CN 103795850 A 5/2014
CN 103809548 A 5/2014
CN 103841268 A 6/2014
CN 103885663 A 6/2014
CN 103902373 A 7/2014
CN 103930945 A 7/2014
CN 103942932 A 7/2014
CN 103959751 A 7/2014
CN 203721183 U 7/2014
CN 103971680 A 8/2014
CN 104007832 A 8/2014
CN 102693729 B 9/2014
CN 104036774 A 9/2014
CN 104038621 A 9/2014
CN 104050153 A 9/2014
CN 104090652 A 10/2014
CN 104092829 A 10/2014
CN 104113471 A 10/2014
CN 104125322 A 10/2014
CN 104144377 A 11/2014
CN 104145304 A 11/2014

(56) References Cited

FOREIGN PATENT DOCUMENTS

| | | | |
|---|---|---|---|
| CN | 104169837 | A | 11/2014 |
| CN | 104180815 | A | 12/2014 |
| CN | 104185868 | A | 12/2014 |
| CN | 104219785 | A | 12/2014 |
| CN | 104240701 | A | 12/2014 |
| CN | 104243699 | A | 12/2014 |
| CN | 104281259 | A | 1/2015 |
| CN | 104281390 | A | 1/2015 |
| CN | 104284257 | A | 1/2015 |
| CN | 104284486 | A | 1/2015 |
| CN | 104335205 | A | 2/2015 |
| CN | 104335207 | A | 2/2015 |
| CN | 104335234 | A | 2/2015 |
| CN | 104350454 | A | 2/2015 |
| CN | 104360990 | A | 2/2015 |
| CN | 104374399 | A | 2/2015 |
| CN | 104378723 | A | 2/2015 |
| CN | 104423625 | A | 3/2015 |
| CN | 104423780 | A | 3/2015 |
| CN | 104427104 | A | 3/2015 |
| CN | 104463552 | A | 3/2015 |
| CN | 104464733 | A | 3/2015 |
| CN | 104487929 | A | 4/2015 |
| CN | 104516522 | A | 4/2015 |
| CN | 104520849 | A | 4/2015 |
| CN | 104573472 | A | 4/2015 |
| CN | 104575493 | A | 4/2015 |
| CN | 104575501 | A | 4/2015 |
| CN | 104575504 | A | 4/2015 |
| CN | 104584010 | A | 4/2015 |
| CN | 104584096 | A | 4/2015 |
| CN | 104584601 | A | 4/2015 |
| CN | 104604274 | A | 5/2015 |
| CN | 104679472 | A | 6/2015 |
| CN | 104685898 | A | 6/2015 |
| CN | 104699746 | A | 6/2015 |
| CN | 104731441 | A | 6/2015 |
| CN | 104769584 | A | 7/2015 |
| CN | 104769670 | A | 7/2015 |
| CN | 104798012 | A | 7/2015 |
| CN | 104821167 | A | 8/2015 |
| CN | 104821934 | A | 8/2015 |
| CN | 104836909 | A | 8/2015 |
| CN | 104854583 | A | 8/2015 |
| CN | 104867492 | A | 8/2015 |
| CN | 104869342 | A | 8/2015 |
| CN | 104951077 | A | 9/2015 |
| CN | 104967748 | A | 10/2015 |
| CN | 104969289 | A | 10/2015 |
| CN | 104978963 | A | 10/2015 |
| CN | 105025051 | A | 11/2015 |
| CN | 105027197 | A | 11/2015 |
| CN | 105093526 | A | 11/2015 |
| CN | 105100356 | A | 11/2015 |
| CN | 105144136 | A | 12/2015 |
| CN | 105164678 | A | 12/2015 |
| CN | 105164719 | A | 12/2015 |
| CN | 105190607 | A | 12/2015 |
| CN | 105247511 | A | 1/2016 |
| CN | 105247551 | A | 1/2016 |
| CN | 105264524 | A | 1/2016 |
| CN | 105264903 | A | 1/2016 |
| CN | 105265005 | A | 1/2016 |
| CN | 105278681 | A | 1/2016 |
| CN | 105320251 | A | 2/2016 |
| CN | 105320726 | A | 2/2016 |
| CN | 105338425 | A | 2/2016 |
| CN | 105379234 | A | 3/2016 |
| CN | 105427122 | A | 3/2016 |
| CN | 105430186 | A | 3/2016 |
| CN | 105468137 | A | 4/2016 |
| CN | 105471705 | A | 4/2016 |
| CN | 105472587 | A | 4/2016 |
| CN | 105516441 | A | 4/2016 |
| CN | 105554217 | A | 5/2016 |
| CN | 105556592 | A | 5/2016 |
| CN | 105677765 | A | 6/2016 |
| CN | 105791920 | A | 7/2016 |
| CN | 105808200 | A | 7/2016 |
| CN | 105830048 | A | 8/2016 |
| CN | 105869641 | A | 8/2016 |
| CN | 105872222 | A | 8/2016 |
| CN | 105917311 | A | 8/2016 |
| CN | 106030699 | A | 10/2016 |
| CN | 106062734 | A | 10/2016 |
| CN | 106062790 | A | 10/2016 |
| CN | 106164909 | A | 11/2016 |
| CN | 106415412 | A | 2/2017 |
| CN | 106462383 | A | 2/2017 |
| CN | 106462617 | A | 2/2017 |
| CN | 106463114 | A | 2/2017 |
| CN | 106465074 | A | 2/2017 |
| CN | 106471570 | A | 3/2017 |
| CN | 106534469 | A | 3/2017 |
| CN | 106558310 | A | 4/2017 |
| CN | 106575195 | A | 4/2017 |
| CN | 106575501 | A | 4/2017 |
| CN | 106773742 | A | 5/2017 |
| CN | 106776581 | A | 5/2017 |
| CN | 107004412 | A | 8/2017 |
| CN | 107450800 | A | 12/2017 |
| CN | 107480161 | A | 12/2017 |
| CN | 107491285 | A | 12/2017 |
| CN | 107491468 | A | 12/2017 |
| CN | 107491469 | A | 12/2017 |
| CN | 107506037 | A | 12/2017 |
| CN | 107545262 | A | 1/2018 |
| CN | 107608998 | A | 1/2018 |
| CN | 107615378 | A | 1/2018 |
| CN | 107623616 | A | 1/2018 |
| CN | 107786730 | A | 3/2018 |
| CN | 107852436 | A | 3/2018 |
| CN | 107871500 | A | 4/2018 |
| CN | 107919123 | A | 4/2018 |
| CN | 107924313 | A | 4/2018 |
| CN | 107978313 | A | 5/2018 |
| CN | 108268187 | A | 7/2018 |
| CN | 108647681 | A | 10/2018 |
| CN | 109447234 | A | 3/2019 |
| CN | 109657629 | A | 4/2019 |
| CN | 110135411 | A | 8/2019 |
| CN | 110263144 | A | 9/2019 |
| CN | 105164719 | B | 11/2019 |
| CN | 110531860 | A | 12/2019 |
| CN | 110598671 | A | 12/2019 |
| CN | 110647274 | A | 1/2020 |
| CN | 110825469 | A | 2/2020 |
| CN | 110945840 | A | 3/2020 |
| CN | 111124224 | A | 5/2020 |
| CN | 107123417 | B | 6/2020 |
| CN | 111316203 | A | 6/2020 |
| CN | 112204507 | A | 1/2021 |
| DE | 202016008226 | U1 | 5/2017 |
| EP | 2551784 | A1 | 1/2013 |
| EP | 2555536 | A1 | 2/2013 |
| EP | 2575128 | A2 | 4/2013 |
| EP | 2608610 | A1 | 6/2013 |
| EP | 2632129 | A1 | 8/2013 |
| EP | 2639792 | A1 | 9/2013 |
| EP | 2669889 | A2 | 12/2013 |
| EP | 2672229 | A2 | 12/2013 |
| EP | 2672231 | A2 | 12/2013 |
| EP | 2675147 | A1 | 12/2013 |
| EP | 2680257 | A1 | 1/2014 |
| EP | 2683147 | A1 | 1/2014 |
| EP | 2683175 | A1 | 1/2014 |
| EP | 2672231 | A3 | 4/2014 |
| EP | 2717259 | A2 | 4/2014 |
| EP | 2725577 | A2 | 4/2014 |
| EP | 2733598 | A2 | 5/2014 |
| EP | 2733896 | A1 | 5/2014 |
| EP | 2741175 | A2 | 6/2014 |
| EP | 2743846 | A2 | 6/2014 |
| EP | 2760015 | A1 | 7/2014 |

(56) References Cited

FOREIGN PATENT DOCUMENTS

| | | | |
|---|---|---|---|
| EP | 2779160 | A1 | 9/2014 |
| EP | 2781883 | A2 | 9/2014 |
| EP | 2787683 | A1 | 10/2014 |
| EP | 2801890 | A1 | 11/2014 |
| EP | 2801972 | A1 | 11/2014 |
| EP | 2801974 | A2 | 11/2014 |
| EP | 2824564 | A1 | 1/2015 |
| EP | 2849177 | A1 | 3/2015 |
| EP | 2879402 | A1 | 6/2015 |
| EP | 2881939 | A1 | 6/2015 |
| EP | 2891049 | A1 | 7/2015 |
| EP | 2915021 | A2 | 9/2015 |
| EP | 2930715 | A1 | 10/2015 |
| EP | 2938022 | A1 | 10/2015 |
| EP | 2940556 | A1 | 11/2015 |
| EP | 2947859 | A1 | 11/2015 |
| EP | 2950307 | A1 | 12/2015 |
| EP | 2957986 | A1 | 12/2015 |
| EP | 2973380 | A2 | 1/2016 |
| EP | 2985984 | A2 | 2/2016 |
| EP | 2988513 | A1 | 2/2016 |
| EP | 2891049 | A4 | 3/2016 |
| EP | 3032532 | A1 | 6/2016 |
| EP | 3035329 | A1 | 6/2016 |
| EP | 3036594 | A2 | 6/2016 |
| EP | 3038333 | A1 | 6/2016 |
| EP | 3107101 | A1 | 12/2016 |
| EP | 3115905 | A1 | 1/2017 |
| EP | 3125097 | A2 | 2/2017 |
| EP | 3132442 | A1 | 2/2017 |
| EP | 2672231 | B1 | 5/2017 |
| EP | 3161612 | A1 | 5/2017 |
| EP | 3200185 | A1 | 8/2017 |
| EP | 3224708 | A1 | 10/2017 |
| EP | 3227771 | A1 | 10/2017 |
| EP | 3246916 | A1 | 11/2017 |
| EP | 3270658 | A1 | 1/2018 |
| EP | 3300074 | A1 | 3/2018 |
| EP | 3336805 | A1 | 6/2018 |
| EP | 2973380 | B1 | 8/2018 |
| EP | 2983065 | B1 | 8/2018 |
| EP | 3382530 | A1 | 10/2018 |
| EP | 3392876 | A1 | 10/2018 |
| EP | 3401773 | A1 | 11/2018 |
| EP | 2973002 | B1 | 6/2019 |
| EP | 3506151 | A1 | 7/2019 |
| EP | 3550483 | A1 | 10/2019 |
| EP | 3567584 | A1 | 11/2019 |
| EP | 3588912 | A1 | 1/2020 |
| EP | 3323058 | B1 | 2/2020 |
| EP | 3321928 | B1 | 4/2020 |
| EP | 4131256 | A1 | 2/2023 |
| JP | 2013-37688 | A | 2/2013 |
| JP | 2013-46171 | A | 3/2013 |
| JP | 2013-511214 | A | 3/2013 |
| JP | 2013-65284 | A | 4/2013 |
| JP | 2013-73240 | A | 4/2013 |
| JP | 2013-513315 | A | 4/2013 |
| JP | 2013-80476 | A | 5/2013 |
| JP | 2013-88535 | A | 5/2013 |
| JP | 2013-517566 | A | 5/2013 |
| JP | 2013-131087 | A | 7/2013 |
| JP | 2013-134430 | A | 7/2013 |
| JP | 2013-134729 | A | 7/2013 |
| JP | 2013-140520 | A | 7/2013 |
| JP | 2013-527947 | A | 7/2013 |
| JP | 2013-528012 | A | 7/2013 |
| JP | 2013-148419 | A | 8/2013 |
| JP | 2013-156349 | A | 8/2013 |
| JP | 2013-174987 | A | 9/2013 |
| JP | 2013-535059 | A | 9/2013 |
| JP | 2013-200265 | A | 10/2013 |
| JP | 2013-200423 | A | 10/2013 |
| JP | 2013-205999 | A | 10/2013 |
| JP | 2013-231655 | A | 11/2013 |
| JP | 2013-238935 | A | 11/2013 |
| JP | 2013-238936 | A | 11/2013 |
| JP | 2013-248292 | A | 12/2013 |
| JP | 2013-257694 | A | 12/2013 |
| JP | 2013-258600 | A | 12/2013 |
| JP | 2014-2586 | A | 1/2014 |
| JP | 2014-10688 | A | 1/2014 |
| JP | 2014-502445 | A | 1/2014 |
| JP | 2014-26629 | A | 2/2014 |
| JP | 2014-45449 | A | 3/2014 |
| JP | 2014-507903 | A | 3/2014 |
| JP | 2014-60600 | A | 4/2014 |
| JP | 2014-72586 | A | 4/2014 |
| JP | 2014-77969 | A | 5/2014 |
| JP | 2014-89711 | A | 5/2014 |
| JP | 2014-109889 | A | 6/2014 |
| JP | 2014-124332 | A | 7/2014 |
| JP | 2014-126600 | A | 7/2014 |
| JP | 2014-127754 | A | 7/2014 |
| JP | 2014-140121 | A | 7/2014 |
| JP | 2014-518409 | A | 7/2014 |
| JP | 2014-142566 | A | 8/2014 |
| JP | 2014-145842 | A | 8/2014 |
| JP | 2014-146940 | A | 8/2014 |
| JP | 2014-150323 | A | 8/2014 |
| JP | 2014-519648 | A | 8/2014 |
| JP | 2014-182042 | A | 9/2014 |
| JP | 2014-524627 | A | 9/2014 |
| JP | 2014-191272 | A | 10/2014 |
| JP | 2014-219614 | A | 11/2014 |
| JP | 2014-222514 | A | 11/2014 |
| JP | 2015-1931 | A | 1/2015 |
| JP | 2015-4928 | A | 1/2015 |
| JP | 2015-8001 | A | 1/2015 |
| JP | 2015-10979 | A | 1/2015 |
| JP | 2015-12301 | A | 1/2015 |
| JP | 2015-18365 | A | 1/2015 |
| JP | 2015-501022 | A | 1/2015 |
| JP | 2015-501034 | A | 1/2015 |
| JP | 2015-504619 | A | 2/2015 |
| JP | 2015-41845 | A | 3/2015 |
| JP | 2015-52500 | A | 3/2015 |
| JP | 2015-60423 | A | 3/2015 |
| JP | 2015-81971 | A | 4/2015 |
| JP | 2015-83938 | A | 4/2015 |
| JP | 2015-94848 | A | 5/2015 |
| JP | 2015-514254 | A | 5/2015 |
| JP | 2015-519675 | A | 7/2015 |
| JP | 2015-520409 | A | 7/2015 |
| JP | 2015-524974 | A | 8/2015 |
| JP | 2015-526776 | A | 9/2015 |
| JP | 2015-527683 | A | 9/2015 |
| JP | 2015-528140 | A | 9/2015 |
| JP | 2015-528918 | A | 10/2015 |
| JP | 2015-531909 | A | 11/2015 |
| JP | 2016-504651 | A | 2/2016 |
| JP | 2016-35614 | A | 3/2016 |
| JP | 2016-508007 | A | 3/2016 |
| JP | 2016-71247 | A | 5/2016 |
| JP | 2016-119615 | A | 6/2016 |
| JP | 2016-151928 | A | 8/2016 |
| JP | 2016-524193 | A | 8/2016 |
| JP | 2016-156845 | A | 9/2016 |
| JP | 2016-536648 | A | 11/2016 |
| JP | 2017-11608 | A | 1/2017 |
| JP | 2017-19331 | A | 1/2017 |
| JP | 2017-516153 | A | 6/2017 |
| JP | 2017-123187 | A | 7/2017 |
| JP | 2017-211608 | A | 11/2017 |
| JP | 2017-537361 | A | 12/2017 |
| JP | 6291147 | B1 | 2/2018 |
| JP | 2018-64297 | A | 4/2018 |
| JP | 2018-511095 | A | 4/2018 |
| JP | 2018-101242 | A | 6/2018 |
| JP | 2018-113035 | A | 7/2018 |
| JP | 2018-525950 | A | 9/2018 |
| JP | 2018-536889 | A | 12/2018 |
| KR | 10-2013-0035983 | A | 4/2013 |
| KR | 10-2013-0086750 | A | 8/2013 |

(56) References Cited

FOREIGN PATENT DOCUMENTS

| | | | |
|---|---|---|---|
| KR | 10-2013-0090947 | A | 8/2013 |
| KR | 10-2013-0108563 | A | 10/2013 |
| KR | 10-1334342 | B1 | 11/2013 |
| KR | 10-2013-0131252 | A | 12/2013 |
| KR | 10-2013-0133629 | A | 12/2013 |
| KR | 10-2014-0007282 | A | 1/2014 |
| KR | 10-2014-0024271 | A | 2/2014 |
| KR | 10-2014-0025996 | A | 3/2014 |
| KR | 10-2014-0031283 | A | 3/2014 |
| KR | 10-2014-0033574 | A | 3/2014 |
| KR | 10-2014-0042994 | A | 4/2014 |
| KR | 10-2014-0048779 | A | 4/2014 |
| KR | 10-2014-0055204 | A | 5/2014 |
| KR | 10-2014-0059697 | A | 5/2014 |
| KR | 10-2014-0068752 | A | 6/2014 |
| KR | 10-2014-0071208 | A | 6/2014 |
| KR | 10-2014-0088449 | A | 7/2014 |
| KR | 10-2014-0093949 | A | 7/2014 |
| KR | 10-2014-0106715 | A | 9/2014 |
| KR | 10-2014-0107253 | A | 9/2014 |
| KR | 10-2014-0147557 | A | 12/2014 |
| KR | 10-2015-0006454 | A | 1/2015 |
| KR | 10-2015-0013631 | A | 2/2015 |
| KR | 10-2015-0025059 | A | 3/2015 |
| KR | 10-1506510 | B1 | 3/2015 |
| KR | 10-2015-0038375 | A | 4/2015 |
| KR | 10-2015-0039380 | A | 4/2015 |
| KR | 10-2015-0041974 | A | 4/2015 |
| KR | 10-2015-0043512 | A | 4/2015 |
| KR | 10-1510013 | B1 | 4/2015 |
| KR | 10-2015-0062811 | A | 6/2015 |
| KR | 10-2015-0095624 | A | 8/2015 |
| KR | 10-1555742 | B1 | 9/2015 |
| KR | 10-2015-0113127 | A | 10/2015 |
| KR | 10-2015-0131262 | A | 11/2015 |
| KR | 10-2015-0138109 | A | 12/2015 |
| KR | 10-2016-0004351 | A | 1/2016 |
| KR | 10-2016-0010523 | A | 1/2016 |
| KR | 10-2016-0040279 | A | 4/2016 |
| KR | 10-2016-0055839 | A | 5/2016 |
| KR | 10-2016-0065503 | A | 6/2016 |
| KR | 10-2016-0101079 | A | 8/2016 |
| KR | 10-2016-0101198 | A | 8/2016 |
| KR | 10-2016-0105847 | A | 9/2016 |
| KR | 10-2016-0121585 | A | 10/2016 |
| KR | 10-2016-0127165 | A | 11/2016 |
| KR | 10-2016-0140694 | A | 12/2016 |
| KR | 10-2016-0147854 | A | 12/2016 |
| KR | 10-2017-0004482 | A | 1/2017 |
| KR | 10-2017-0036805 | A | 4/2017 |
| KR | 10-2017-0096774 | A | 8/2017 |
| KR | 10-2017-0104006 | A | 9/2017 |
| KR | 10-2017-0107058 | A | 9/2017 |
| KR | 10-1776673 | B1 | 9/2017 |
| KR | 10-2018-0032632 | A | 3/2018 |
| KR | 10-2018-0034637 | A | 4/2018 |
| KR | 10-2018-0122837 | A | 11/2018 |
| KR | 10-2018-0133525 | A | 12/2018 |
| KR | 10-2018-0135877 | A | 12/2018 |
| KR | 10-1959328 | B1 | 3/2019 |
| KR | 10-2020-0007926 | A | 1/2020 |
| KR | 10-2020-0105519 | A | 9/2020 |
| RU | 2012141604 | A | 4/2014 |
| TW | 201312548 | A | 3/2013 |
| TW | 201407184 | A | 2/2014 |
| TW | 201610982 | A | 3/2016 |
| TW | 201629750 | A | 8/2016 |
| WO | 01/35391 | A1 | 5/2001 |
| WO | 2011/084156 | A2 | 7/2011 |
| WO | 2011/088053 | A2 | 7/2011 |
| WO | 2011/116309 | A1 | 9/2011 |
| WO | 2012/033312 | A1 | 3/2012 |
| WO | 2012/092562 | A1 | 7/2012 |
| WO | 2012/145227 | A1 | 10/2012 |
| WO | 2012/167168 | A2 | 12/2012 |
| WO | 2012/173902 | A2 | 12/2012 |
| WO | 2013/009578 | A2 | 1/2013 |
| WO | 2013/022135 | A1 | 2/2013 |
| WO | 2013/022223 | A2 | 2/2013 |
| WO | 2013/048880 | A1 | 4/2013 |
| WO | 2013/049358 | A1 | 4/2013 |
| WO | 2013/057153 | A1 | 4/2013 |
| WO | 2013/101489 | A1 | 7/2013 |
| WO | 2013/118988 | A1 | 8/2013 |
| WO | 2013/122310 | A1 | 8/2013 |
| WO | 2013/128999 | A1 | 9/2013 |
| WO | 2013/133533 | A1 | 9/2013 |
| WO | 2013/137660 | A1 | 9/2013 |
| WO | 2013/163113 | A1 | 10/2013 |
| WO | 2013/163857 | A1 | 11/2013 |
| WO | 2013/169842 | A2 | 11/2013 |
| WO | 2013/173504 | A1 | 11/2013 |
| WO | 2013/173511 | A2 | 11/2013 |
| WO | 2013/176847 | A1 | 11/2013 |
| WO | 2013/184953 | A1 | 12/2013 |
| WO | 2013/184990 | A1 | 12/2013 |
| WO | 2014/003138 | A1 | 1/2014 |
| WO | 2014/004544 | A2 | 1/2014 |
| WO | 2014/008461 | A1 | 1/2014 |
| WO | 2014/018580 | A1 | 1/2014 |
| WO | 2014/021967 | A1 | 2/2014 |
| WO | 2014/022148 | A1 | 2/2014 |
| WO | 2014/028735 | A2 | 2/2014 |
| WO | 2014/028797 | A1 | 2/2014 |
| WO | 2014/031505 | A1 | 2/2014 |
| WO | 2014/032461 | A1 | 3/2014 |
| WO | 2014/040022 | A2 | 3/2014 |
| WO | 2014/046475 | A1 | 3/2014 |
| WO | 2014/047047 | A1 | 3/2014 |
| WO | 2014/048855 | A1 | 4/2014 |
| WO | 2014/066352 | A1 | 5/2014 |
| WO | 2014/070872 | A2 | 5/2014 |
| WO | 2014/073825 | A1 | 5/2014 |
| WO | 2014/078965 | A1 | 5/2014 |
| WO | 2014/093339 | A1 | 6/2014 |
| WO | 2014/093911 | A2 | 6/2014 |
| WO | 2014/096506 | A1 | 6/2014 |
| WO | 2014/124332 | A2 | 8/2014 |
| WO | 2014/137074 | A1 | 9/2014 |
| WO | 2014/138604 | A1 | 9/2014 |
| WO | 2014/143959 | A2 | 9/2014 |
| WO | 2014/144395 | A2 | 9/2014 |
| WO | 2014/144579 | A1 | 9/2014 |
| WO | 2014/144949 | A2 | 9/2014 |
| WO | 2014/149473 | A1 | 9/2014 |
| WO | 2014/151153 | A2 | 9/2014 |
| WO | 2014/124332 | A3 | 10/2014 |
| WO | 2014/159578 | A1 | 10/2014 |
| WO | 2014/159581 | A1 | 10/2014 |
| WO | 2014/162570 | A1 | 10/2014 |
| WO | 2014/169269 | A1 | 10/2014 |
| WO | 2014/173189 | A1 | 10/2014 |
| WO | 2013/173504 | A8 | 12/2014 |
| WO | 2014/197336 | A1 | 12/2014 |
| WO | 2014/197339 | A1 | 12/2014 |
| WO | 2014/197635 | A2 | 12/2014 |
| WO | 2014/197730 | A1 | 12/2014 |
| WO | 2014/200728 | A1 | 12/2014 |
| WO | 2014/200731 | A1 | 12/2014 |
| WO | 2014/203495 | A1 | 12/2014 |
| WO | 2014/204659 | A2 | 12/2014 |
| WO | 2014/209264 | A1 | 12/2014 |
| WO | 2014/210392 | A2 | 12/2014 |
| WO | 2015/018440 | A1 | 2/2015 |
| WO | 2015/020942 | A1 | 2/2015 |
| WO | 2015/029379 | A1 | 3/2015 |
| WO | 2015/030796 | A1 | 3/2015 |
| WO | 2015/036817 | A1 | 3/2015 |
| WO | 2015/041882 | A1 | 3/2015 |
| WO | 2015/041892 | A1 | 3/2015 |
| WO | 2015/047932 | A1 | 4/2015 |
| WO | 2015/053485 | A1 | 4/2015 |
| WO | 2015/054141 | A1 | 4/2015 |
| WO | 2015/080530 | A1 | 6/2015 |

(56) References Cited

FOREIGN PATENT DOCUMENTS

WO 2015/084659 A1 6/2015
WO 2015/092943 A1 6/2015
WO 2015/094169 A1 6/2015
WO 2015/094369 A1 6/2015
WO 2015/098306 A1 7/2015
WO 2015/099939 A1 7/2015
WO 2015/112625 A1 7/2015
WO 2015/116151 A1 8/2015
WO 2015/121449 A1 8/2015
WO 2015/127404 A1 8/2015
WO 2015/151133 A1 10/2015
WO 2015/153310 A1 10/2015
WO 2015/157013 A1 10/2015
WO 2015/183368 A1 12/2015
WO 2015/183401 A1 12/2015
WO 2015/183699 A1 12/2015
WO 2015/184186 A1 12/2015
WO 2015/184387 A1 12/2015
WO 2015/200207 A1 12/2015
WO 2016/004074 A1 1/2016
WO 2016/027933 A1 2/2016
WO 2016/028946 A1 2/2016
WO 2016/033257 A1 3/2016
WO 2016/039992 A1 3/2016
WO 2016/040721 A1 3/2016
WO 2016/045192 A1 3/2016
WO 2016/048789 A1 3/2016
WO 2016/049439 A1 3/2016
WO 2016/051519 A1 4/2016
WO 2016/052164 A1 4/2016
WO 2016/054230 A1 4/2016
WO 2016/057268 A1 4/2016
WO 2016/075081 A1 5/2016
WO 2016/085775 A2 6/2016
WO 2016/085776 A1 6/2016
WO 2016/089029 A1 6/2016
WO 2016/100139 A1 6/2016
WO 2016/111881 A1 7/2016
WO 2016/118344 A1 7/2016
WO 2016/144840 A1 9/2016
WO 2016/144982 A1 9/2016
WO 2016/144983 A1 9/2016
WO 2016/175354 A1 11/2016
WO 2016/187149 A1 11/2016
WO 2016/190950 A1 12/2016
WO 2016/191737 A2 12/2016
WO 2016/209444 A1 12/2016
WO 2016/209924 A1 12/2016
WO 2017/044160 A1 3/2017
WO 2017/044257 A1 3/2017
WO 2017/044260 A1 3/2017
WO 2017/044629 A1 3/2017
WO 2017/053311 A1 3/2017
WO 2017/058293 A1 4/2017
WO 2017/059388 A1 4/2017
WO 2017/071420 A1 5/2017
WO 2017/142116 A1 8/2017
WO 2017/160487 A1 9/2017
WO 2017/200777 A1 11/2017
WO 2017/203484 A1 11/2017
WO 2017/213678 A1 12/2017
WO 2017/213682 A1 12/2017
WO 2017/218194 A1 12/2017
WO 2018/009397 A1 1/2018
WO 2018/014788 A1 1/2018
WO 2018/044633 A1 3/2018
WO 2018/057269 A1 3/2018
WO 2018/067528 A1 4/2018
WO 2018/075170 A1 4/2018
WO 2018/081833 A1 5/2018
WO 2018/090060 A1 5/2018
WO 2018/176053 A1 9/2018
WO 2018/208506 A1 11/2018
WO 2018/209152 A1 11/2018
WO 2018/213401 A1 11/2018
WO 2018/213415 A1 11/2018
WO 2018/213481 A1 11/2018
WO 2018/217014 A1 11/2018
WO 2018/231307 A1 12/2018
WO 2019/067930 A1 4/2019
WO 2019/078576 A1 4/2019
WO 2019/079017 A1 4/2019
WO 2019/143397 A1 7/2019
WO 2019/147429 A1 8/2019
WO 2019/190646 A2 10/2019
WO 2019/236217 A1 12/2019
WO 2020/010530 A1 1/2020
WO 2020/022572 A1 1/2020
WO 2020/096706 A1 5/2020
WO 2020/109074 A1 6/2020
WO 2020/208302 A1 10/2020
WO 2021/054565 A1 3/2021
WO 2021/061349 A1 4/2021
WO 2021/062148 A1 4/2021
WO 2021/188439 A1 9/2021
WO 2021/252230 A1 12/2021
WO 2022/047214 A2 3/2022

OTHER PUBLICATIONS

Accessibility on iOS, Apple Inc., online available at: https://developer.apple.com/accessibility/ios/, Retrieved on Jul. 26, 2021, 2 pages.

Apple, "Apple previews innovative accessibility features combining the power of hardware, software, and machine learning", Available online at: https://www.apple.com/newsroom/2022/05/apple-previews-innovative-accessibility-features/, May 17, 2022, 10 pages.

Badshah, et al., "Deep Features-based Speech Emotion Recognition for Smart Affective Services", Multimedia Tools and Applications, Oct. 31, 2017, pp. 5571-5589.

Büttner et al., "The Design Space of Augmented and Virtual Reality Applications for Assistive Environments in Manufacturing: A Visual Approach", In Proceedings of the 10th International Conference on PErvasive Technologies Related to Assistive Environments (PETRA '17), Island of Rhodes, Greece, online available at: https://dl.acm.org/doi/pdf/10.1145/3056540.3076193, Jun. 21-23, 2017, pp. 433-440.

"Cake", Online Available at: <https://web.archive.org/web/20170808091948/https://emojipedia.org/search/?q=cake>, Aug. 8, 2017, 5 pages.

Castellini, Rick, "How to enable and use dictation with an iPhone or iPad", Online Available at: <https://www.youtube.com/watch?v=8w133yN6rTU>, Sep. 7, 2017, 3 pages.

Chenghao, Yuan, "MacroDroid", Online available at: https://www.ifanr.com/weizhizao/612531, Jan. 25, 2016, 7 pages (Official Copy Only). {See communication under 37 CFR § 1.98(a) (3)}.

"Context-Sensitive User Interface", Online available at: https://web.archive.org/web/20190407003349/https://en.wikipedia.org/wiki/Context-sensitive_user_interface, Apr. 7, 2019, 3 pages.

Creswell et al., "Generative Adversarial Networks", IEEE Signal Processing Magazine, Jan. 2018, pp. 53-65.

Fitzpatrick, Aidan, "Introducing Camo 1.5: AR modes", Available Online at: "https://reincubate.com/blog/camo-ar-modes-release/", Oct. 28, 2021, 8 pages.

Ganin et al., "Unsupervised Domain Adaptation by Backpropagation", in Proceedings of the 32nd International Conference on Machine Learning, vol. 37, Jul. 2015, 10 pages.

Geyer et al., "Differentially Private Federated Learning: A Client Level Perspective", arXiv:1712.07557v2, Mar. 2018, 7 pages.

Gomes et al., "Mining Recurring Concepts in a Dynamic Feature Space", IEEE Transactions on Neural Networks and Learning Systems, vol. 25, No. 1, Jul. 31, 2013, pp. 95-110.

Guo et al., "StateLens: A Reverse Engineering Solution for Making Existing Dynamic Touchscreens Accessible", In Proceedings of the 32nd Annual Symposium on User Interface Software and Technology (UIST '19), New Orleans, LA, USA, online available at: https://dl.acm.org/doi/pdf/10.1145/3332165.3347873, Oct. 20-23, 2019, pp. 371-385.

Guo et al., "VizLens: A Robust and Interactive Screen Reader for Interfaces in the Real World", In Proceedings of the 29th Annual

(56) References Cited

OTHER PUBLICATIONS

Symposium on User Interface Software and Technology (UIST '16), Tokyo, Japan, online available at: https://dl.acm.org/doi/pdf/10.1145/2984511.2984518, Oct. 16-19, 2016, pp. 651-664.
Hanqing et al., "Deep Learning of Instruction Intention Understanding Using Stacked Denoising Autoencoder", Journal of Shanghai Jiaotong University, vol. 50 No. 7, Jul. 28, 2016, 6 pages (Official Copy only). {See communication under 37 CFR § 1.98(a) (3)}.
Hawkeye, "Hawkeye—A better user testing platform", Online Available at: https://www.youtube.com/watch?v=el0TW0g_76o, Oct. 16, 2019, 3 pages.
Hawkeye, "Learn where people look in your products", Online Available at: https://www.usehawkeye.com, 2019, 6 pages.
Heller et al., "AudioScope: Smartphones as Directional Microphones in Mobile Audio Augmented Reality Systems", In Proceedings of the 33rd Annual ACM Conference on Human Factors in Computing Systems (CHI '15), Crossings, Seoul, Korea, online available at: https://dl.acm.org/doi/pdf/10.1145/2702123.2702159, Apr. 18-23, 2015, pp. 949-952.
Hook et al., "Automatic speech-based emotion recognition using paralinguistics features", Bulletin of the Polish Academy of Sciences, Technical Sciences, vol. 67, No. 3, 2019, pp. 479-488.
"How to adjust the order of control center buttons on iPhone iOS12 version after buying a mobile phone", Available online at: https://jingyan.baidu.com/article/5bbb5albbe5a9713eba1791b.html? Jun. 14, 2019, 4 pages (Official Copy only). {See communication under 37 CFR § 1.98(a) (3)}.
Kondrat, Tomek, "Automation for Everyone with MacroDroid", Online available at: https://www.xda-developers.com/automation-for-everyone-with-macrodroid/, Nov. 17, 2013, 6 pages.
Kruger et al., "Virtual World Accessibility with the Perspective Viewer", Proceedings of ICEAPVI, Athens, Greece, Feb. 12-14, 2015, 6 pages.
Kumar, Shiu, "Ubiquitous Smart Home System Using Android Application", International Journal of Computer Networks & Communications (IJCNC) vol. 6, No. 1, Jan. 2014, pp. 33-43.
Li et al., "Deep neural network for short-text sentiment classification", International Conference on Database Systems for Advanced Applications, Springer, Cham, 2016, 8 pages.
"Method to Provide Remote Voice Navigation Capability on the Device", ip.com, Jul. 21, 2016, 4 pages.
Michalevsky et al., "Gyrophone: Recognizing Speech from Gyroscope Signals", Proceedings of the 23rd USENIX Security Symposium, Aug. 20-22, 2014, pp. 1053-1067.
Microsoft Soundscape—A map delivered in 3D sound, Microsoft Research, online available at: https://www.microsoft.com/en-us/research/product/soundscape/, Retrieved on Jul. 26, 2021, 5 pages.
Müller et al., "A Taxonomy for Information Linking in Augmented Reality", AVR 2016, Part I, LNCS 9768, 2016, pp. 368-387.
Myers, Brad A., "Shortcutter for Palm", Available at: <http://www.cs.cmu.edu/~pebbles/v5/shortcutter/palm/index.html>, retrieved on Jun. 18, 2014, 10 pages.
Myrick et al., "How to Insert Emojis Using Your Voice with Google Assistant", Online available at: <https://web.archive.org/web/20211107160722/https://www.androidcentral.com/how-insert-emojis-using-your-voice-google-assistant>, Nov. 7, 2021, 11 pages.
"Nuance Dragon Naturally Speaking", Version 13 End-User Workbook, Nuance Communications Inc., Sep. 2014, 125 pages.
Ping, et al., "Deep Voice 3: Scaling Text to Speech with Convolutional Sequence Learning", Available online at: https://arxiv.org/abs/1710.07654, Feb. 22, 2018, 16 pages.
Products for Pals—ALS Tech, "Skyle for iPad Pro eye gaze control real world review", Online Available at: <https://www.youtube.com/watch?v=_3TxZtDJpFo>, Aug. 13, 2020, 4 pages.
Raux, Antoine, "High-Density Dialog Management the Topic Stack", Adventures in High Density, online available at: https://medium.com/adventures-in-high-density/high-density-dialog-management-23efcf91db1e, Aug. 1, 2018, 10 pages.
Robbins, F Mike, "Automatically place an Android Phone on Vibrate at Work", Available online at: https://mikefrobbins.com/2016/07/21/automatically-place-an-android-phone-on-vibrate-at-work/, Jul. 21, 2016, pp. 1-11.
Rodrigues et al., "Exploring Mixed Reality in Specialized Surgical Environments", In Proceedings of the 2017 CHI Conference Extended Abstracts on Human Factors in Computing Systems (CHI EA '17), Denver, CO, USA, online available at: https://dl.acm.org/doi/pdf/10.1145/3027063.3053273, May 6-11, 2017, pp. 2591-2598.
Ross et al., "Epidemiology as a Framework for Large-Scale Mobile Application Accessibility Assessment", In Proceedings of the 19th International ACM SIGACCESS Conference on Computers and Accessibility (ASSETS '17), Baltimore, MD, USA, online available at: https://dl.acm.org/doi/pdf/10.1145/3132525.3132547, Oct. 29-Nov. 1, 2017, pp. 2-11.
Schenk et al., "GazeEverywhere: Enabling Gaze-only User Interaction on an Unmodified Desktop PC in Everyday Scenarios", In Proceedings of the 2017 CHI Conference on Human Factors in Computing Systems (CHI'17). ACM, New York, NY, 30343044. Online Available at: https://doi.org/10.1145/3025453.3025455, May 6-11, 2017, 11 pages.
Speicher et al., "What is Mixed Reality?", In Proceedings of the 2019 CHI Conference on Human Factors in Computing Systems (CHI '19). ACM, Article 537, Glasgow, Scotland, UK, online available at: https://dl.acm.org/doi/pdf/10.1145/3290605.3300767, May 4-9, 2019, 15 pages.
Tech Target Contributor, "AI Accelerator", Available online at: https://searchenterpriseai.techtarget.com/definition/AI-accelerator, Apr. 2018, 3 pages.
Tech With Brett, "Everything the Google Nest Hub Can Do", Available online at: https://www.youtube.com/watch?v=x3vdytgru2E, Nov. 12, 2018, 13 pages.
Tech With Brett, "Google Home Multiple Users Setup", Available online at: https://www.youtube.com/watch?v=BQOAbRUeFRo&t=257s, Jun. 29, 2017, 4 pages.
Tkachenko, Sergey, "Chrome will automatically create Tab Groups", Available online at: https://winaero.com/chrome-will-automatically-create-tab-groups/, Sep. 18, 2020, 5 pages.
Tkachenko, Sergey, "Enable Tab Groups Auto Create in Google Chrome", Available online at: https://winaero.com/enable-tab-groups-auto-create-in-google-chrome/, Nov. 30, 2020, 5 pages.
"Use Macrodroid skillfully to automatically clock in with Ding Talk", Online available at: https://blog.csdn.net/qq_26614295/article/details/84304541, Nov. 20, 2018, 11 pages (Official Copy Only). {See communication under 37 CFR § 1.98(a) (3)}.
Vazquez et al., "An Assisted Photography Framework to Help Visually Impaired Users Properly Aim a Camera", ACM Transactions on Computer-Human Interaction, vol. 21, No. 5, Article 25, Online available at: https://dl.acm.org/doi/pdf/10.1145/2651380, Nov. 2014, 29 pages.
Velian Speaks Tech, "10 Google Assistant Tips!", Available online at: https://www.youtube.com/watch?v=3RNWA3NK9fs, Feb. 24, 2020, 3 pages.
Wang, et al., "Tacotron: Towards End-to-End Speech Synthesis", Available online at: https://arxiv.org/abs/1703.10135, Apr. 6, 2017, 10 pages.
Wang, et al., "Training Deep Neural Networks with 8-bit Floating Point Numbers", 32nd Conference on Neural Information Processing Systems (Neurl PS 2018), 2018, 10 pages.
Wei et al., "Design and Implement on Smart Home System", 2013 Fourth International Conference on Intelligent Systems Design and Engineering Applications, Available online at: https://ieeexplore.ieee.org/document/6843433, 2013, pp. 229-231.
Win, et al., "Myanmar Text to Speech System based on Tacotron-2", International Conference on Information and Communication Tehcnology Convergence (ICTC), Oct. 21-23, 2020, pp. 578-583.
"Working with the Dragon Bar", Nuance Communications, Inc, Jun. 27, 2016, 2 pages.
Zhang et al., "A Fiber-Optic Sensor for Acoustic Emission Detection in a High Voltage Cable System", Online Available at: https://www.mdpi.com/1424-8220/16/12/2026, Nov. 30, 2016, 11 pages.

(56) References Cited

OTHER PUBLICATIONS

Zhang et al., "Compact Acoustic Modeling Based on Acoustic Manifold Using a Mixture of Factor Analyzers", Workshop on Automatic Speech Recognition and Understanding, 2013, 6 pages.
Zhang et al., "IEHouse: A Non-Intrusive Household Appliance State Recognition System", IEEE Smart World, Ubiquitous Intelligence & Computing, Advanced & Trusted Computed, 2017, 8 pages.
Zhang et al., "Interaction Proxies for Runtime Repair and Enhancement of Mobile Application Accessibility", In Proceedings of the 2017 CHI Conference on Human Factors in Computing Systems (CHI '17). ACM, Denver, CO, USA, online available at: https://dl.acm.org/doi/pdf/10.1145/3025453.3025846, May 6-11, 2017, pp. 6024-6037.
Zhang et al., "Voicemoji: Emoji Entry Using Voice for Visually Impaired People", CHI '21, May 8-13, 2021, 18 pages.
Zhao et al., "Big Data Analysis and Application", Aviation Industry Press, Dec. 2015, pp. 236-241 (Official Copy Only). {See communication under 37 CFR § 1.98(a) (3)}.
Zhao et al., "CueSee: Exploring Visual Cues for People with Low Vision to Facilitate a Visual Search Task", In Proceedings of the 2016 ACM International Joint Conference on Pervasive and Ubiquitous Computing. ACM, UbiComp '16, Heidelberg, Germany, online available at: https://dl.acm.org/doi/pdf/10.1145/2971648.2971730, Sep. 12-16, 2016, pp. 73-84.
Zhao et al., "Enabling People with Visual Impairments to Navigate Virtual Reality with a Haptic and Auditory Cane Simulation", In Proceedings of the 2018 CHI Conference on Human Factors in Computing Systems (CHI '18). ACM, Article 116, Montréal, QC, Canada, online available at: https://dl.acm.org/doi/pdf/10.1145/3173574.3173690, Apr. 21-26, 2018, 14 pages.
Zhao et al., "SeeingVR: A Set of Tools to Make Virtual Reality More Accessible to People with Low Vision", In Proceedings of the 2019 CHI Conference on Human Factors in Computing Systems (CHI '19). ACM, Article 111, Glasgow, Scotland, UK, online available at: https://dl.acm.org/doi/pdf/10.1145/3290605.3300341, May 4-9, 2019, 14 pages.
Zhao et al., "Transferring Age and Gender Attributes for Dimensional Emotion Prediction from Big Speech Data Using Hierarchical Deep Learning", 2018 4th IEEE International Conference on Big Data Security on Cloud, 2018, pp. 20-24.
"Alexa, Turn Up the Heat! Smartthings Samsung [online]", Online available at:—<https://web.archive.org/web/20160329142041/https://blog.smartthings.com/news/smartthingsupdates/alexa-turn-up-the-heat/>, Mar. 3, 2016, 3 pages.
"2007 Lexus GS 450h 4dr Sedan (3.5L 6cyl Gas/Electric Hybrid CVT)", available at <http://review.cnet.com/4505-10865_16-31833144.html>, retrieved on Aug. 3, 2006, 10 pages.
Advisory Action received for U.S. Appl. No. 11/696,057, dated Sep. 15, 2010, 3 pages.
All Music Website, available at <http://www.allmusic.com/>, retrieved on Mar. 19, 2007, 2 pages.
Alsharif et al., "Long Short-Term Memory Neural Network for Keyboard Gesture Decoding", IEEE International Conference on Acoustics, Speech, and Signal Processing (ICASSP), Brisbane, Australia, Sep. 2015, 5 pages.
Anania Peter, "Amazon Echo with Home Automation (Smart things)", Online available at:—<https://www.youtube.com/watch?v=LMW6aXmsWNE>, Dec. 20, 2015, 1 page.
Android Authority, "How to use Tasker: A Beginner's Guide", Online available at:—<https://youtube.com/watch?v= rDpdS_YWzFc>, May 1, 2013, 1 page.
Apple Differential Privacy Team, "Learning with Privacy at Scale", Apple Machine Learning Blog, vol. 1, No. 8, Online available at: <https://machinelearning.apple.com/2017/12/06/learning-with-privacy-at-scale.html>, Dec. 2017, 9 pages.
Apple, "VoiceOver for OS X", Online available at:—<http://www.apple.com/accessibility/voiceover/>, May 19, 2014, pp. 1-3.
Applicant-Initiated Interview Summary received for U.S. Appl. No. 17/234,457, dated Dec. 21, 2022, 4 pages.
Asakura et al., "What LG thinks; How the TV should be in the Living Room", HiVi, vol. 31, No. 7, Stereo Sound Publishing, Inc., Jun. 17, 2013, pp. 68-71.
Ashingtondctech & Gaming, "SwipeStatusBar—Reveal the Status Bar in a Fullscreen App", Online Available at: <https://www.youtube.com/watch?v=wA_tT9lAreQ>, Jul. 1, 2013, 3 pages.
"Ask Alexa—Things That Are Smart Wiki", Online available at:—<http://thingsthataresmart.wiki/index.php?title=Ask_Alexa&oldid=4283>, Jun. 8, 2016, pp. 1-31.
Automate Your Life, "How to Setup Google Home Routines—A Google Home Routines Walkthrough", Online Available at: <https://www.youtube.com/watch?v=pXokZHP9kZg>, Aug. 12, 2018, 1 page.
Bell, Jason, "Machine Learning Hands-On for Developers and Technical Professionals", Wiley, 2014, 82 pages.
Bellegarda, Jeromer, "Chapter 1: Spoken Language Understanding for Natural Interaction: The Siri Experience", Natural Interaction with Robots, Knowbots and Smartphones, 2014, pp. 3-14.
Beointegration.com, "BeoLink Gateway—Programming Example", Online Available at: <https:/ /www.youtube.com/watch?v=TXDaJFm5UH4>, Mar. 4, 2015, 3 pages.
"BluePhoneElite: About", available at <http://www.reelintelligence.com/BluePhoneElite>, retrieved on Sep. 25, 2006, pp. 1-2.
"BluePhoneElite: Features", available at <http://www.reelintelligence.com/BluePhoneElite/features.shtml,>, retrieved on Sep. 25, 2006, pp. 1-2.
Bodapati et al., "Neural Word Decomposition Models for Abusive Language Detection", Proceedings of the Third Workshop on Abusive Language Online, Aug. 1, 2019, pp. 135-145.
Brain, Marshall, How MP3 Files Work, available at <http://www.howstuffworks.com>, retrieved on Mar. 19, 2007, pp. 1-4.
Burgess, Brian, "Amazon Echo Tip: Enable the Wake-Up Sound", Online available at:—<https://www.groovypost.com/howto/amazon-echo-tip-enable-wake-up-sound/>, Jun. 30, 2015, 4 pages.
Cambria et al., "Jumping NLP curves: A Review of Natural Language Processing Research.", IEEE Computational Intelligence magazine, 2014, vol. 9, May 2014, pp. 48-57.
Chang et al., "Monaural Multi-Talker Speech Recognition with Attention Mechanism and Gated Convolutional Networks", Interspeech 2018, Sep. 2-6, 2018, pp. 1586-1590.
Chen et al., "A Convolutional Neural Network with Dynamic Correlation Pooling", 13th International Conference on Computational Intelligence and Security, IEEE, 2017, pp. 496-499.
Chen et al., "Progressive Joint Modeling in Unsupervised Single-Channel Overlapped Speech Recognition", IEEE/ACM Transactions on Audio, Speech, and Language Processing, vol. 26, No. 1, Jan. 2018, pp. 184-196.
Chen, Angela, "Amazon's Alexa now handles patient health information", Available online at: <https://www.theverge.com/2019/4/4/18295260/amazon-hipaa-alexa-echo-patient-health-information-privacy-voice-assistant>, Apr. 4, 2019, 2 pages.
Colt, Sam, "Here's One Way Apple's Smartwatch Could be Better Than Anything Else", Business Insider, Aug. 21, 2014, pp. 1-4.
Conneau et al., "Supervised Learning of Universal Sentence Representations from Natural Language Inference Data", Proceedings of the 2017 Conference on Empirical Methods in Natural Language Processing, Copenhagen, Denmark, Sep. 7-11, 2017, pp. 670-680.
Corrected Notice of Allowance received for U.S. Appl. No. 17/234,457, dated Apr. 14, 2023, 6 pages.
Czech Lucas, "A System for Recognizing Natural Spelling of English Words", Diploma Thesis, Karlsruhe Institute of Technology, May 7, 2014, 107 pages.
Dai, et al., "Transformer-XL: Attentive Language Models Beyond a Fixed-Length Context", Online available at: arXiv:1901.02860v3, Jun. 2, 2019, 20 pages.
Decision on Appeal received for U.S. Appl. No. 14/605,793, dated Jul. 31, 2019, 7 pages.
Deedeevuu, "Amazon Echo Alarm Feature", Online available at:—<https://www.youtube.com/watch?v=fdjU8eRLk7c>, Feb. 16, 2015, 1 page.
Delcroix et al., "Context Adaptive Deep Neural Networks for Fast Acoustic Model Adaptation", ICASSP, 2015, pp. 4535-4539.

(56) References Cited

OTHER PUBLICATIONS

Delcroix et al., "Context Adaptive Neural Network for Rapid Adaptation of Deep CNN Based Acoustic Models", Interspeech 2016, Sep. 8-12, 2016, pp. 1573-1577.
Derrick, Amanda, "How to Set Up Google Home for Multiple Users", Lifewire, online available at:—<https://www.lifewire.com/set-up-google-home-multiple-users-4685691>, Jun. 8, 2020, 9 pages.
Dighe et al., "Lattice-Based Improvements for Voice Triggering Using Graph Neural Networks", in 2020 IEEE International Conference on Acoustics, Speech and Signal Processing (ICASSP), Jan. 25, 2020, 5 pages.
Dihelson, "How Can I Use Voice or Phrases as Triggers to Macrodroid?", Macrodroid Forums, Online Available at:—<https://www.tapatalk.com/groups/macrodroid/how-can-i-use-voice-or-phrases-as-triggers-to-macr-t4845.html>, May 9, 2018, 5 pages.
"DIRECTV™ VOICE", Now Part of the DIRECTTV Mobile App for Phones, Sep. 18, 2013, 5 pages.
Dwork et al., "The Algorithmic Foundations of Differential Privacy", Foundations and Trends in Theoretical Computer Science: vol. 9: No. 3-4, 211-407, 2014, 281 pages.
EARTHLING1984, "Samsung Galaxy Smart Stay Feature Explained", Online available at:—<https://www.youtube.com/watch?v=RpjBNtSjupl>, May 29, 2013, 1 page.
Eder et al., "At the Lower End of Language—Exploring the Vulgar and Obscene Side of German", Proceedings of the Third Workshop on Abusive Language Online, Florence, Italy, Aug. 1, 2019, pp. 119-128.
Edim, et al., "A Multi-Agent Based Virtual Personal Assistant for E-Health Service", Journal of Information Engineering and Applications, vol. 3, No. 11, 2013, 9 pages.
Filipowicz, Luke, "How to use the QuickType keyboard in iOS 8", Online available at: <https://www.imore.com/comment/568232>, Oct. 11, 2014, pp. 1-17.
Final Office Action received for U.S. Appl. No. 11/696,057, dated Dec. 20, 2013, 28 pages.
Final Office Action received for U.S. Appl. No. 11/696,057, dated Jun. 28, 2010, 19 pages.
Final Office Action received for U.S. Appl. No. 11/696,057, dated Nov. 21, 2011, 22 pages.
Final Office Action received for U.S. Appl. No. 14/605,793, dated Aug. 9, 2016, 27 pages.
Gadget Hacks, "Tasker Too Complicated? Give MacroDroid a Try [How-To]", Online available at: <https://www.youtube.com/watch?v=8YL9cWCykKc>, May 27, 2016, 1 page.
"Galaxy S7: How to Adjust Screen Timeout & Lock Screen Timeout", Online available at:—<https://www.youtube.com/watch?v=n6e1WKUS2ww>, Jun. 9, 2016, 1 page.
Gatys et al., "Image Style Transfer Using Convolutional Neural Networks", Proceedings of IEEE International Conference on Acoustics, Speech, and Signal Processing (ICASSP), 2016, pp. 2414-2423.
Ghauth et al., "Text Censoring System for Filtering Malicious Content Using Approximate String Matching and Bayesian Filtering", Proc. 4th INNS Symposia Series on Computational Intelligence in Information Systems, Bandar Seri Begawan, Brunei, 2015, pp. 149-158.
Goliath, "2004 Chrysler Pacifica: U-Connect Hands-Free Communication System", The Best and Brightest of 2004, Brief Article, Automotive Industries, Sep. 2003, 1 page.
Goodfellow et al., "Generative Adversarial Networks", Proceedings of the Neural Information Processing Systems, Dec. 2014, 9 pages.
Google Developers, "Voice search in your app", Online available at:—<https://www.youtube.com/watch?v=PS1FbB5qWEI>, Nov. 12, 2014, 1 page.
Gu et al., "BadNets: Evaluating Backdooring Attacks on Deep Neural Networks", IEEE Access, vol. 7, Mar. 21, 2019, pp. 47230-47244.
Guim, Mark, "How to Set a Person-Based Reminder with Cortana", Online available at:—<http://www.wpcentral.com/how-to-person-based-reminder-cortana>, Apr. 26, 2014, 15 pages.
Guo et al., "Time-Delayed Bottleneck Highway Networks Using a DFT Feature for Keyword Spotting", IEEE International Conference on Acoustics, Speech, and Signal Processing (ICASSP). IEEE, 2018, 5 pages.
Gupta et al., "I-vector-based Speaker Adaptation of Deep Neural Networks for French Broadcast Audio Transcription", ICASSP, 2014, 2014, pp. 6334-6338.
Gupta, Naresh, "Inside Bluetooth Low Energy", Artech House, 2013, 274 pages.
Haung et al., "A Study for Improving Device-Directed Speech Detection Toward Frictionless Human-Machine Interaction", in Proc. Interspeech, 2019, 5 pages.
"Headset Button Controller v7.3 APK Full APP Download for Andriod, Blackberry, iPhone", Online available at:—<http://fullappdownload.com/headset-button-controller-v7-3-apk/>, Jan. 27, 2014, 11 pages.
Henderson et al., "Efficient Natural Language Response Suggestion for Smart Reply", Available Online at: https://static.googleusercontent.com/media/research.google.com/en//pubs/archive/1846e8a466c079eae7e90727e27caf5f98f10e0c.pdf, 2017, 15 pages.
Hershey et al., "Deep Clustering: Discriminative Embeddings for Segmentation and Separation", Proc. ICASSP, Mar. 2016, 6 pages.
"Hey Google: How to Create a Shopping List with Your Google Assistant", Online available at:—<https://www.youtube.com/watch?v=w9NCsElax1Y>, May 25, 2018, 1 page.
Hinton et al., "Distilling the Knowledge in a Neural Network", arXiv preprintarXiv:1503.02531, Mar. 2, 2015, 9 pages.
"How to Enable Google Assistant on Galaxy S7 and Other Android Phones (No Root)", Online available at:—<https://www.youtube.com/watch?v=HekIQbWyksE>, Mar. 20, 2017, 1 page.
"How to Use Ok Google Assistant Even Phone is Locked", Online available at:—<https://www.youtube.com/watch?v=9B_gP4j_SP8>, Mar. 12, 2018, 1 page.
Hutsko et al., "iPhone All-in-One for Dummies", 3rd Edition, 2013, 98 pages.
id3.org, "id3v2.4.0-Frames", Online available at:—<http://id3.org/id3v2.4.0-frames?action=print>, retrieved on Jan. 22, 2015, pp. 1-41.
Idasallinen, "What's The 'Like' Meter Based on?", Online Available at:—<https://community.spotify.com/t5/Content-Questions/What-s-the-like-meter-based-on/td-p/1209974>, Sep. 22, 2015, 6 pages.
Ikeda, Masaru, "beGlobal Seoul 2015 Startup Battle: Talkey", YouTube Publisher, Online Available at:—<https://www.youtube.com/watch?v=4Wkp7sAAldg>, May 14, 2015, 1 page.
INEWS and Tech, "How to Use the QuickType Keyboard in IOS 8", Online available at:—<http://www.inewsandtech.com/how-to-use-the-quicktype-keyboard-in-ios-8/>, Sep. 17, 2014, 6 pages.
"Interactive Voice", Online available at:—<http://www.helloivee.com/company/>, retrieved on Feb. 10, 2014, 2 pages.
Internet Services and Social Net, "How to Search for Similar Websites", Online available at:—<https://www.youtube.com/watch?v=nLf2uirpt5s>, see from 0:17 to 1:06, Jul. 4, 2013, 1 page.
"iPhone 6 Smart Guide Full Version for SoftBank", Gijutsu-Hyohron Co., Ltd., vol. 1, Dec. 1, 2014, 4 pages.
Isik et al., "Single-Channel Multi-Speaker Separation using Deep Clustering", Interspeech 2016, Sep. 8-12, 2016, pp. 545-549.
Jeon et al., "Voice Trigger Detection from LVCSR Hypothesis Lattices Using Bidirectional Lattice Recurrent Neural Networks", International Conference on Acoustics, Speech, and Signal Processing (ICASSP). IEEE, Feb. 29, 2020, 5 pages.
Jonsson et al., "Proximity-based Reminders Using Bluetooth", 2014 IEEE International Conference on Pervasive Computing and Communications Demonstrations, 2014, pp. 151-153.
Kannan et al., "Smart Reply: Automated Response Suggestion for Email", Available Online at: https://arxiv.org/pdf/1606.04870.pdf, Jun. 15, 2016, 10 pages.
Karn, Ujjwal, "An Intuitive Explanation of Convolutional Neural Networks", The Data Science Blog, Aug. 11, 2016, 23 pages.
Kastrenakes, Jacob, "Siri's creators will unveil their new AI bot on Monday", The Verge, online available at:—<https://web.archive.org/web/20160505090418/https://www.theverge.com/2016/5/4/11593564/viv-labs-unveiling-monday-new-ai-from-siri-creators>, May 4, 2016, 3 pages.

(56) References Cited

OTHER PUBLICATIONS

Kickstarter, "Ivee Sleek: Wi-Fi Voice-Activated Assistant", Online available at:—<https://www.kickstarter.com/projects/ivee/ivee-sleek-wi-fi-voice-activated-assistant>, retrieved on Feb. 10, 2014, pp. 1-13.
King et al., "Robust Speech Recognition Via Anchor Word Representations", Interspeech 2017, Aug. 20-24, 2017, pp. 2471-2475.
Kumatani et al., "Direct Modeling of Raw Audio with DNNS For Wake Word Detection", in 2017 IEEE Automatic Speech Recognition and Understanding Workshop (ASRU), 2017, 6 pages.
Lee, Sungjin, "Structured Discriminative Model for Dialog State Tracking", Proceedings of the SIGDIAL 2013 Conference, Aug. 22-24, 2013, pp. 442-451.
Lin, Luyuan, "An Assistive Handwashing System with Emotional Intelligence", Using Emotional Intelligence in Cognitive Intelligent Assistant Systems, 2014, 101 pages.
"Link Your Voice to Your Devices with Voice Match, Google Assistant Help", Online available at: <https://support.google.com/assistant/answer/9071681?co=GENIE.Platform%3DAndroid&hl=en>, Retrieved on Jul. 1, 2020, 2 pages.
Liou et al., "Autoencoder for Words", Neurocomputing, vol. 139, Sep. 2014, pp. 84-96.
Liu et al., "Accurate Endpointing with Expected Pause Duration", Sep. 6-10, 2015, pp. 2912-2916.
Loukides et al., "What Is the Internet of Things?", O'Reilly Media, Inc., Online Available at: <https://www.oreilly.com/library/view/what-is-the/9781491975633/>, 2015, 31 pages.
Luo et al., "Speaker-Independent Speech Separation with Deep Attractor Network", IEEE/ACM Transactions on Audio, Speech, And Language Processing, vol. 26, No. 4, Apr. 2018, pp. 787-796.
Maas et al., "Combining Acoustic Embeddings and Decoding Features for End-Of-Utterance Detection in Real-Time Far-Field Speech Recognition Systems", in 2018 IEEE International Conference on Acoustics, Speech and Signal Processing (ICASSP). IEEE, 2018, 5 pages.
Mallidi et al., "Device-Directed Utterance Detection", Proc. Interspeech, Aug. 7, 2018, 4 pages.
Marketing Land, "Amazon Echo: Play music", Online Available at:—<https://www.youtube.com/watch?v=A7V5NPbsXi4>, Apr. 27, 2015, 3 pages.
"Meet Ivee, Your Wi-Fi Voice Activated Assistant", Availale Online at:—<http://www.helloivee.com/>, retrieved on Feb. 10, 2014, 8 pages.
Mhatre et al., "Donna Interactive Chat-bot acting as a Personal Assistant", International Journal of Computer Applications (0975-8887), vol. 140, No. 10, Apr. 2016, 6 pages.
Mikolov et al., "Linguistic Regularities in Continuous Space Word Representations", Proceedings of NAACL-HLT, Jun. 9-14, 2013, pp. 746-751.
Miller Chance, "Google Keyboard Updated with New Personalized Suggestions Feature", Online available at:—<http://9to5google.com/2014/03/19/google-keyboard-updated-with-new-personalized-suggestions-feature/>, Mar. 19, 2014, 4 pages.
Mnih et al., "Human-Level Control Through Deep Reinforcement Learning", Nature, vol. 518, Feb. 26, 2015, pp. 529-533.
Modern Techies, "Braina-Artificial Personal Assistant for PC (like Cortana,Siri) !!!! ", Online available at: <https://www.youtube.com/watch?v=_Coo2P8ilqQ>, Feb. 24, 2017, 3 pages.
Muller et al., "Control Theoretic Models of Pointing", ACM Transactions on Computer-Human Interaction, Aug. 2017, 36 pages.
"N200 Hands-Free Bluetooth Car Kit", available at <www.wirelessground.com>, retrieved on Mar. 19, 2007, pp. 1-2.
Nakamura et al., "Study of Methods to Diminish Spoilers of Sports Match: Potential of a Novel Concept "Information Clouding"", vol. 54, No. 4, ISSN: 1882-7764. Online available at: <https://ipsj.ixsq.nii.ac.jp/ej/index.php?active_action=repository_view_main_item_detail&page_id=13&block_id=8&item_id=91589&item_no=1>, Apr. 2013, pp. 1402-1412.
"Natural Language Interface Using Constrained Intermediate Dictionary of Results", List of Publications Manually reviewed for the Search of U.S. Pat. No. 7,177,798, Mar. 22, 2013, 1 page.
NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Non-Final Office Action received for U.S. Appl. No. 11/696,057, dated Dec. 1, 2009, 17 pages.
Non-Final Office Action received for U.S. Appl. No. 11/696,057, dated Dec. 22, 2009, 6 pages.
Office Action received for U.S. Appl. No. 11/696,057, dated Jul. 26, 2013, 23 pages.
Office Action received for U.S. Appl. No. 11/696,057, dated Jun. 1, 2011, 17 pages.
Office Action received for U.S. Appl. No. 14/605,793, dated Nov. 27, 2015, 22 pages.
Office Action for U.S. Appl. No. 16/778,826, dated Nov. 30, 2020, 12 pages.
Non-Final Office Action received for U.S. Appl. No. 17/234,457, dated Nov. 16, 2022, 14 pages.
Norouzian et al., "Exploring Attention Mechanism for Acoustic based Classification of Speech Utterances into System-Directed and Non-System-Directed", International Conference on Acoustics, Speech, and Signal Processing (ICASSP). IEEE, Feb. 1, 2019, 5 pages.
Notice of Allowance received for U.S. Appl. No. 11/696,057, dated Oct. 24, 2014, 8 pages.
Notice of Allowance received for U.S. Appl. No. 14/605,793, dated Oct. 2, 2019, 5 pages.
Notice of Allowance received for U.S. Appl. No. 16/778,826, dated Jan. 21, 2021, 7 pages.
Notice of Allowance received for U.S. Appl. No. 17/234,457, dated Jan. 26, 2023, 7 pages.
OSXDAILY, "Get a List of Siri Commands Directly from Siri", Online available at:—<http://osxdaily.com/2013/02/05/list-siri-commands/>, Feb. 5, 2013, 15 pages.
Pak, Gamerz, "Braina: Artificially Intelligent Assistant Software for Windows PC in (urdu / hindhi)", Online available at: <https://www.youtube.com/watch?v=JH_rMjw8lqc>, Jul. 24, 2018, 3 pages.
Pathak et al., "Privacy-preserving Speech Processing: Cryptographic and String- matching Frameworks Show Promise", In: IEEE signal processing magazine, online available at:—<http://www.merl.com/publications/docs/TR2013-063.pdf>, Feb. 13, 2013, 16 pages.
Patra et al., "A Kernel-Based Approach for Biomedical Named Entity Recognition", Scientific World Journal, vol. 2013, 2013, pp. 1-7.
Pavlopoulos et al., "ConvAI at SemEval-2019 Task 6: Offensive Language Identification and Categorization with Perspective and BERT", Proceedings of the 13th International Workshop on Semantic Evaluation (SemEval-2019), Jun. 6-7, 2019, pp. 571-576.
PC MAG, "How to Voice Train Your Google Home Smart Speaker", Online available at: <https://in.pcmag.com/google-home/126520/how-to-voice-train-your-google-home-smart-speaker>, Oct. 25, 2018, 12 pages.
Pennington et al., "GloVe: Global Vectors for Word Representation", Proceedings of the Conference on Empirical Methods Natural Language Processing (EMNLP), Doha, Qatar, Oct. 25-29, 2014, pp. 1532-1543.
Perlow, Jason, "Alexa Loop Mode with Playlist for Sleep Noise", Online Available at: <https://www.youtube.com/watch?v=nSkSuXziJSg>, Apr. 11, 2016, 3 pages.
Philips, Chris, "Thumbprint Radio: A Uniquely Personal Station Inspired by All of Your Thumbs Up", Pandora News, Online Available at:—<https://blog.pandora.com/author/chris-phillips/>, Dec. 14, 2015, 7 pages.
Pocketables.com, "AutoRemote example profile", Online available at: https://www.youtube.com/watch?v=kC_zhUnNZj8, Jun. 25, 2013, 1 page.
"Pose, Cambridge Dictionary Definition of Pose", Available online at: <https://dictionary.cambridge.org/dictionary/english/pose>, 4 pages.
Qian et al., "Single-channel Multi-talker Speech Recognition with Permutation Invariant Training", Speech Communication, Issue 104, 2018, pp. 1-11.

(56) References Cited

OTHER PUBLICATIONS

"Quick Type Keyboard on iOS 8 Makes Typing Easier", Online available at:—<https://www.youtube.com/watch?v=0CldLR4fhVU>, Jun. 3, 2014, 3 pages.
"Radio Stations Tailored to You Based on the Music You Listen to on iTunes", Apple Announces iTunes Radio, Press Release, Jun. 10, 2013, 3 pages.
Rasch, Katharina, "Smart Assistants for Smart Homes", Doctoral Thesis in Electronic and Computer Systems, 2013, 150 pages.
Ravi, Sujith, "Google AIBlog: On-device Machine Intelligence", Available Online at: https://ai.googleblog.com/2017/02/on-device-machine-intelligence.html, Feb. 9, 2017, 4 pages.
Rios Mafe, "New Bar Search for Facebook", YouTube, available at:—<https://www.youtube.com/watch?v=vwgN1WbvCas>, Jul. 19, 2013, 2 pages.
Ritchie, Rene, "QuickType keyboard in iOS 8: Explained", Online Available at:—<https://www.imore.com/quicktype-keyboards-ios-8-explained>, Jun. 21, 2014, pp. 1-19.
Routines, "SmartThings Support", Online available at:—<https://web.archive.org/web/20151207165701/https://support.smartthings.com/hc/en-us/articles/205380034-Routines>, 2015, 3 pages.
Rowland et al., "Designing Connected Products: UX for the Consumer Internet of Things", O'Reilly, May 2015, 452 pages.
Samsung Support, "Create a Quick Command in Bixby to Launch Custom Settings by at Your Command", Online Available at:—<https://www.facebook.com/samsungsupport/videos/10154746303151213>, Nov. 13, 2017, 1 page.
Santos et al., "Fighting Offensive Language on Social Media with Unsupervised Text Style Transfer", Proceedings of the 56th Annual Meeting of the Association for Computational Linguistics (vol. 2: Short Papers), May 20, 2018, 6 pages.
Seehafer Brent, "Activate Google Assistant on Galaxy S7 with Screen off", Online available at: <https://productforums.google.com/forum/#!topic/websearch/lp3qIGBHLVI>, Mar. 8, 2017, 4 pages.
Selfridge et al., "Interact: Tightly coupling Multimodal Dialog with an Interactive Virtual Assistant", International Conference on Multimodal Interaction, ACM, Nov. 9, 2015, pp. 381-382.
Senior et al., "Improving DNN Speaker Independence With I-Vector Inputs", ICASSP, 2014, pp. 225-229.
Seroter et al., "SOA Patterns with BizTalk Server 2013 and Microsoft Azure", Packt Publishing, Jun. 2015, 454 pages.
Settle et al., "End-to-End Multi-Speaker Speech Recognition", Proc. ICASSP, Apr. 2018, 6 pages.
Shen et al., "Style Transfer from Non-Parallel Text by Cross-Alignment", 31st Conference on Neural Information Processing Systems (NIPS 2017), 2017, 12 pages.
Sigtia et al., "Efficient Voice Trigger Detection for Low Resource Hardware", in Proc. Interspeech 2018, Sep. 2-6, 2018, pp. 2092-2096.
Sigtia et al., "Multi-Task Learning for Voice Trigger Detection", in IEEE International Conference on Acoustics, Speech and Signal Processing (ICASSP), 2020, Apr. 20, 2020, 5 pages.
Simonite, Tom, "Confronting Siri: Microsoft Launches Digital Assistant Cortana", 2014, 2 pages.
Siou, Serge, "How to Control Apple TV 3rd Generation Using Remote app", Online available at: <https://www.youtube.com/watch?v=PhyKftZ0S9M>, May 12, 2014, 3 pages.
"Skilled at Playing my iPhone 5", Beijing Hope Electronic Press, Jan. 2013, 6 pages.
"SmartThings +Amazon Echo", Smartthings Samsung [online], Online available at:—<https://web.archive.org/web/20160509231428/https://blog.smartthings.com/featured/alexa-turn-on-my-smartthings/>, Aug. 21, 2015, 3 pages.
Smith, Jake, "Amazon Alexa Calling: How to Set it up and Use it on Your Echo", iGeneration, May 30, 2017, 5 pages.
Sperber et al., "Self-Attentional Models for Lattice Inputs", in Proceedings of the 57th Annual Meeting of the Association for Computational Linguistics, Florence, Italy, Association for Computational Linguistics, Jun. 4, 2019, 13 pages.
SRI, "SRI Speech: Products: Software Development Kits: EduSpeak", Online available at:—<http://web.archive.org/web/20090828084033/http://www.speechatsri.com/products/eduspeak>shtml, retrieved on Jun. 20, 2013, pp. 1-2.
Sundermeyer et al., "From Feedforward to Recurrent LSTM Neural Networks for Language Modeling.", IEEE Transactions to Audio, Speech, and Language Processing, vol. 23, No. 3, Mar. 2015, pp. 517-529.
Sutskever et al., "Sequence to Sequence Learning with Neural Networks", Proceedings of the 27th International Conference on Neural Information Processing Systems, 2014, 9 pages.
Tamar et al., "Value Iteration Networks", Advances in Neural Information Processing Systems, vol. 29, 2016, 16 pages.
Tan et al., "Knowledge Transfer in Permutation Invariant Training for Single-channel Multi-talker Speech Recognition", ICASSP 2018, 2018, pp. 5714-5718.
Vaswani et al., "Attention Is All You Need", 31st Conference on Neural Information Processing Systems (NIPS 2017), 2017, pp. 1-11.
Villemure et al., "The Dragon Drive Innovation Showcase: Advancing the State-of-the-art in Automotive Assistants", 2018, 7 pages.
Walker, Amy, "NHS Gives Amazon Free Use of Health Data Under Alexa Advice Deal", Available online at: <https://www.theguardian.com/society/2019/dec/08/nhs-gives-amazon-free-use-of-health-data-under-alexa-advice-deal>, 3 pages.
Wang et al., "End-to-end Anchored Speech Recognition", Proc. ICASSP2019, May 12-17, 2019, 5 pages.
Weng et al., "Deep Neural Networks for Single-Channel Multi-Talker Speech Recognition", IEEE/ACM Transactions on Audio, Speech, And Language Processing, vol. 23, No. 10, Oct. 2015, pp. 1670-1679.
"What is Fuzzy Logic?", available at <http://www.cs.cmu.edu>, retrieved on Apr. 15, 1993, pp. 1-5.
"What's on Spotify?", Music for everyone, Online Available at:—<https://web.archive.org/web/20160428115328/https://www.spotify.com/us/>, Apr. 28, 2016, 6 pages.
Wikipedia, "Home Automation", Online Available at: <https://en.wikipedia.org/w/index.php?title=Home_automation&oldid=686569068>, Oct. 19, 2015, 9 pages.
Wikipedia, "Siri", Online Available at:—<https://en.wikipedia.org/w/index.php?title=Siri&oldid=689697795>, Nov. 8, 2015, 13 Pages.
Wikipedia, "Virtual Assistant", Wikipedia, Online Available at:—<https://en.wikipedia.org/w/index.php?title=Virtual_assistant&oldid=679330666>, Sep. 3, 2015, 4 pages.
Wu et al., "Monophone-Based Background Modeling for Two-Stage On-device Wake Word Detection", in 2018 IEEE International Conference on Acoustics, Speech and Signal Processing (ICASSP), Apr. 2018, 5 pages.
X.AI, "How it Works", Online available at:—<https://web.archive.org/web/20160531201426/https://x.ai/how-it-works/>, May 31, 2016, 6 pages.
Xiang et al., "Correcting Phoneme Recognition Errors in Learning Word Pronunciation through Speech Interaction", Speech Communication, vol. 55, No. 1, Jan. 1, 2013, pp. 190-203.
Xu et al., "Policy Optimization of Dialogue Management in Spoken Dialogue System for Out-of-Domain Utterances", 2016 International Conference on Asian Language Processing (IALP), IEEE, Nov. 21, 2016, pp. 10-13.
Xu et al., "Show, Attend and Tell: Neural Image Caption Generation with Visual Attention", Proceedings of the 32nd International Conference on Machine Learning, Lille, France, 2015, 10 pages.
Yan et al., "A Scalable Approach to Using DNN-derived Features in GMM-HMM Based Acoustic Modeling for LVCSR", 14th Annual Conference of the International Speech Communication Association, InterSpeech 2013, Aug. 2013, pp. 104-108.
Yang Astor, "Control Android TV via Mobile Phone APP RKRemoteControl", Online Available at: <https://www.youtube.com/watch?v=zpmUeOX_xro>, Mar. 31, 2015, 4 pages.
Yates Michaelc., "How Can I Exit Google Assistant After I'm Finished with it", Online available at:—<https://productforums.google.com/forum/#!msg/phone-by-google/faECnR2RJwA/gKNtOkQgAQAJ>, Jan. 11, 2016, 2 pages.

(56) References Cited

OTHER PUBLICATIONS

Yeh Jui-Feng, "Speech Act Identification Using Semantic Dependency Graphs with Probabilistic Context-free Grammars", ACM Transactions on Asian and Low-Resource Language Information Processing, vol. 15, No. 1, Dec. 2015, pp. 5.1-5.28.
Young et al., "POMDP-Based Statistical Spoken Dialog Systems: A Review", Proceedings of the IEEE, vol. 101, No. 5, 2013, 18 pages.
Yousef, Zulfikara., "Braina (A.I) Artificial Intelligence Virtual Personal Assistant", Online available at:—<https://www.youtube.com/watch?v=2h6xpB8bPSA>, Feb. 7, 2017, 3 pages.
Yu et al., "Permutation Invariant Training of Deep Models for Speaker-Independent Multi-talker Speech Separation", Proc. ICASSP, 2017, 5 pages.
Yu et al., "Recognizing Multi-talker Speech with Permutation Invariant Training", Interspeech 2017, Aug. 20-24, 2017, pp. 2456-2460.
Zhang et al., "Very Deep Convolutional Networks for End-To-End Speech Recognition", IEEE International Conference on Acoustics, Speech, and Signal Processing (ICASSP), 2017, 5 pages.
Zheng, et al., "Intent Detection and Semantic Parsing for Navigation Dialogue Language Processing", 2017 IEEE 20th International Conference on Intelligent Transportation Systems (ITSC), 2017, 6 pages.
Zhong et al., "JustSpeak: Enabling Universal Voice Control on Android", W4A'14, Proceedings of the 11th Web for All Conference, No. 36, Apr. 7-9, 2014, 8 pages.
Zhou et al., "Learning Dense Correspondence via 3D-guided Cycle Consistency", Proceedings of the IEEE Conference on Computer Vision and Pattern Recognition (CVPR), 2016, 10 pages.
Zmolikova et al., "Speaker-Aware Neural Network Based Beamformer for Speaker Extraction in Speech Mixtures", Interspeech 2017, Aug. 20-24, 2017, pp. 2655-2659.

* cited by examiner

METHOD AND SYSTEM FOR OPERATING A MULTI-FUNCTION PORTABLE ELECTRONIC DEVICE USING VOICE-ACTIVATION

CROSS-REFERENCE TO RELATED APPLICATIONS

This application is a continuation of U.S. patent application Ser. No. 17/234,457, entitled "METHOD AND SYSTEM FOR OPERATING A MULTI-FUNCTION PORTABLE ELECTRONIC DEVICE USING VOICE-ACTIVATION," filed Apr. 19, 2021, which is a continuation of U.S. patent application Ser. No. 16/778,826 (now U.S. Pat. No. 11,012,942), entitled "METHOD AND SYSTEM FOR OPERATING A MULTI-FUNCTION PORTABLE ELECTRONIC DEVICE USING VOICE-ACTIVATION," filed Jan. 31, 2020, which is a continuation of U.S. patent application Ser. No. 14/605,793 (now U.S. Pat. No. 10,568,032), entitled "METHOD AND SYSTEM FOR OPERATING A MULTI-FUNCTION PORTABLE ELECTRONIC DEVICE USING VOICE-ACTIVATION," filed Jan. 26, 2015, which claims priority to U.S. patent application Ser. No. 11/696,057 (now U.S. Pat. No. 8,977,255), entitled "METHOD AND SYSTEM FOR OPERATING A MULTI-FUNCTION PORTABLE ELECTRONIC DEVICE USING VOICE-ACTIVATION," filed Apr. 3, 2007, the content of which are hereby incorporated by reference in their entireties.

BACKGROUND OF THE INVENTION

Field of the Invention

The present invention relates to a portable electronic device and, more particularly, to a multi-function portable electronic device.

Description of the Related Art

Today, cellular phones primarily require manual interaction by a user to invoke functions or to enter data, etc. However, cellular phones can also support limited voice activation. For example, a user can press a predetermined button, then speak a name of a person in the address book of the cellular phone. If the cellular phone recognizes the spoken name, then the person can be automatically called using the phone number provided in the address book. Cellular phones can also be use inside automobiles in a similar fashion. Some automobiles also support hands-free cellular operation by providing an embedded speaker and microphone internal to the vehicle. Bluetooth car kits are also available to add-on a speaker and microphone for hands-free operation. In any case, with cellular phones, voice commands are also conventionally limited to recognizing names of contacts within an address book and require manual user interaction with the cellular phone or automobile (e.g., button press) prior to any voice command.

Specialized computer programs also exist which can execute on a personal computer and wirelessly interact with a Bluetooth-enabled cellular phone. For example, a user interface displayed on a personal computer can allow a user to dial, answer, hang up and hold calls with respect to a cellular phone. Users can also be alerted at the personal computer of incoming calls or SMS messages. When a call is received at the cellular phone, media playback in progress at the personal computer can be paused.

SUMMARY OF THE INVENTION

The invention pertains to voice activation for a portable electronic device. The portable electronic device can be a multi-function electronic device. The voice activation can be robust and context sensitive. The voice activation can also be utilized without any preparatory user action with respect to the portable electronic device. The portable electronic device can also interact with a media system.

According to one embodiment, one function that can be supported by the portable electronic device is voice communications. When a voice call is incoming to the portable electronic device, the portable electronic device can automatically control itself or the media system to pause, stop and/or lower its volume so that media playback need not disturb a user while participating in the voice call. After the voice call ends, the portable electronic device can automatically control itself or the media system to resume, start and/or raise its volume so that the user can again participate in media playback.

The invention can be implemented in numerous ways, including as a method, system, device, apparatus (including graphical user interface), or computer readable medium. Several embodiments of the invention are discussed below.

As a method for operating a portable electronic device using voice-activated input, one embodiment of the invention can, for example, include at least: operating the portable electric device to listen for a user voice command; monitoring an operational state of the portable electronic device; receiving an audio input; determining a set of commands that are authorized for usage with the portable electronic while in the operational state; determining whether the audio input pertains to at least one of the commands within the set of commands; and executing the at least one of the commands within the set of commands that is determined to pertain to the audio input.

As a portable electronic device, one embodiment of the invention can, for example, include at least: a microphone capable of picking up a voice input from a user; a voice analyzer operatively connected to the microphone; and a processor for controlling operation of the portable electronic device. The voice analyzer can be configured to analyze the voice input to determine if one or more predetermined commands are to be performed. The processor can operate to perform the one or more predetermined commands when the voice analyzer determines that the voice input substantially matches characteristics of the one or more predetermined commands.

As a method for operating an electronic device supporting or coupling to a plurality of functions, where one of the functions can be wireless voice communications and another of the functions can be media playback, one embodiment of the invention can, for example, include at least: determining whether a voice call is incoming; determining when media playback is active; outputting a ringtone if a voice call is incoming and media playback is not active; outputting the ringtone mixed with media output if a voice call is incoming and media playback is active; activating a microphone if the microphone is not already active; determining whether a voice command is received while the call is incoming; answering the call when the voice command received requests that the call be answered; pausing or stopping the media playback if media playback is still active when the call is answered; determining whether the call has ended; and resuming or restarting the media playback after the call has ended.

As a computer readable medium including at least computer program code stored thereon for operating a portable electronic device using voice-activated input, one embodiment of the invention can, for example, include at least: computer program code for operating the portable electric device to listen for a user voice command; computer program code for monitoring an operational state of the portable electronic device; computer program code for determining a set of commands that are authorized for usage with the portable electronic while in the operational state; computer program code for determining whether an audio input pertains to at least one of the commands within the set of commands; and computer program code for executing the at least one of the commands within the set of commands that is determined to pertain to the audio input.

As a computer readable medium including at least computer program code stored thereon for operating an electronic device supporting or coupling to a plurality of functions, where one of the functions is wireless voice communications and another of the functions is media playback, another embodiment of the invention can, for example, include at least: computer program code for determining whether a voice call is incoming; computer program code for determining when media playback is active; computer program code for outputting a ringtone if a voice call is incoming and media playback is not active; computer program code for outputting the ringtone mixed with media output if a voice call is incoming and media playback is active; computer program code for determining whether a voice command is received while the call is incoming; computer program code for answering the call when the voice command received requests that the call be answered; computer program code for pausing or stopping the media playback if media playback is still active when the call is answered; computer program code for determining whether the call has ended; and computer program code for resuming or restarting the media playback after the call has ended.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to voice activation for a portable electronic device. The portable electronic device can be a multi-function electronic device. The voice activation can be robust and context sensitive. The voice activation can also be utilized without any preparatory user action with respect to the portable electronic device. The portable electronic device can also interact with a media system.

According to one embodiment, one function that can be supported by the portable electronic device is voice communications. When a voice call is incoming to the portable electronic device, the portable electronic device can automatically control itself or the media system to pause, stop and/or lower its volume so that media playback need not disturb a user while participating in the voice call. After the voice call ends, the portable electronic device can automatically control itself or the media system to resume, start and/or raise its volume so that the user can again participate in media playback.

The invention is well suited for a portable electronic device that can support multiple functions. In one embodiment, the invention is suitable for use with a portable electronic device having at least wireless voice communication capability and media playback capability. The portable electronic device can, for example, be a portable media device (e.g., digital music player or MP3 player) having wireless voice communications. In another embodiment, the portable electronic device can be a wireless communications device (e.g., cellular phone) having media playback and/or media recording capabilities. In still another embodiment, the portable electronic device can be a portable electronic device having media playback or recording capability and workout support via a workout manager. These portable electronic devices can also have other functions (e.g., applications), such as functions supporting electronic calendars, electronic appointments, network browsers, network data transfers, VoIP applications, etc.

Embodiments of the invention are discussed below with reference to FIGS. 1-12. However, those skilled in the art will readily appreciate that the detailed description given herein with respect to these figures is for explanatory purposes as the invention extends beyond these limited embodiments.

Figure 1:
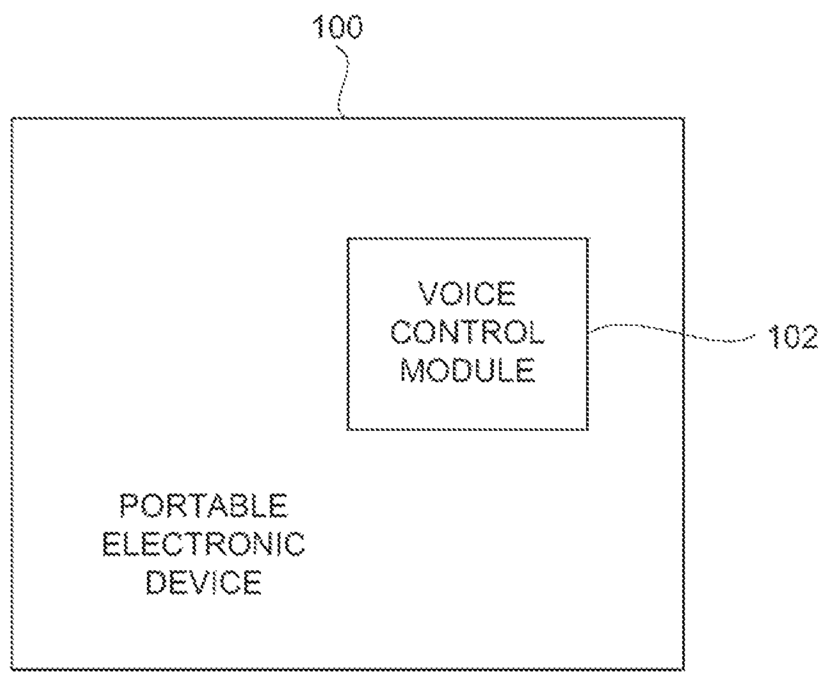
FIG. 1 is a block diagram of a portable electronic device according to one embodiment of the invention.

FIG. 1 is a block diagram of portable electronic device 100 according to one embodiment of the invention. Portable electronic device 100 includes voice control module 102. Voice control module 102 can be used to control portable electronic device 100. More particularly, a user of portable electronic device 100 can issue voice commands to portable electronic device 100. Voice control module 102 analyzes a user's voice input to determine whether it corresponds to a command understood by voice control module 102. If a command is recognized by voice control module 102, portable electronic device 100 can process the command. The command can pertain to any of a number of functions or operations supported by portable electronic device 100. Since portable electronic device 100 is able to operate in a voice-activated manner, portable electronic device 100 needs little or no user input devices, such as buttons, dials, touch pads and the like. Portable electronic device 100, however, can utilize such user input devices to replace or supplement voice commands.

Figure 2:
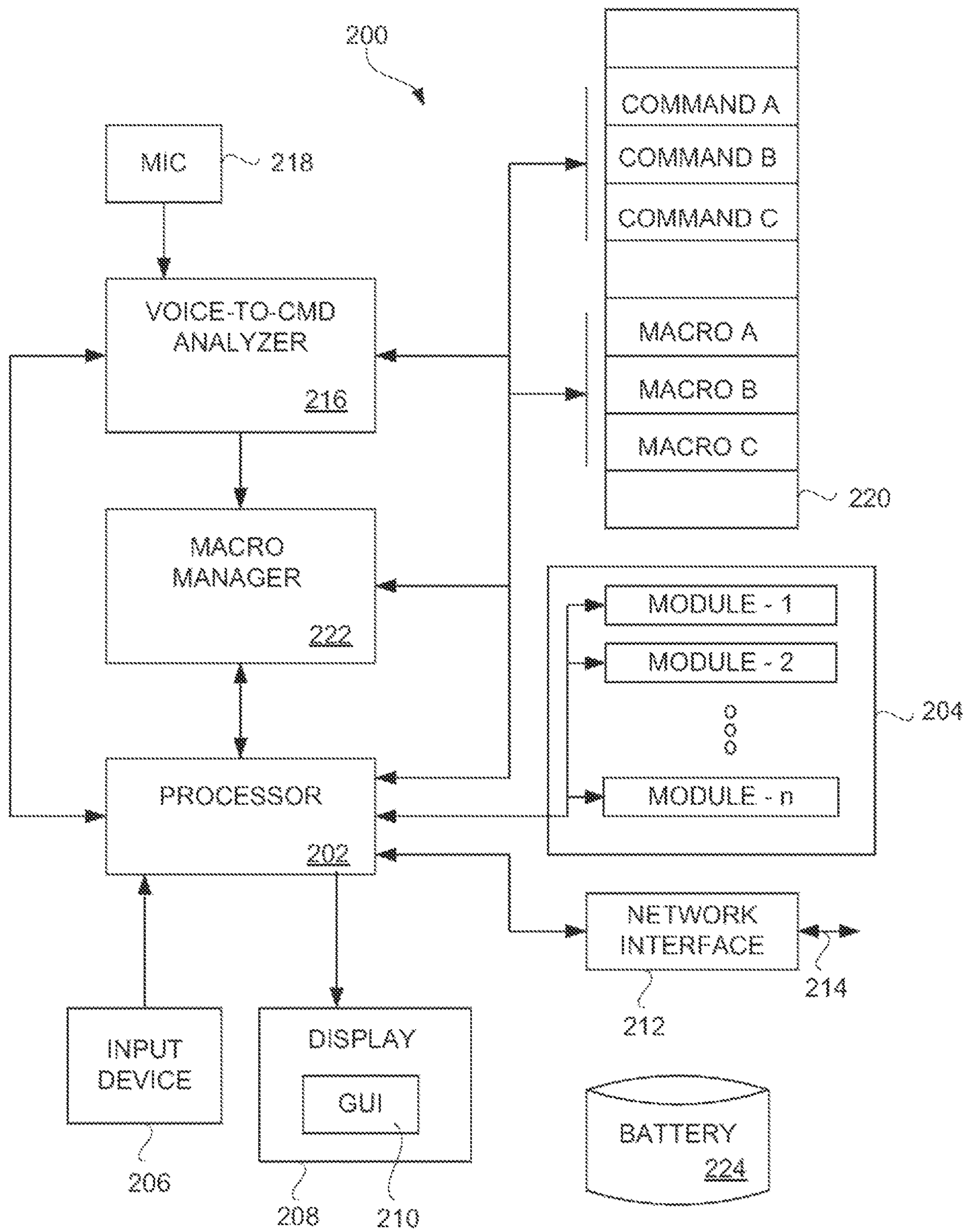
FIG. 2 is a block diagram of an electronic device according to one embodiment of the invention.

FIG. 2 is a block diagram of electronic device 200 according to one embodiment of the invention. Device 200 is typically a portable or mobile electronic device. Device 200 can pertain to a computing device, a media player, a mobile telephone, a portable game player, a portable workout manager, and the like. In one embodiment, device 200 is a multi-function device that supports a plurality of different functions. As one example, device 200 can be portable and operate as a mobile telephone while also operating as a media player. As another example, device 200 can operate as a media player while also operating as a portable workout manager.

Device 200 can include processor 202 that controls the overall operation of device 200. Device 200 can further include a program store 204 that stores a plurality of different software modules. The software modules can provide different functions or operations for the device 200. The software modules can correspond program code for application programs, operating systems, utility programs, and the like.

Device 200 can also include at least one input device 206. Input device 206 can pertain to one or more input buttons, touch-sensitive surfaces, rotary input mechanisms, etc. The input device 206 enables the user to provide user input, such as user selections for usage.

Device 200 can also include a display 208. As appropriate, graphical user interface (GUI) 210 can be presented on display 208. For example, GUI 210 can present a dialog window on display 208 that assists a user in controlling operation of device 200. GUI 210 can also present information to the user of device 200. Input device 206 can assist a user in providing user input to device 200, such as by interacting with GUI 210.

Device 200 also includes a network interface 212. Network interface 212 can establish a link 214 to a network, thereby facilitating wired or wireless network communications. In the case of a wireless network link, network interface 212 can include or pertain to a wireless transceiver.

In addition, device 200 can be controlled by voice control. In this regard, device 200 includes voice-to-command analyzer 216. Voice-to-command analyzer 216 operates to receive an audio input from a user via a microphone 218. Voice-to-command analyzer 216 can then analyze the audio input to determine whether it is requesting execution of a particular one of a set of predetermined commands or a particular one of a set of predetermined macros. As illustrated in FIG. 2, device 200 can include data store 220. Data store 220 can store a plurality of commands or macros as well as other data. These commands or macros are eligible to be executed by device 200 when requested by a voice input. Similarly, voice-to-command analyzer 216 can determine whether the voice input corresponds to a macro from a set of available macros stored in data store 220. The macros can be considered groups or sets of commands which are arranged in a particular sequence. A macro manager 220 can couple to voice-to-command analyzer 216 so that when the voice input corresponds to a macro, the macro manager 222 can manage the performance of the macro, which involves a plurality of commands operated in a particular sequence.

Device 200 can include battery 224 that provides power to device 200. Typically, battery 224 is rechargeable by coupling battery 224 to an AC outlet to allow a charge circuit (not shown) to charge battery 224. Although device 200 is powered by battery 224, in one embodiment, device 200 can also at times utilize power from AC power supplied via power cord coupled to an AC plug. The AC power, when available, is also used to charge battery 224.

Figure 3:
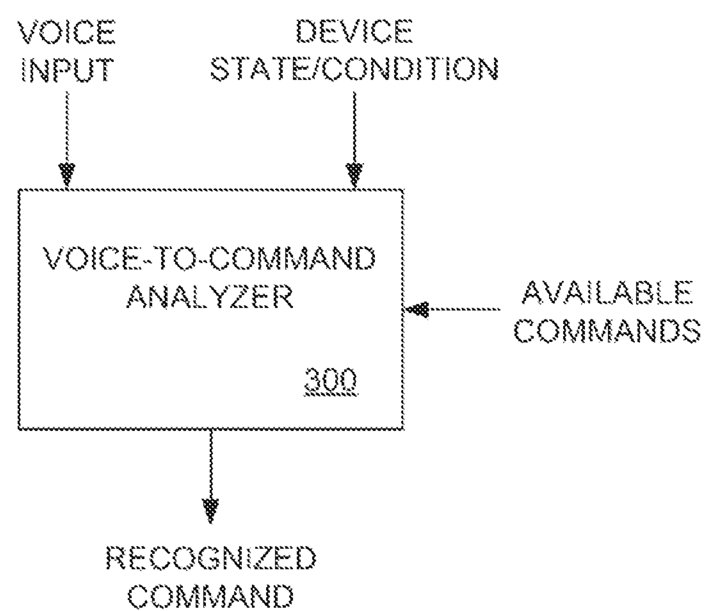
FIG. 3 is a block diagram of voice-to-command analyzer according to one embodiment of the invention.

FIG. 3 is a block diagram of voice-to-command analyzer 300 according to one embodiment of the invention. Voice-to-command analyzer 300 is, for example, one implementation of voice-to-command analyzer 216 illustrated in FIG. 2. Voice-to-command analyzer 300 receives a voice input from a microphone (e.g., microphone 218). Voice-to-command analyzer 300 also receives data pertaining to available commands. For example, the available commands can be stored and accessed in a data store, such as data store 220 illustrated in FIG. 2. In addition, voice-to-command analyzer 300 can receive device state information. The device state information can provide voice-to-command analyzer 300 with information concerning the state of the electronic device (e.g., device 200). The device state information can, for example, pertain to a state, condition, event or the like, which can pertain to hardware or software.

As an example, one state associated with the electronic device having voice-to-command analyzer 300 is a context of a graphical user interface (GUI) utilized by the electronic device. The context of the GUI can then provide state information to the voice-to-command analyzer 300. In one embodiment, depending upon the context of the GUI, different available commands can be utilized and provided to the voice-to-command analyzer 300. In general, as the device state changes, different available commands can be presented to voice-to-command analyzer 300. As a result, the available commands being provided to voice-to-command analyzer 300 can be restricted to those that are appropriate given the current state of the electronic device. Eventually, the voice-to-command analyzer 300 can recognize a command from the voice input. The recognized command is one of the available commands presented to voice-to-command analyzer 300. Of course, the voice input may not correlate to any of the available commands, in which case voice-to-command analyzer 300 would not output a recognized command.

Figure 4:
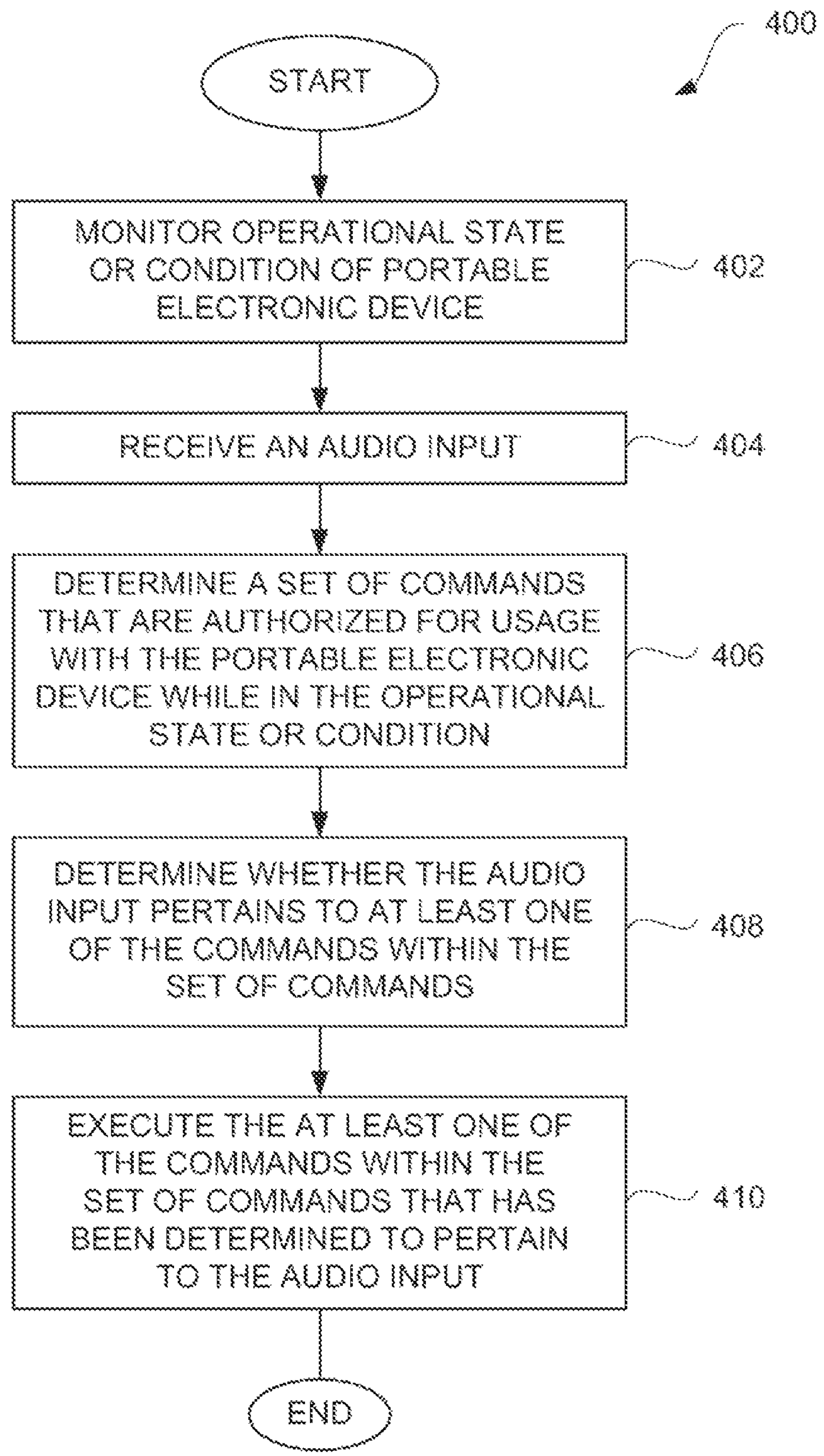
FIG. 4 is a flow diagram of voice command process according to one embodiment of the invention.

FIG. 4 is a flow diagram of voice command process 400 according to one embodiment of the invention. Voice command process 400 is, for example, performed by an electronic device, such as device 100 illustrated in FIG. 1 or device 200 illustrated in FIG. 2.

Voice command process 400 monitors 402 an operational state of a portable electronic device. For example, the operational state may correspond to a functional mode, usage or program being utilized by the portable electronic device. As another example, the operational state can pertain to a state of a graphical user interface being provided on a display associated with the portable electronic device.

The voice command process 400 also receives 404 an audio input. Here, the portable electronic device includes electrical components that enable the portable electronic device to receive 404 an audio input. Typically, the audio input is a voice input provided by a user of the portable electronic device.

Next, a set of commands that are authorized for usage with the portable electronic device while in the operational state can be determined 406. Then, the voice command process 400 can determines 408 whether the audio input pertains to at least one of the commands within the set of commands. Since the determination 408 is limited, in one embodiment, to those commands within the set of commands that are authorized for usage while in the operational state, the determination 408 can be rapidly performed without excessive computational capability and without excessive power consumption. Thereafter, the at least one of the commands within the set of commands that has been determined 408 to pertain to the audio input can be executed 410. Consequently, voice command process 400 receives an audio input from a user, determines which of the limited set of available commands the user is requesting by the audio input, and then executes the appropriate command. Accordingly, an electronic device using voice command process 400 is able to command or control the operation of the electronic device using voice, namely, the electronic device is voice activated.

Figure 5:
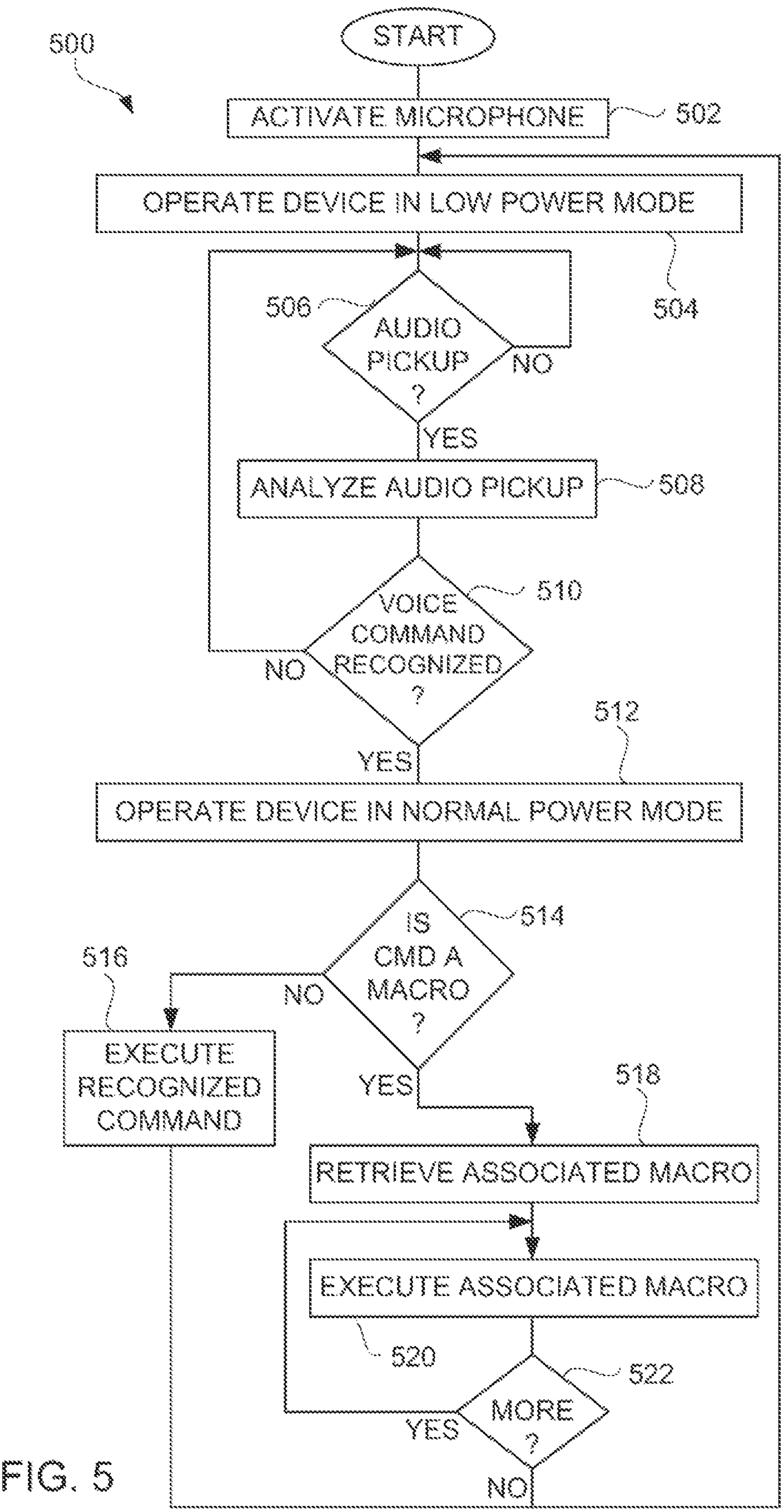
FIG. 5 is a flow diagram of voice command process according to another embodiment of the invention.

FIG. 5 is a flow diagram of voice command process 500 according to another embodiment of the invention. Voice command process 500 is, for example, performed by an electronic device, such as device 100 illustrated in FIG. 1 or device 200 illustrated in FIG. 2.

The voice command process 500 activates 502 a microphone. The device is also operated 504 in a low power mode if appropriate. For example, if the device is substantially idle and no user input is being received, the electronic device can be placed in a low power mode to conserve battery energy. Decision 506 determines whether an audio pickup has been received. The device can receive an audio pickup even while in the low power mode. When decision 506 determines that an audio pickup has not been received, voice command process 500 awaits to receive an audio pickup. Once the decision 506 determines that an audio pickup has been received, the audio pickup is analyzed 508. When analyzing the audio pickup, the processing can be made efficient and more robust by taking into consideration context with which the audio pickup has been received. The context can pertain to the electronic device, such as a state of the electronic device. In other words, the audio pickup can be analyzed 508 in a context-sensitive manner.

Next, decision 510 determines whether a voice command has been recognized. When decision 510 determines that a voice command has not recognized, voice command process 500 returns to repeat decision 506 to subsequently process another audio pickup. On the other hand, when decision 510 determines that a voice command has been recognized, the electronic device is operated 512 in a normal power mode. Here, if the electronic device was in a low power mode, the electronic device is returned to a normal power mode so that the recognized voice command can be quickly and efficiently processed.

In this embodiment, the recognized command can pertain to a macro. Decision 514 determines whether the recognized command is a macro. When the recognized command is not a macro, the recognized command is executed 516. On the other hand, when decision 514 determines that the command is a macro, the associated macro is retrieved 518. The associated macro is then executed 520. Decision 522 then determines whether there is any more operations (e.g., commands) within the associated macro that is to be executed. When decision 522 determines that there are more operations to be executed, voice command process 500 returns to repeat block 520 so that additional operations of the associated macro can be executed. Once decision 522 determines that there are no more operations within the macro to be executed, as well as directly following the block 516, voice command process 500 returns to repeat block 502 and subsequent operations so that a subsequent audio pickup can be processed in a similar manner.

Figure 6:
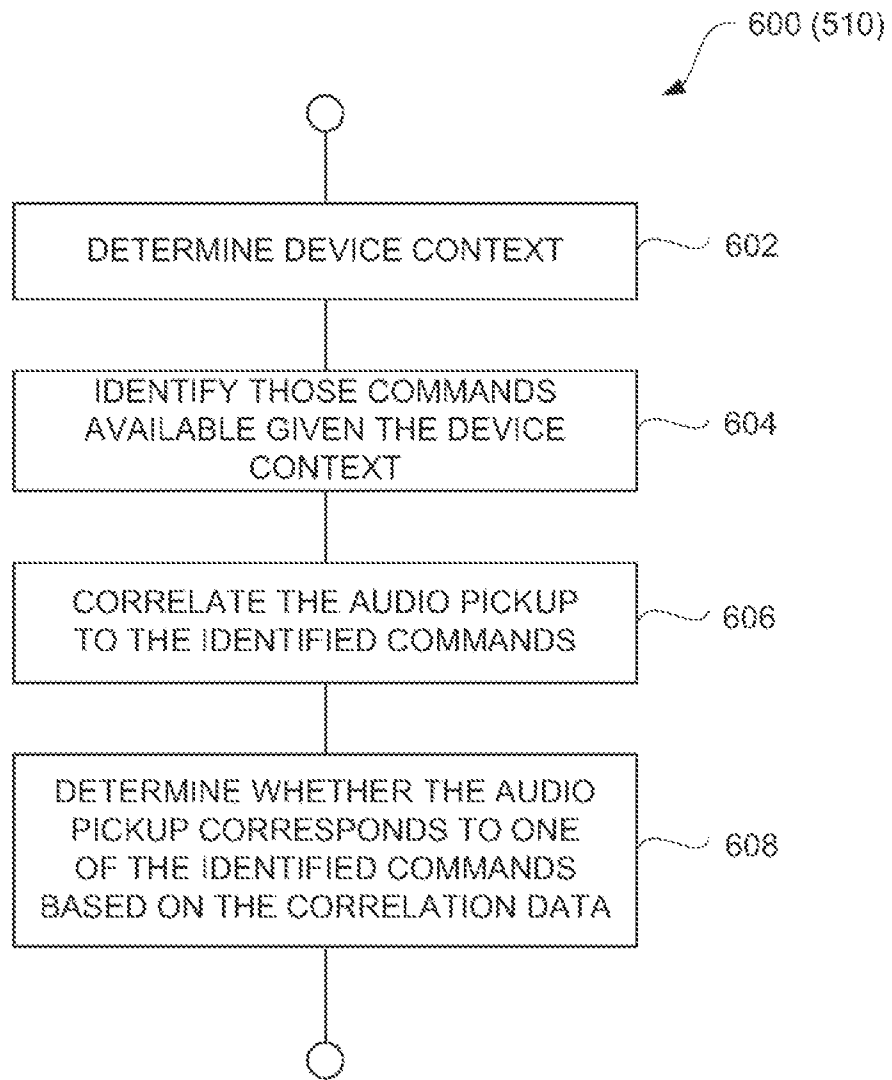
FIG. 6 is a flow diagram of a voice command recognition process according to one embodiment of the invention.

FIG. 6 is a flow diagram of a voice command recognition process 600 according to one embodiment of the invention. The voice command recognition process 600 can, for example, pertain to processing associated with the decision 510 illustrated in FIG. 5. In other words, the voice command recognition process operates to determine whether the audio pickup pertains to one of the available commands supported by an electronic device. In particular, the voice command recognition process 600 can determine 602 a device context. Those commands available given the device context can then be identified 604. The audio pickup can be correlated 606 to the identified commands. Thereafter, the voice command recognition process 600 determines 608 whether the audio pickup corresponds to one of the identified commands based on the correlation data.

Figure 7A:
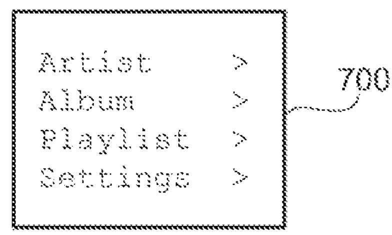
FIGS. 7A-7C illustrate exemplary graphical user interfaces that can be presented on a display device according to certain embodiments of the invention.
Figure 7B:
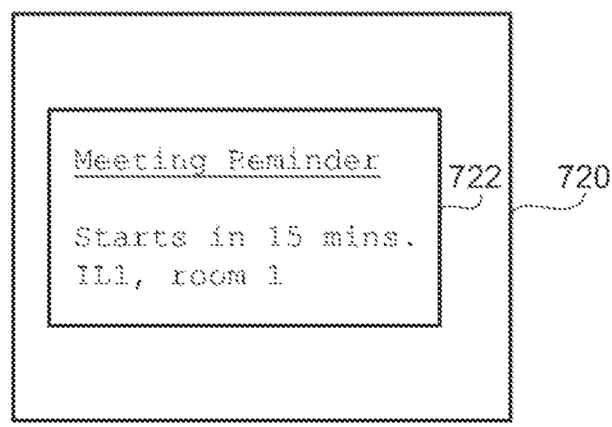
Figure 7C:
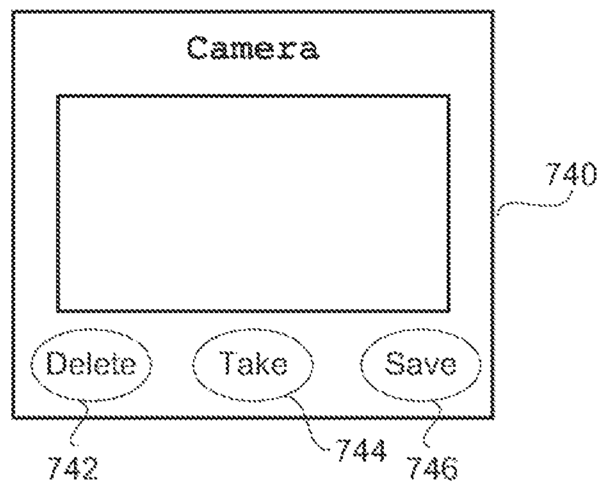

One aspect of the invention pertains restricting available commands based on device context. The device context, in one embodiment, pertains to the state of a graphical user interface (GUI). FIGS. 7A-7C illustrate exemplary graphical user interfaces that can be presented on a display device according to certain embodiment of the invention. These exemplary graphical user interfaces are just a few of the many embodiments that can utilize state of GUI to restrict or limit available voice commands to be recognized.

FIG. 7A illustrates exemplary menu 700 suitable for use on a display device associated with an electronic device according to one embodiment of the invention. While menu 700 is being displayed, a user can provide an audio input that pertains to a voice command. When menu 700 is displayed, the available voice commands that can received can be restricted. The menu 700 can be used to navigate to an appropriate media item or a group of media items to be played by the electronic device. While menu 700 is being displayed, a user can request to play a particular media item. For example, the user might provide an audio input, namely, a voice command, by announcing the phrase "play irreplaceable". Here, the electronic device would recognize that the first portion "play" is a command that is supported and the second term "irreplaceable" is the name of a song available to be played at the electronic device. As another example, the user could provide an audio input, namely, a voice command, by announcing the phrase "play 06", which could be the user requesting to play a playlist denoted as "summer '06" and available at the media device. As still another example, the user could provide an audio input, namely, a voice command, by announcing one of the menu items of the menu 700 (or perhaps even a nested menu) which could effect a selection of such item. For example, the menu items could be categories, classifications, groupings, media items, device settings, device functions, and the like. The menu 700 can represent one menu of a series of nested or hierarchical menus, which can also be navigated or traversed by voice commands.

FIG. 7B illustrates display region 720 of a display device associated with an electronic device according to one embodiment of the invention. Display region 720 includes meeting reminder notification 722. Meeting reminder notification 722 can be displayed on at least a portion of display region 720. In this example, meeting reminder notification 722 informs the user that a meeting to which they are scheduled starts in "15 minutes" at building "IL1, Room 1." In this context, the available commands available to the user can pertain to permitted interaction with the electronic device in response to the meeting reminder. For example, the acceptable commands can be "clear" or "close" which requests that the electronic device close meeting reminder notification 722. Another example is the command "tell" which can respond to the meeting attendees with a message. For example, "tell everyone I will be 10 minutes late" which will be understood by the electronic device as a request to send a text message or email to all attendees of the meeting that the user will be ten (10) minutes late to the meeting.

FIG. 7C is an illustration of exemplary camera window 740 of a display device associated with an electronic device according to one embodiment of the invention. Camera window 740 can be presented on a display device associated with the electronic device. Camera window 740 is displayed on the display device when the electronic device has been placed in a camera mode. While in the camera mode, the available commands can be specific to likely camera operations. For example, in the camera mode, likely camera operations include taking pictures, deleting pictures, saving pictures, etc. Available commands in the camera mode can also include macros. As an example, a macro can be triggered when an audio input is a command requesting that a current picture be taken. As an example, a macro can cause the picture to be taken, cause the picture to be saved in memory, and cause the picture to be uploaded. Although the electronic device is voice-activated, in some embodiments, the electronic device also supports the use of non-voice-activated techniques to provide user input. For example, camera window 740 can include soft buttons 742-746 for which the user can provide user input. Soft buttons 742-746 can be activated using a keypad.

FIGS. 8A-8D illustrate exemplary graphical user interfaces that can be provided on a display device of an electronic device according to certain embodiments of the invention. These graphical user interfaces are associated with an electronic device that supports wireless voice communications. These exemplary graphical user interfaces are just a few of the many embodiments that can be utilized by an electronic device that supports wireless voice communications.

Figure 8A:
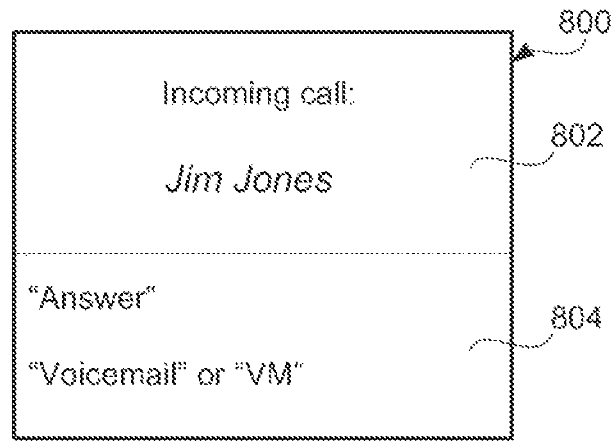
FIGS. 8A-8D illustrate exemplary graphical user interfaces that can be provided on a display device of an electronic device according to certain embodiments of the invention.

FIG. 8A illustrated exemplary graphical user interface (GUI) 800 for an incoming call. GUI 800 is a representative display screen concerning an incoming call from a caller ("Jim Jones") as provided in upper portion 802 of GUI 800. Lower portion 804 of GUI 800 can display some or all of the available commands that can be spoken by a user to initiate the corresponding actions at the electronic device. As shown in FIG. 8A, the exemplary available commands with respect to the particular context of the GUI 800 can include "Answer" or "Voicemail" (or its abbreviated form "VM").

Figure 8B:
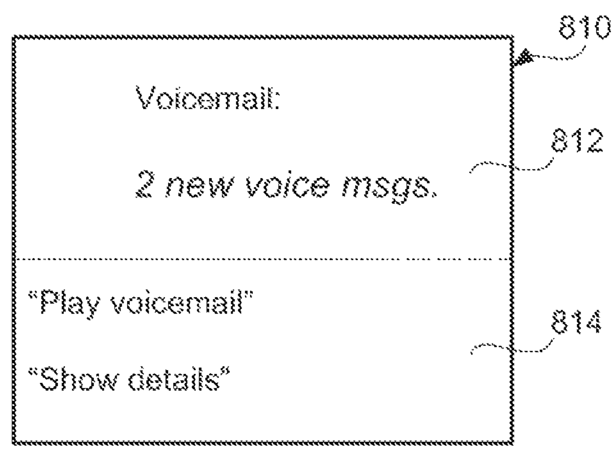

FIG. 8B illustrates exemplary GUI 810 for a voicemail notification. GUI 810 is a representative display screen concerning voicemail available for a user of the electronic device. In upper portion 812 of GUI 810, the user can be informed that there are new voice messages awaiting their review. For example, as shown in FIG. 8B, the user is informed that there are two new voice messages. Lower portion 814 of GUI 810 can display some or all of the available commands that can be spoken by a user to initiate the corresponding actions at the electronic device. In FIG. 8B, the exemplary available commands illustrated in lower portion 814 can include "Play voicemail" and "Show details".

Figure 8C:
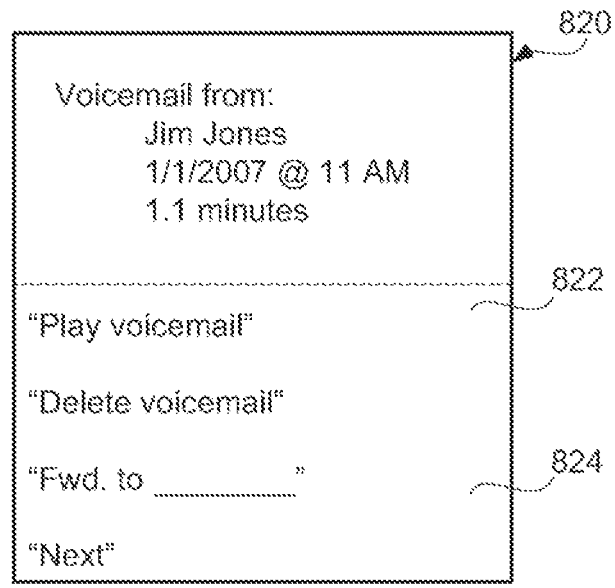

FIG. 8C illustrated exemplary GUI 820 for voicemail review. GUI 820 is a representative display screen for reviewing voicemail at the electronic device. In upper portion 822 of GUI 820, description information pertaining to a voicemail that can be reviewed is provided. In the example illustrated in FIG. 8C, the information concerning the voicemail specifies the caller name, date, time and duration for the voicemail. Lower portion 824 can display some or all exemplary available commands that can be spoken by a user to initiate action at the electronic device. In particular, lower portion 824 indicates that the exemplary available commands can include "Play voicemail", "Delete voicemail", "Forward to [contact]", or "Next". The forward command can specify to forward the voicemail to another person known to the electronic device or another device. For example, the user could provide the command "Forward to Bob" which would be understood by the electronic device to forward the voicemail to Bob, who is a known contact (e.g., address book) of the user. As another example, the user could provide the command "Forward to my computer" which would be understood by the electronic device to forward the voicemail from their portable electronic device (or its associated supporting server) to the user's computer (personal computer).

Figure 8D:
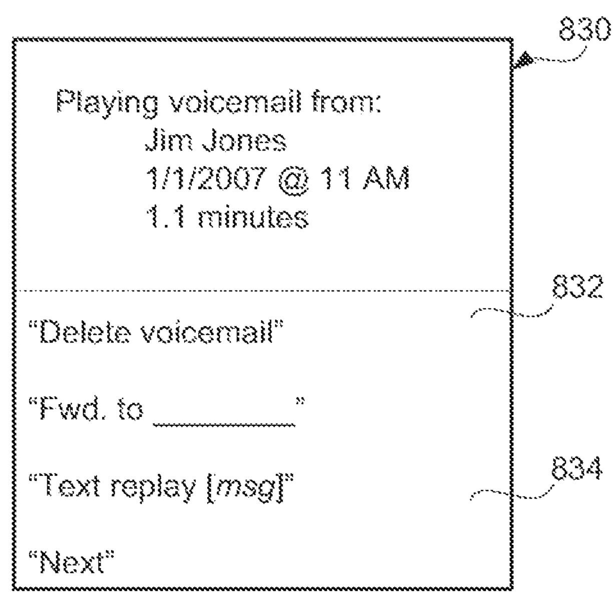

FIG. 8D illustrates exemplary GUI 830 for playing of a voicemail. GUI 830 is a representative display screen for playing voicemail at the electronic device. Upper portion 832 of GUI 830 indicates that descriptive information concerning the voicemail be played. In the example illustrated in FIG. 8D, the information concerning the voicemail specifies the caller name, date, time and duration for the voicemail. Lower portion 834 can display some or all of the available commands while the electronic device is presenting GUI 830. In particular, lower portion 834 indicates that the available commands can include "Delete voicemail", "Forward to [contact]", "Text reply [Msg]". The text reply command can specify to send a reply text message to another person known to the electronic device or another device. For example, the spoken phrase could be "Text reply meet you at noon for lunch," which causes a text message "meet you at noon for lunch" to be sent to Jim, who is the sender of the message being replied to.

According to another embodiment of the invention a portable electronic device can be used in conjunction with a media system. The media system can pertain to a television system, a home stereo, a personal computer, and the like. The media system can also be referred to as a home entertainment system. FIGS. 9A-9E illustrate certain predetermined system configurations for a portable electronic device and a media system.

Figure 9A:
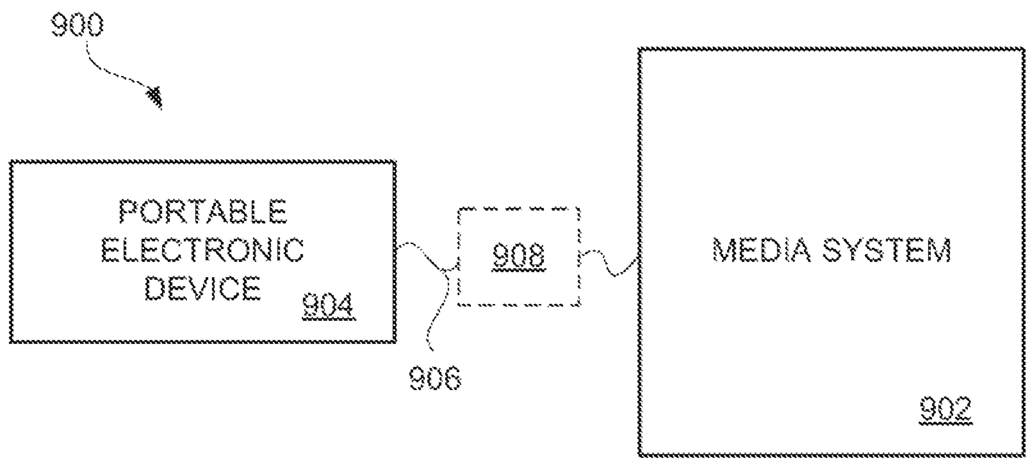
FIGS. 9A-9E illustrate certain predetermined system configurations for a portable electronic device and a media system.

FIG. 9A is a block diagram of system configuration 900 according to one embodiment of the invention. System configuration 900 can include media system 902 and portable media system 904. Portable electronic device 902 is an electronic device, such as a personal computer, mobile communication device, media player (including portable media player), etc. Portable electronic device 902 can couple to media system 902 and thus be used in conjunction with portable electronic device 902. In FIG. 9A, portable electronic device 904 is shown as being apart from media system 902 but connected by way of a wired link 906. The wired link 906 may connect to the media system 902 and the portable electronic device 904 through electronic device, such as a network.

Figure 9B:
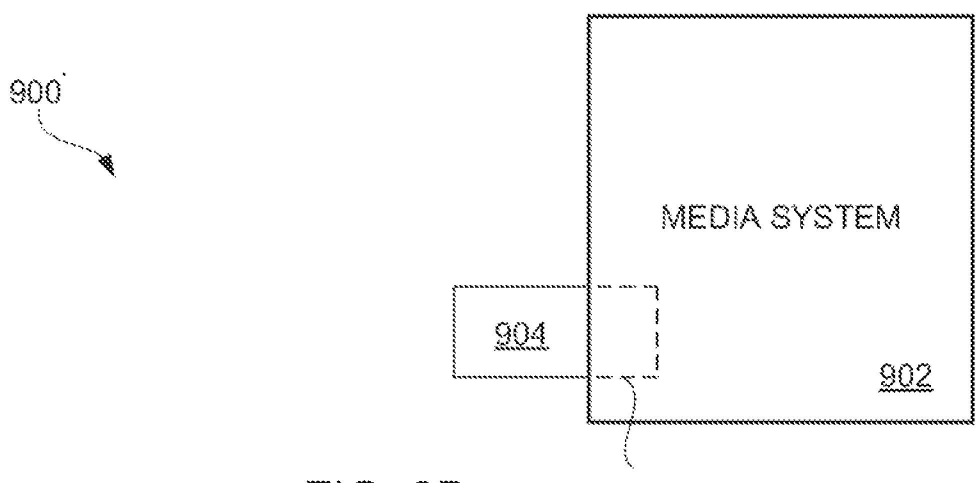

FIG. 9B is a block diagram of system configuration 900' according to another embodiment of the invention. System configuration 900' is generally similar to system configuration 900 illustrated in FIG. 9A. However, in FIG. 91, portable electronic device 904 has been physically connected to media system 902. In one embodiment, host device 902 can include receptacle 910 that is capable of receiving portable electronic device 904, thereby providing a direct connection between portable electronic device 904 and media system 902.

Figure 9C:
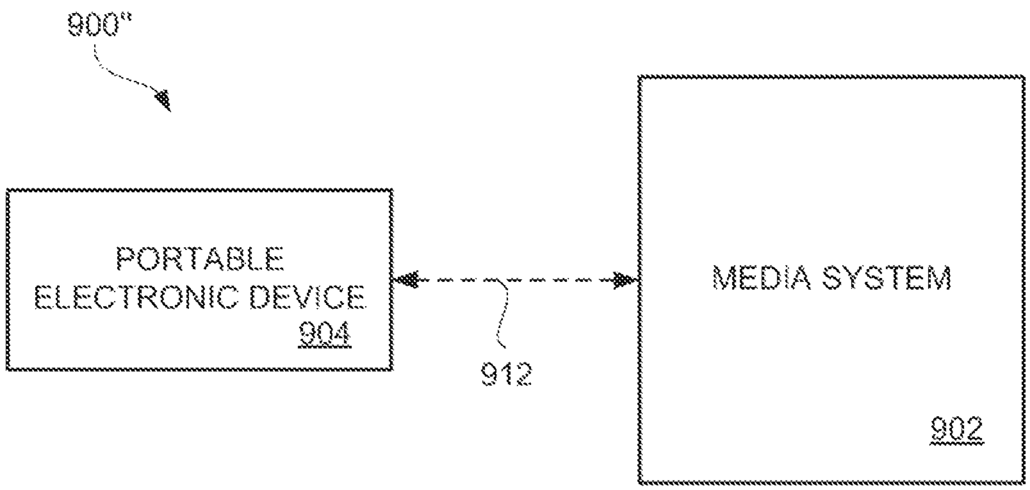

FIG. 9C is a block diagram of system configuration 900" according to another embodiment of the invention. System configuration 900" is generally similar to system configuration 900 as illustrated in FIG. 9A. However, in FIG. 9C, portable electronic device 904 is brought within proximity to media system 902. When portable electronic device 904 is proximate to host device 902, wireless data link 912 can be provided by a short range wireless data link between portable electronic device 904 and media system 902.

Figure 9D:
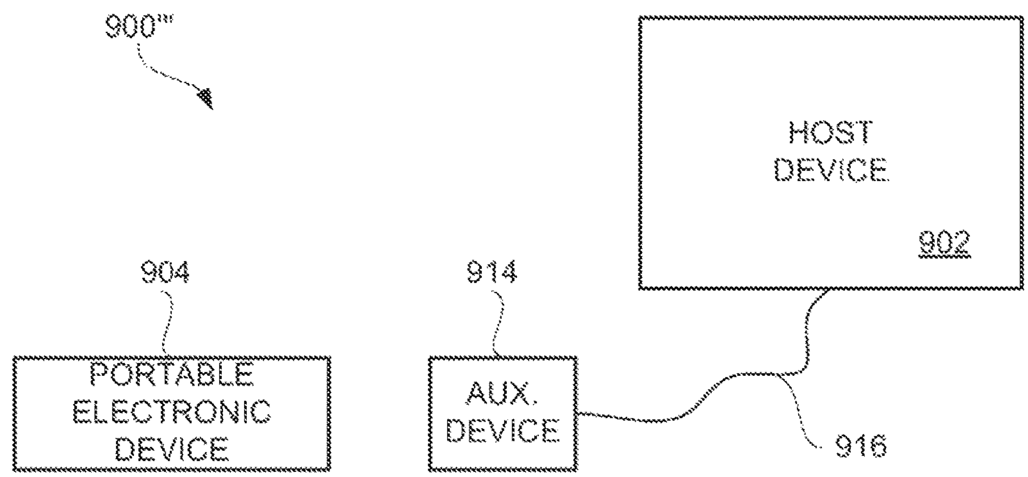

FIG. 9D is a block diagram of system configuration 900'" according to still another embodiment of the invention. System configuration 900'" can include portable electronic device 904 and media system 902 as discussed above in FIG. 9A. However, system configuration 900'" can further include auxiliary device 914 that is electrically connected to host device 902 by way of cable (or wire) 916. In one embodiment, auxiliary device 914 can pertain to a peripheral device for media system 902. One specific example for auxiliary device 914 is a docking station. Auxiliary device 914 can include a receptacle to receive wireless device 904 similar to receptacle 910 illustrated in FIG. 9B. Alternatively, auxiliary device 914 could permit a wireless data link to be established between portable electronic device 904 and auxiliary device 910 so long as such devices are in proximity, which is similar to wireless datalink 912 illustrated in FIG. 9C. Auxiliary device 914 can also be referred to an intermediate device. In other words, auxiliary device 914 as shown in FIG. 9D is provided between portable electronic device 904 and media system 902. The intermediate device can pertain to a dock, adapter, media station, media player, personal computer, etc. In one example, an adapter can pertain to a cigarette lighter adapter that can be utilized in a cigarette lighter as typically provided in an automobile.

Figure 9E:
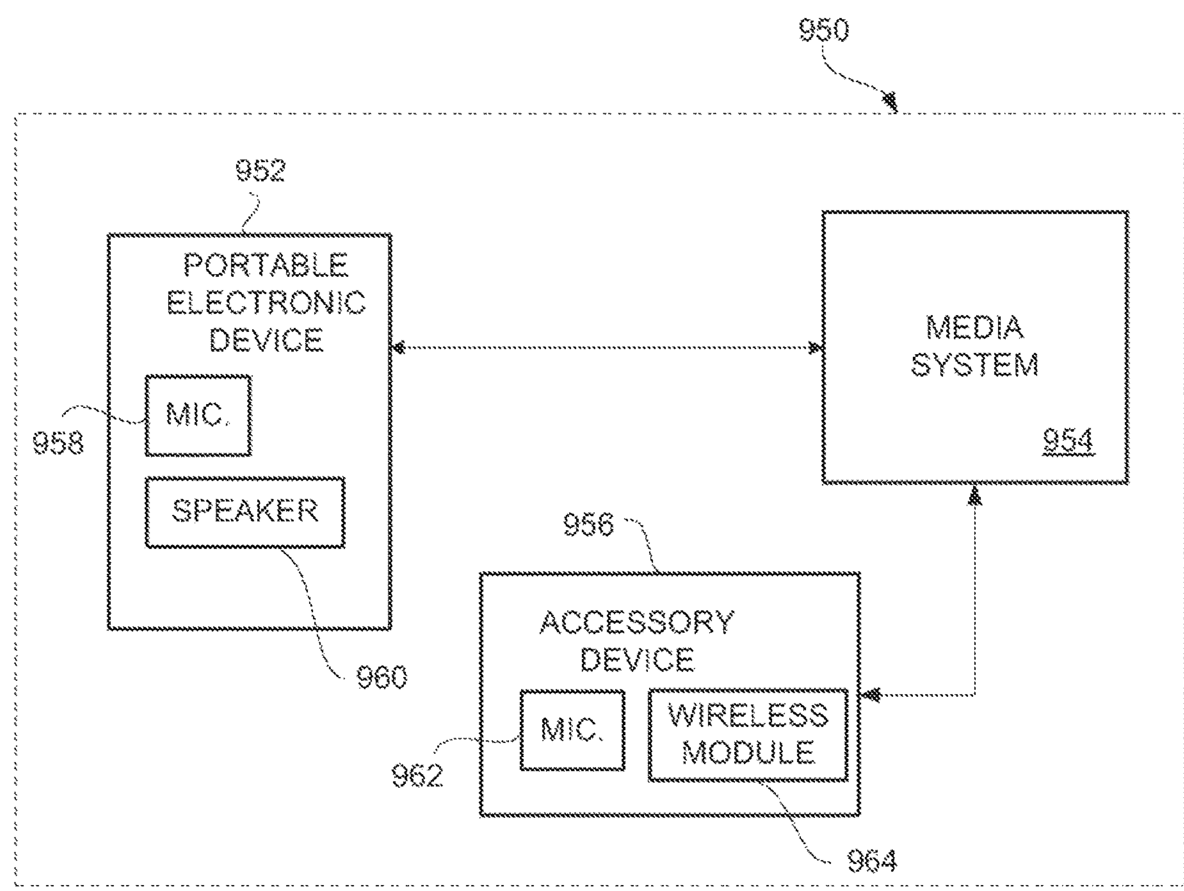

FIG. 9E is a block diagram of local environment 950 according to one embodiment of the invention. Local environment 950 can pertain to an automobile environment, a home environment, an office environment or other relatively constrained local environment. Within local environment 950, portable electronic device 952 can interact with media system 954. Media system 954 can pertain to a television system, a home stereo, a personal computer, and the like. Media system 954 can also be referred to as a home entertainment system. Accessory device 956 can also be provided in local environment 950. Portable electronic device 952 can include microphone 958 and speaker 960. Speaker 960 can be used to output audio sound (audio output) to the user. For example, the audio output can pertain to a voice call or media output. Microphone 958 can be utilized to pick up voice commands that are used by portable electronic device 950 or media system 954. Accessory device 956 can also include microphone 962 to pick up voice commands. Such voice commands can be supplied to media system 954 which, in turn, can supply them to portable electronic device 952, or the voice commands can be directly provided from accessory device 956 to portable electronic device 952. Accessory device 956 can also include wireless module 964. Wireless module 964 can permit accessory device 956 to wirelessly communicate to wireless headset 966. The wireless protocol being utilized between wireless headset 966 and wireless module 964 can pertain to Bluetooth technology or other short range wireless technology. Headset 966 can receive and/or output audio from/to media system 954 or portable electronic device 952. Accessory device 956 could also include a speaker (not shown) to provide audio output.

According to one aspect of the invention, a portable electronic device can interact with a media system. The interaction can be provided via a direct connection, a wired connection to a network, or a wireless connection to a network.

Figure 10:
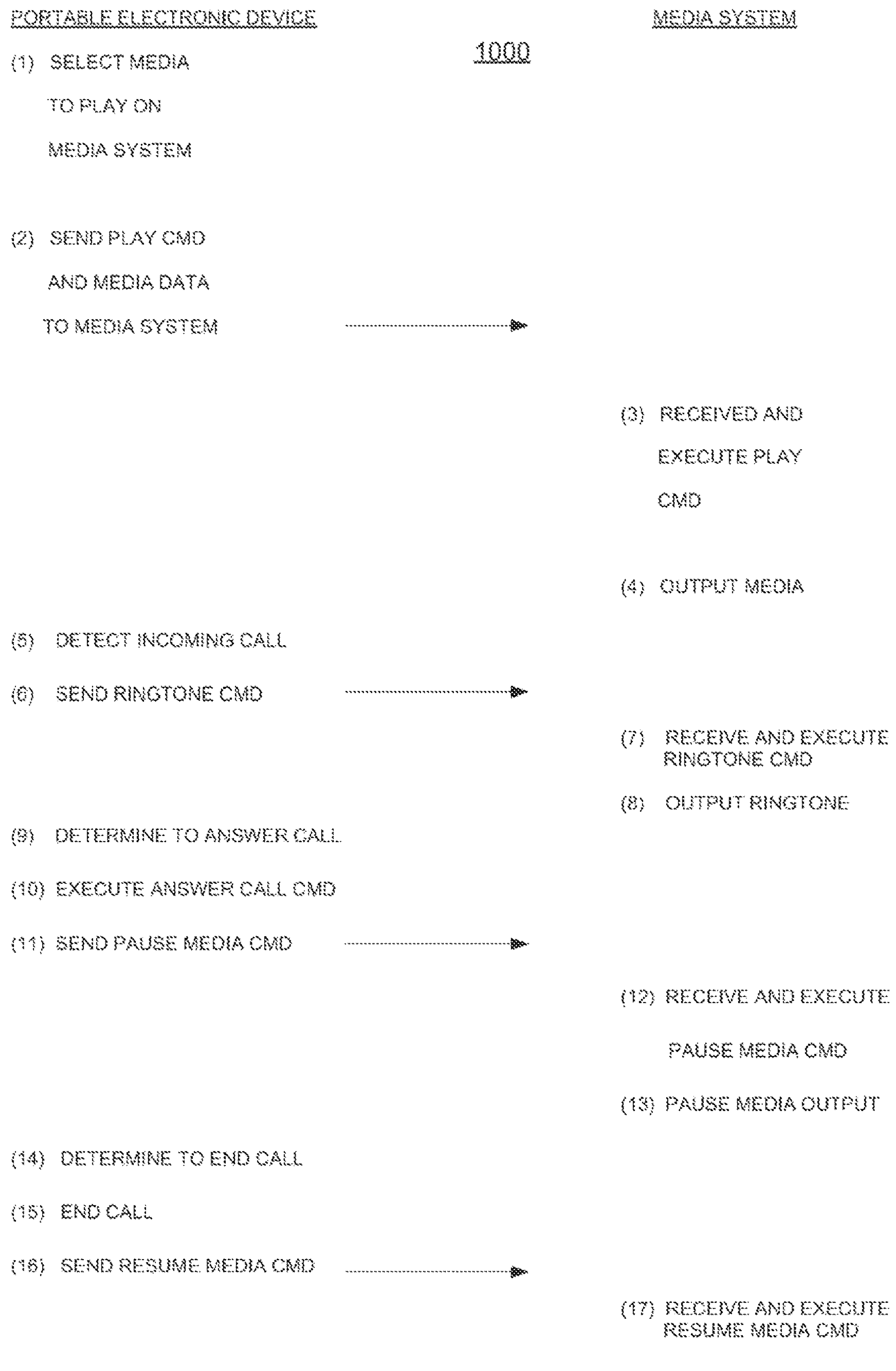
FIG. 10 illustrates process involving interaction between a portable electronic device and a media system according to one embodiment of the invention.

FIG. 10 illustrates process 1000 involving interaction between a portable electronic device and a media system according to one embodiment of the invention. In this embodiment, the context of the interaction is such that the media system is playing media using media data provided by the portable electronic device, while also answering a telephone call at the portable electronic device.

Process 1000 is a representative process that can be utilized between a portable electronic device and a media system according to one embodiment of the invention. At step 1, media to be played on the media system can be selected. A play command and the media data can then be sent to the media system (step 2). At the media system, the play command and the media data can be received and then the play command executed (step 3). Hence, media corresponding to the media data is output (step 4). Here, in this embodiment, the media data for the media to be played is provided by the portable electronic device to the media system. In another embodiment, the media data could be resident on the media system and when the play command is executed, the media could be output from the media data resident on a media system.

At some time later, assuming that the media is still being output, an incoming call can be detected (step 5). When an incoming call is detected (step 5), a ringtone command can be sent to the media system (step 6). The media system can subsequently receive and execute the ringtone command (step 7) when the ringtone command is executed, a ringtone is output (step 8). At the portable electronic device, when the ringtone is output (step 8), the user of the portable electronic device understands that there is an incoming call that can be answered. It should be understood that the ringtone could also be output directly at the portable electronic device. However, one advantage of outputting the ringtone by the media system is that the media being output by the media system can also continue to be output in a manner such that the ringtone can still be heard. For example, when outputting the ringtone, the output of the media (step 4) could have its volume lowered. In any case, at step 9, it is determined whether the user desires to answer the call. In this embodiment, it is assumed that the user will signal the portable electronic device using a voice command. Alternatively, the user can signal the portable electronic device to answer the call through a physical selection (e.g., button press). Hence, when the user has signaled to answer the call by a voice command, an answer call command will be executed (step 10). Since the call is being answered, a pause media command can be sent to the media system (step 11). The media system then receives and executes the pause media command (step 12). In doing so, media output is paused (step 13). Then, the user participates in the call and at some time later determines to end the call (step 14). Again, the determination to end the call can be done in a voice-activated manner. Alternatively, the end of the call can be initiated through a physical selection (e.g., button press). In any case, when the determination is made to end the call (step 14), the call is ended (step 15). A resume media command can then be sent to the media system (step 16). At the media system, the resume media command can be received and executed (step 17). The media output is then resumed (step 18).

Figure 11A:
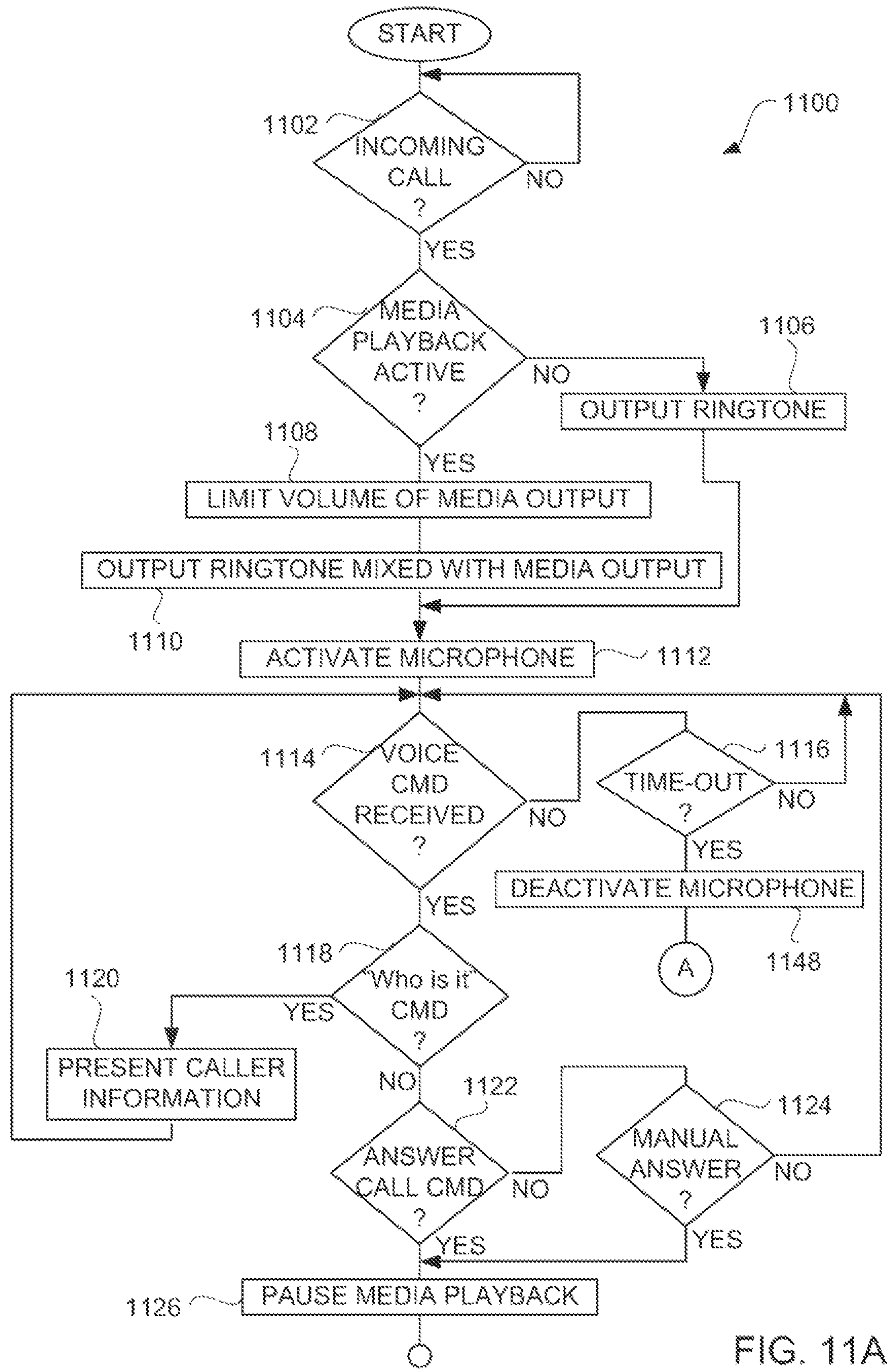
FIGS. 11A and 11B are flow diagrams of process concerning media playback and voice call handling according to one embodiment of the invention.
Figure 11B:
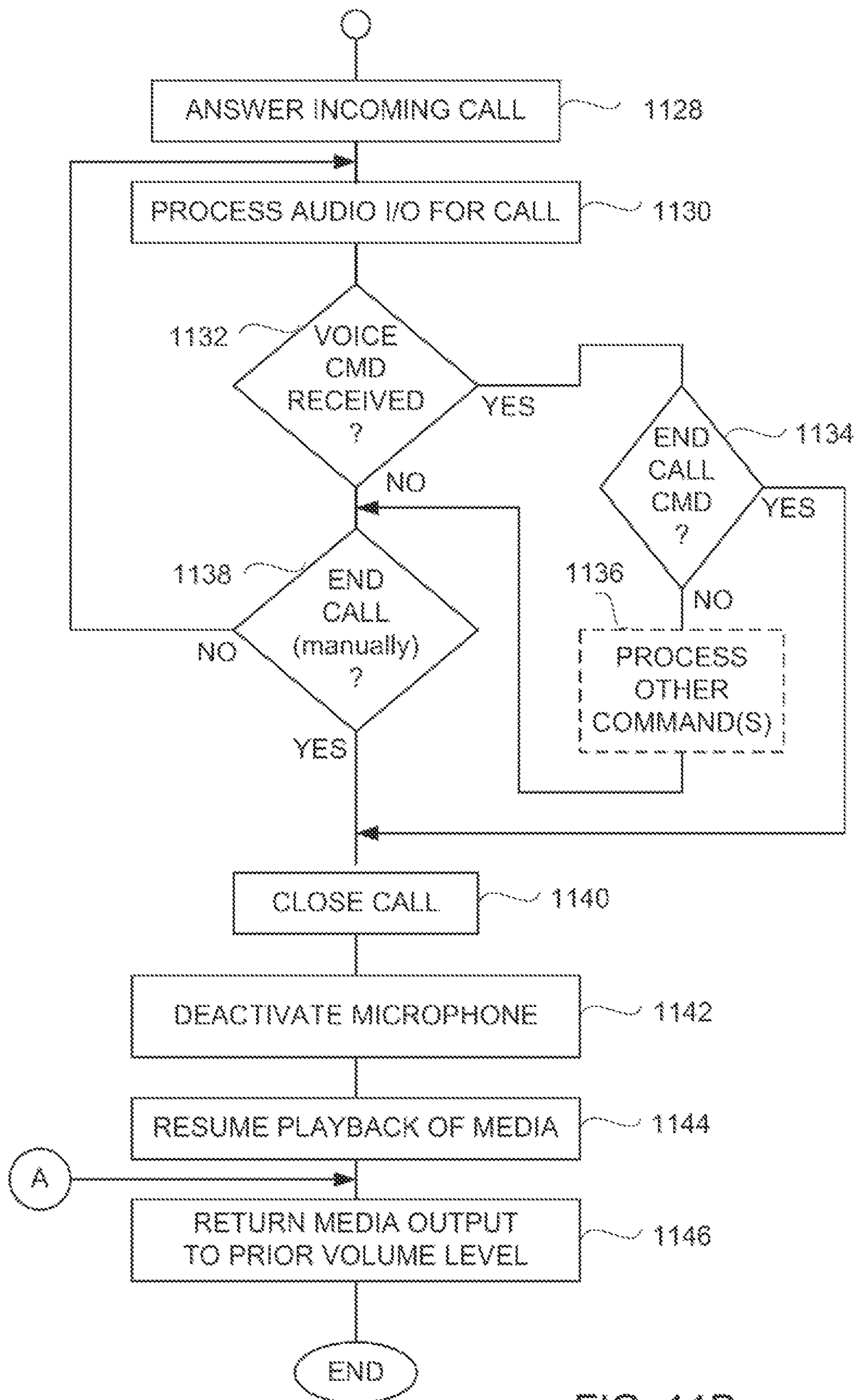

FIGS. 11A and 11B are flow diagrams of process 1100 according to one embodiment of the invention. Process 1100 concerns media playback and voice call handling. In one example, process 1100 can be performed by a portable electronic device supporting wireless voice communications and media playback. In another example, process 1100 can be performed by a portable electronic device supporting wireless voice communications and a media system providing media playback.

Process 1100 can begin with decision 1102 that determines whether a call is incoming. When decision 1102 determines that a call is not incoming, process 1100 waits for an incoming call. On the other hand, when decision 1102 determines that a call is incoming, decision 1104 determines whether media playback is active. When decision 1104 determines that media playback is not active a ringtone can be output 1106. Alternatively, when decision 1104 determines that media playback is active, the volume of the media output can be limited 1108. Also, a ringtone mixed with the media output can be output 1110. Following block 1106 or block 1110, a microphone can be activated 1112.

Next, decision 1114 determines whether a voice command has been received. When decision 1114 determines that a voice command has not been received, decision 1116 determines whether a time-out has occurred. The time-out refers to a predetermined period of time during which the user of the electronic device can answer the incoming call. During this period of time, the microphone is activated so that a voice command can be received. When decision 1116 determines that a time-out has not yet occurred, process 1100 returns to repeat decision 1114 to continue to determine whether a voice command has been received. When decision 1114 determines that a voice command has been received, decision 1118 can determine whether a “who is it” command has been received. The “who is it” command is one type of voice command that can be received. When decision 1118 determines that a “who is it” command has been received, then caller information can be presented 1120. Presentation 1120 of caller information can be performed using a display device and/or by audio output. Following block 1120, process 1100 returns to repeat decision 1114 and subsequent blocks.

On the other hand, when decision 1118 determines that the voice command received is not a “who is it” command, decision 1122 determines whether the voice command is an answer call command. When decision 1122 determines that the voice command is not an answer call command, decision 1124 determines whether a call is to be manually answered. When decision 1124 determines that the call is not to be manually answered, then process 1100 returns to repeat decision 1114. Alternatively, when decision 1122 determines that the voice command received is an answer call command, as well as following decision 1124 when the call is to be manually answered, the media playback is paused 1126. By pausing the media playback, the user of the electronic device is able to participate in the call without being disturbed by the media playback. In another embodiment, the media playback can continue with its volume substantially limited such that it is does not materially interfere with the ability of the user to participate in the call. The incoming call is also answered 1128. Audio input/output for the call can then be processed 1130.

As the call continues, audio pertaining to the call will be incoming and outgoing so as to carry out the conversation or communications associated with the call. Decision 1132 can determine during the call whether a voice command has been received. Here, during the call, the electronic device can render certain commands as being available to be voice-activated by a user. When decision 1132 determines that a voice command has been received, decision 1134 determines whether the voice command is an end call command. The end call command is one type of voice command that can be received. When decision 1134 determines that the voice command that has been received is not an end call command, then optionally other commands can be processed 1136. Alternatively, when decision 1132 determines that a voice command has not been received, as well as following block 1136, decision 1138 determines whether a call is to end. Here, the call can be ended by a manual operation with respect to the electronic device. In other words, decision 1138 is a manual operation that is distinct from a voice command. When decision 1138 determines that the call is not to end, process 1100 returns to repeat block 1130 and subsequent blocks. Alternatively, when decision 1138 determines that the call is to end manually, or when decision 1134 determines that the received voice command is an end call command, then the call is closed 1140. Further, the microphone is deactivated 1142. In addition, playback of the media can be resumed 1144. Also, when decision 1116 determines that a time-out has occurred, the microphone can also be deactivated 1148. Following block 1148 or block 1144, the media output can be returned 1146 to its prior volume level. Following block 1146, process 1100 can end.

The media playback and voice call handling discussed above in FIGS. 10, 11A and 11B are examples of control of a media system by way of voice commands provided at a portable electronic device (or an associated accessory device). More generally, according to one embodiment of the invention, a media system can be controlled in any of a number of ways by voice commands provided at a portable electronic device (or an associated accessory device). For example, a user of the portable electronic device can provide voice comments that cause the media system to perform a channel change, a mute operation, media source change, track change, playback operation, stop playback, volume adjustment, etc.

The electronic device as described herein can be a wireless communication device (e.g., portable telephone) capable of communication over a network. The wireless communication device can also include other applications such as a media playback application or a media recording application.

The electronic device as described herein can be a media device (e.g., media player) capable of playing (including displaying) media items. The media items can pertain to audio items (e.g., audio files or songs), videos (e.g., movies) or images (e.g., photos). The media device can also include other applications such as a wireless communication application.

In one embodiment, the electronic device is a portable electronic device. In one implementation, the portable electronic device is a handheld electronic device. Often, portable electronic devices are handheld electronic devices that can be easily held by and within a single hand of a user. The portable electronic device can also pertain to a wearable electronic device or a miniature electronic device. However, the invention can apply to electronic devices whether portable or not.

Figure 12:
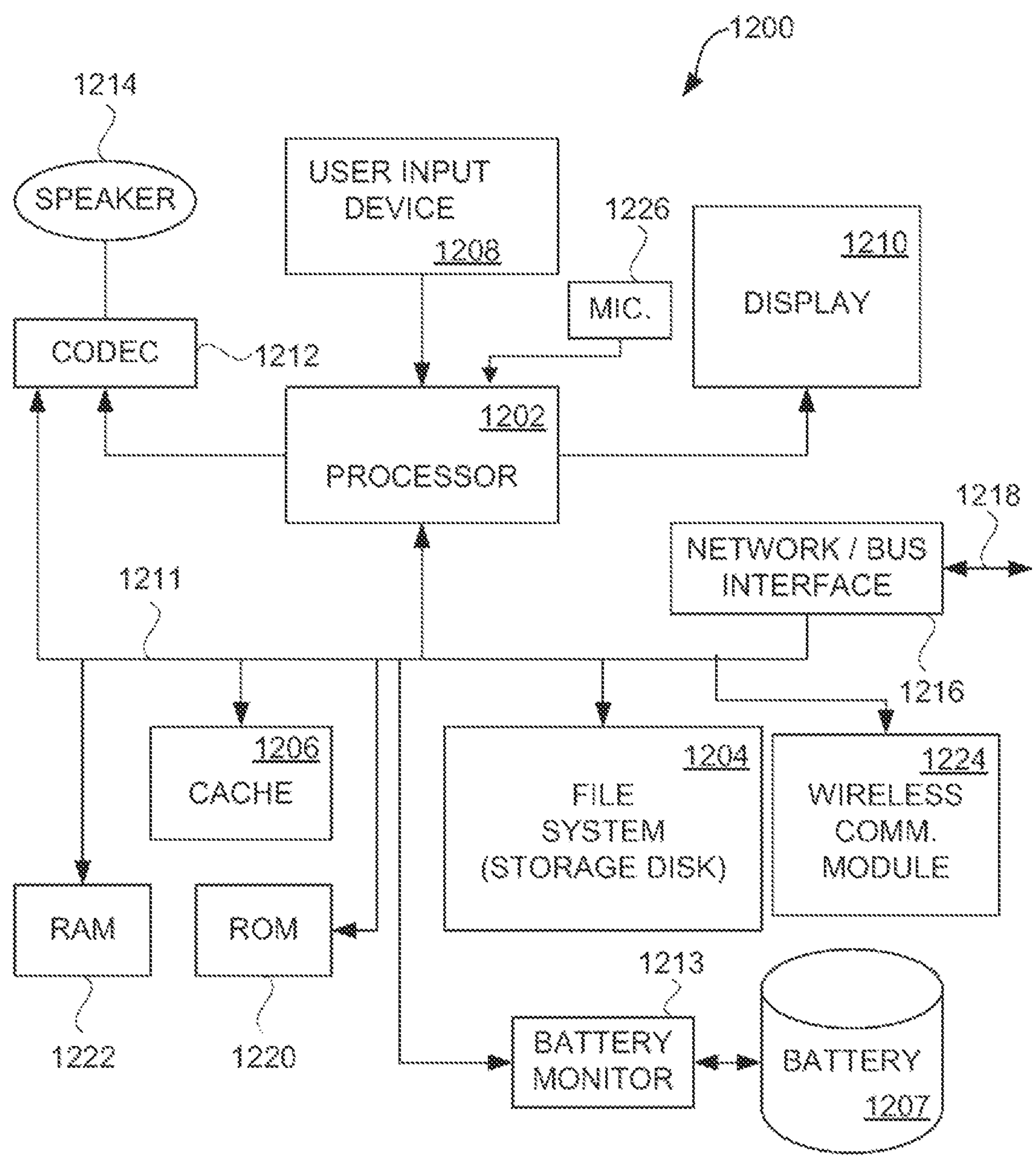
FIG. 12 is a block diagram of media player according to one embodiment of the invention.

FIG. 12 is a block diagram of media player 1200 according to one embodiment of the invention. Media player 1200 can include the circuitry of device 100 in FIG. 1, device 200 in FIG. 2, device 900 in FIGS. 9A-9C, device 952 in FIG. 9D, or can perform the operations described with reference to FIG. 4-6, 10 or 11A and 11B, and/or can present a display screen as in FIGS. 7A-7C or FIGS. 8A-8D.

Media player 1200 can include processor 1202 that pertains to a microprocessor or controller for controlling the overall operation of media player 1200. Media player 1200 can store media data pertaining to media items in file system 1204 and cache 1206. File system 1204 is, typically, a storage disk or a plurality of disks. File system 1204 typically provides high capacity storage capability for media player 1200. File system 1204 can store not only media data but also non-media data. However, since the access time to file system 1204 is relatively slow, media player 1200 can also include cache 1206. Cache 1206 is, for example, Random-Access Memory (RAM) provided by semiconductor memory. The relative access time to cache 1206 can be substantially shorter than for file system 1204. However, cache 1206 does not have the large storage capacity of file system 1204. Further, file system 1204, when active, consumes more power than does cache 1206. The power consumption is often a concern when media player 1200 is a portable media player that is powered by battery 1207. Media player 1200 can also include RAM 1220 and Read-Only Memory (ROM) 1222. ROM 1222 can store programs, utilities or processes to be executed in a non-volatile manner. RAM 1220 provides volatile data storage, such as for cache 1206.

Media player 1200 can also include user input device 1208 that allows a user of media player 1200 to interact with media player 1200. For example, user input device 1208 can take a variety of forms, such as a button, keypad, dial, etc. (physical or soft implementations) each of which can be programmed to individually or in combination perform any of a suite of functions. In one implementation, user input device 1208 can be provided by a dial that physically rotates. In another implementation, user input device 1208 can be implemented as a touchpad (i.e., a touch-sensitive surface). In still another implementation, user input device 1208 can be implemented as a combination of one or more physical buttons as well as a touchpad. Still further, media player 1200 can include display 1210 (screen display) that can be controlled by processor 1202 to display information to the user. Data bus 1211 can facilitate data transfer between at least file system 1204, cache 1206, processor 1202, and CODEC 1212.

Media player 1200 can also provide status monitoring of battery 1207. In this regard, media player 1200 can include battery monitor 1213. Battery monitor 1213 can be operatively coupled to battery 1207 to monitor conditions. Battery monitor 1213 can, for example, communicate battery status (or conditions) with processor 1202.

In one embodiment, media player 1200 can serve to store a plurality of media items (e.g., songs, videos, TV shows, podcasts, etc.) in file system 1204. When a user desires to have media player 1200 play a particular media item, a list of available media items can be displayed on display 1210. Then, using user input device 1208 (or voice commands), a user can select one of the available media items. Processor 1202, upon receiving a selection of a particular media item, can supply the media data (e.g., audio file) for the particular media item to coder/decoder (CODEC) 1212. CODEC 1212 can then produce analog output signals for speaker 1214. Speaker 1214 can be a speaker internal to media player 1200 or external to media player 1200. For example, headphones or earphones that connect to media player 1200 could be considered an external speaker. Speaker 1214 can not only be used to output audio sounds pertaining to the media item being played, but also to output audio notifications pertaining to battery status. Notifications of battery status can also be output to display 1210.

In one embodiment, media player 1200 is a portable computing device that can support processing media, such as audio and/or video. For example, media player 1200 can be a music player (e.g., MP3 player), a video player, a game player, and the like. These devices are generally battery operated and highly portable so as to allow a user to listen to music, play games or video, record video or take pictures wherever the user travels.

In one implementation, media player 1200 is a handheld device sized for placement into a pocket or hand of the user. By being handheld, media player 1200 is relatively small and easily handled and utilized by its user. By being pocket sized, the user does not have to directly carry the device and therefore the device can be taken almost anywhere the user travels (e.g., the user is not limited by carrying a large, bulky and often heavy device, as in a portable computer). Furthermore, in one implementation, the device may be operated by the user's hands; no reference surface such as a desktop is needed.

Media player 1200 can also include network/bus interface 1216 that couples to data link 1218. Data link 1218 can allow media player 1200 to couple to a host computer. Datalink 1218 can be provided over a wired connection or a wireless connection. In the case of a wireless connection, network/bus interface 1216 can include a wireless transceiver.

To support wireless communications, media player 1200 can also include wireless communications module 1224. Wireless communication module 1224 can be considered to provide voice communications (e.g., calls via a cellular network), whereas network/bus interface 1216 can be considered to provide data communications. A user of media player 1200 can thus make and receive voice calls using the wireless communications module in media player 1200. Wireless communications module 1224 can also couple to data bus 1211 to couple to processor 1202 and other resources. Media player 1200 can also include microphone 1226 for pick up of the user's voice.

The invention is suitable for use with battery-powered electronic devices. However, the invention is particularly well suited for handheld electronic devices, such as a handheld media device. One example of a handheld media device is a portable media player (e.g., music player or MP3 player). Another example of a handheld media device is a mobile telephone (e.g., cell phone) or Personal Digital Assistant (PDA).

Portable media devices can store and play audio sounds pertaining to media assets (media items), such as music, audiobooks, meeting recordings, and other speech or voice recordings. Portable media devices, such as media players, are small and highly portable and have limited processing resources. Often, portable media devices are handheld media devices which can be easily held by and within a single hand of a user.

One example of a media player is the iPod® media player, which is available from Apple Inc. of Cupertino, CA Often, a media player acquires its media assets from a host computer that serves to enable a user to manage media assets. As an example, the host computer can execute a media management application to utilize and manage media assets. One example of a media management application is iTunes®, produced by Apple Inc.

"Media items," as used herein, is digital data that pertains to at least one of audio, video, or images. Media items are also referred to as digital media assets. The digital data for media items can be referred to as media data or media content. Some examples of specific forms of media items include, but are not limited to, songs, albums, audiobooks, playlists, movies, music videos, photos, computer games, podcasts, audio and/or video presentations, news reports, and sports updates. Video media items include movies, music videos, video presentations, and any other media items having a video characteristic.

U.S. patent application Ser. No. 11/209,367, filed Aug. 22, 2005, and entitled "AUDIO STATUS INFORMATION FOR A PORTABLE ELECTRONIC DEVICE," is hereby incorporated herein by reference.

U.S. patent application Ser. No. 11/565,890, filed Dec. 1, 2006, and entitled "POWER CONSUMPTION MANAGEMENT FOR FUNCTIONAL PRESERVATION IN A BATTERY-POWERED ELECTRONIC DEVICE," is hereby incorporated herein by reference.

U.S. patent application Ser. No. 10/981,993, filed Nov. 4, 2004, and entitled "AUDIO USER INTERFACE FOR COMPUTING DEVICE," is hereby incorporated herein by reference.

The various aspects, embodiments, implementations or features of the invention can be used separately or in any combination.

The invention is preferably implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may, but need not, yield one or more of the following advantages. One advantage of the invention is that an electronic device can be user controlled through voice commands. Another advantage of the invention is that available voice commands can be context sensitive for robust and power efficient operation. Yet another advantage of the invention is that an electronic device can intelligently interact with a nearby media system to provide multiple functions (e.g., media playback and wireless voice communications).

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. An electronic device comprising a processor and memory storing one or more programs for execution by the processor, the one or more programs comprising instructions for:

detecting, via a microphone of the electronic device, a voice input from a user;

detecting an operational state of the electronic device;

in accordance with a determination that at least a portion of the voice input matches a predetermined command authorized for usage with the operational state, executing the predetermined command; and displaying the predetermined command on a display of the electronic device, wherein the displayed predetermined command is based on the detected operational state.

2. The electronic device of claim 1, wherein the predetermined command corresponds to a macro including at least a series of commands to be performed.

3. The electronic device of claim 1, wherein the operational state of the electronic device is one of:

a state of graphical user interface being displayed on the electronic device;

a functional mode of the electronic device; and a low power mode.

4. The electronic device of claim 3, wherein the operational state of the electronic device is the low power mode and, wherein detecting the voice input from the user includes monitoring for the voice input while in the low power mode.

5. The electronic device of claim 4, wherein the operational state is dependent on a state of an application program being executed by the processor.

6. The electronic device of claim 1, wherein executing the one or more predetermined commands includes changing the operational mode of the electronic device to another operational mode.

7. The electronic device of claim 6, wherein the operational state of the electronic device is a low power mode, and wherein the another operational mode of the electronic device is a normal power mode.

8. The electronic device of claim 1, wherein the one or more programs further comprise instructions for:

in accordance with a determination that the at least a portion of the voice input does not match the predetermined command authorized for usage with the operational state, forgoing executing the predetermined command.

9. A non-transitory computer-readable storage medium storing one or more programs configured to be executed by one or more processors of an electronic device operable in a plurality of operational states, the one or more programs including instructions for:

detecting, via a microphone of the electronic device, a voice input from a user;

detecting an operational state of the electronic device;

in accordance with a determination that at least a portion of the voice input matches a predetermined command authorized for usage with the operational state, executing the predetermined command; and displaying the predetermined command on a display of the electronic device, wherein the displayed predetermined command is based on the detected operational state.

10. A method comprising:

at an electronic device including a processor:

detecting, via a microphone of the electronic device, a voice input from a user;

detecting an operational state of the electronic device;

in accordance with a determination that at least a portion of the voice input matches a predetermined command authorized for usage with the operational state, executing the predetermined command; and displaying the predetermined command on a display of the electronic device, wherein the displayed predetermined command is based on the detected operational state.

11. The non-transitory computer-readable storage medium of claim 9, wherein the predetermined command corresponds to a macro including at least a series of commands to be performed.

12. The non-transitory computer-readable storage medium of claim 9, wherein the operational state of the electronic device is one of:

a state of graphical user interface being displayed on the electronic device;

a functional mode of the electronic device; and a low power mode.

13. The non-transitory computer-readable storage medium of claim 12, wherein the operational state of the electronic device is a low power mode and, wherein detecting the voice input from the user includes monitoring for the voice input while in the low power mode.

14. The non-transitory computer-readable storage medium of claim 13, wherein the operational state is dependent on a state of an application program being executed by the processor.

15. The non-transitory computer-readable storage medium of claim 9, wherein executing the one or more predetermined commands includes changing the operational mode of the electronic device to another operational mode.

16. The non-transitory computer-readable storage medium of claim 15, wherein the operational state of the electronic device is a low power mode, and wherein the another operational mode of the electronic device is a normal power mode.

17. The non-transitory computer-readable storage medium of claim 9, wherein the one or more programs further comprise instructions for:

in accordance with a determination that the at least a portion of the voice input does not match the predetermined command authorized for usage with the operational state, forgoing executing the predetermined command.

18. The method of claim 10, wherein the predetermined command corresponds to a macro including at least a series of commands to be performed.

19. The method of claim 10, wherein the operational state of the electronic device is one of:

a state of graphical user interface being displayed on the electronic device;

a functional mode of the electronic device; and a low power mode.

20. The method of claim 19, wherein the operational state of the electronic device is the low power mode and, wherein detecting the voice input from the user includes monitoring for the voice input while in the low power mode.

21. The method of claim 20, wherein the operational state is dependent on a state of an application program being executed by the processor.

22. The method of claim 10, wherein executing the one or more predetermined commands includes changing the operational mode of the electronic device to another operational mode.

23. The method of claim 22, wherein the operational state of the electronic device is a low power mode, and wherein the another operational mode of the electronic device is a normal power mode.

24. The method of claim 10, further comprising:

in accordance with a determination that the at least a portion of the voice input does not match the predetermined command authorized for usage with the operational state, forgoing executing the predetermined command.

* * * * *

UNITED STATES PATENT AND TRADEMARK OFFICE

CERTIFICATE OF CORRECTION

PATENT NO. : 11,979,836 B2
APPLICATION NO. : 18/139901
DATED : May 7, 2024
INVENTOR(S) : Daniel Freeman et al.

It is certified that error appears in the above-identified patent and that said Letters Patent is hereby corrected as shown below:

In the Claims

Column 18, Line 63: In Claim 10, delete “method” and insert -- method, --.

Column 19, Line 23: In Claim 13, delete “is a” and insert -- is the --.

Signed and Sealed this
Thirty-first Day of December, 2024

Derrick Brent
*Acting Director of the United States Patent and Trademark Office*